US006885368B2

(12) United States Patent
Rotgé

(10) Patent No.: US 6,885,368 B2
(45) Date of Patent: Apr. 26, 2005

(54) METHOD AND APPARATUS FOR GENERATING M-DEGREE FORMS IN A N-DIMENSION SPACE

(75) Inventor: Jean-François Rotgé, Outremont (CA)

(73) Assignee: SGDL Systems Inc., Montreal (CA)

( * ) Notice: Subject to any disclaimer, the term of this patent is extended or adjusted under 35 U.S.C. 154(b) by 302 days.

(21) Appl. No.: 10/319,836

(22) Filed: Dec. 16, 2002

(65) Prior Publication Data

US 2003/0137507 A1 Jul. 24, 2003

Related U.S. Application Data

(60) Provisional application No. 60/339,406, filed on Dec. 14, 2001.

(51) Int. Cl.⁷ .............................................. G06T 17/00
(52) U.S. Cl. ..................................................... 345/420
(58) Field of Search ......................................... 345/420

(56) References Cited

U.S. PATENT DOCUMENTS

| 5,883,631 A | 3/1999 | Konno et al. |
| 5,949,919 A | 9/1999 | Chen |

FOREIGN PATENT DOCUMENTS

EP        0 425 177 A2      5/1991

OTHER PUBLICATIONS

Jean–Francois Rotge. SGDL–Scheme: a high–level algorithm language for projective solid modeling programming. Scheme and Functional Programming 2000. Sep. 2000.*
James F. Blinn. A Generalization of Algebraic Surface Drawing. ACM Transactions on Graphics. vol. 1 No. 3. Jul. 1982. pp. 235–256.*

Automatic Fairing Algorithm for B–spline Curves—N. Sapidis and G. Farin, XP000136430, vol. 22 No. 2, Mar. 1990, Computer–Aided Design, London, GB., pp. 121–129.
Efficient Rendering of Projective Model for Image–Based Visualization, Tomas Werner et al. Center for Machine Perception, Faculty of Electrical Engineering, Czech Technical University, 1998 IEEE, pp. 1705–1707.
Factoring a Homogeneous Transformation for a More Efficient Graphics Pipeline, Salim et al., Computer & Graphics vol. 15, No. 2, 1991, pp. 249–258.
An Introduction to Projective Geometry (for Computer Vision), Stan Birchfield, XP–002195387, Mar. 12, 1998, pp. 1–22.
On the Projective Invariant Representation of Conics in Computer Graphics, Yvan Herman, XP–02196148, Computer Graphics Forum 9, (1989) pp. 301–313.
Computer Graphics, Principles and Practive, James D. Foley et al., pp. 701–702–.
Introduction to Implicit Surfaces, Chandrajit Bajaj et al., Morgan Kaufmann Publishers, Inc., San Francisco, CA, pp. 23–24.
Analytic Geometry of Space, Virgil Snyder et al., Cornel University et al., pp. 206–211.

(Continued)

*Primary Examiner*—Mark Zimmerman
*Assistant Examiner*—Peter-Anthony Pappas
(74) *Attorney, Agent, or Firm*—Ogilvy Renault

(57) ABSTRACT

A method and apparatus is disclosed for generating a m-degree form in a n-dimension space. A framework is used to generate the form. The framework comprises a defined number of sections, lines and control points depending on the complexity of the form to generate. An iterative solving process is then used in order to provide the algebraic coefficients of the m-degree form using at least data related to the control points.

12 Claims, 53 Drawing Sheets

OTHER PUBLICATIONS

Computer Graphics, System & Concepts, Rod Salmon et al., Addison–Wesley Publishing Co., 1987, pp. 434–438.

Research Quadric Shell Intersections, Vinod Kumar et al., Computer–Aided Design vol. 27, No. 8, Aug. 1995, pp. 573–586.

Siggraph'89, Conference Proceedings, Jul. 31–Aug. 4, 1989, Boston, MA, Computer Graphics, vol. 23, No. 3, Jul. 1989, pp. 147–156.

Ray Tracing Algebraic Surfaces, Pat Hanrahan, XP–000900938, Computer Graphics, vol. 17, No. 1, Jan. 1983, pp. 83–90.

Dynamic NURBS Swung Surfaces for Physics–Based Shape Design, Hong Qin et al., Computer–Aided Design, 1995 vol. 27, No. 2, pp. 111–127.

An Overview of Offset Curves and Surfaces, Takashi Maekawa, Design Lab. Dept. of Ocean Engineering, Massachusetts Inst. of Technology, 1998 Computer–Aided Design 31, pp. 165–173.

Swept Volumes Generated by the Natural Quadric Surfaces, Zeng–Jia Hu et al., Computer & Graphics, vol. 20, No. 2, 1996, pp. 263–274.

Shape Control In Implicit Modeling, Baining Guo, XP–000912151, Dept. of Computer Science, Cornell University, Graphics Interface '91, pp. 230–235.

Superquadrics and Angle–Preserving Transformations, Alan H. Barr, Rensselaer Polytechnic Institute, IEEE, Jan. 1981, pp. 11–23.

Surface Design Using Cyclide Patches, Y. L. Srivinas et al., Design Laboratory, Dept. of Mechanical Engineering, The University of Michigan, Dec. 2, 1994, pp. 263–275.

A survey of Curve and Surface Methods in CAGD, Wolfgang Böhm, Computer–Aided Geometric Design 1 (1984) pp. 1–59.

Dynamic 3D Models with Local and Global Deformations: Deformable Superquadrics, Demetri Terzopoulos et al., Dept. of Computer Sc., University of Toronto, 1990, IEEE, pp. 606–615.

Smooth Piecewise Biquartic Surfaces from Quadrilateral Control Polyhedra with Isolated n–sided faces, S.L., Lee et al. Computer–Aided Design, vol. 27, No. 10, Oct. 1995, pp. 741–758.

Ray Quadric, Ergun Akleman et al., Visualization Laboratory, Texas, pp. 89–98.

First–Hit Speed Up in Ray Tracing Surfaces of Functions of Two Variables, Hans Werner Kohl, 1997 Computer & Graphics, vol. 21, No. 6, pp. 825–839.

A graphics System Based on Quadrics, H. Laporte et al., 1995 Computer & Graphics, vol. 19, No. 2, pp. 251–260.

Ray Tracing Polynominal Tensor Product Surfaces, Christine Giger, Eurographics '89, Proceeding of the European Computer Graphics Conference and Exhibition, Hamburg, F.R.G., Sep. 4–8, 1989, pp. 125–136.

A New Method for Speeding Up Ray Tracing Nurbs Surfaces, Kaihual QIN et al., 1997 Computer & Graphics, No. 21, No. 5, pp. 577–586.

* cited by examiner

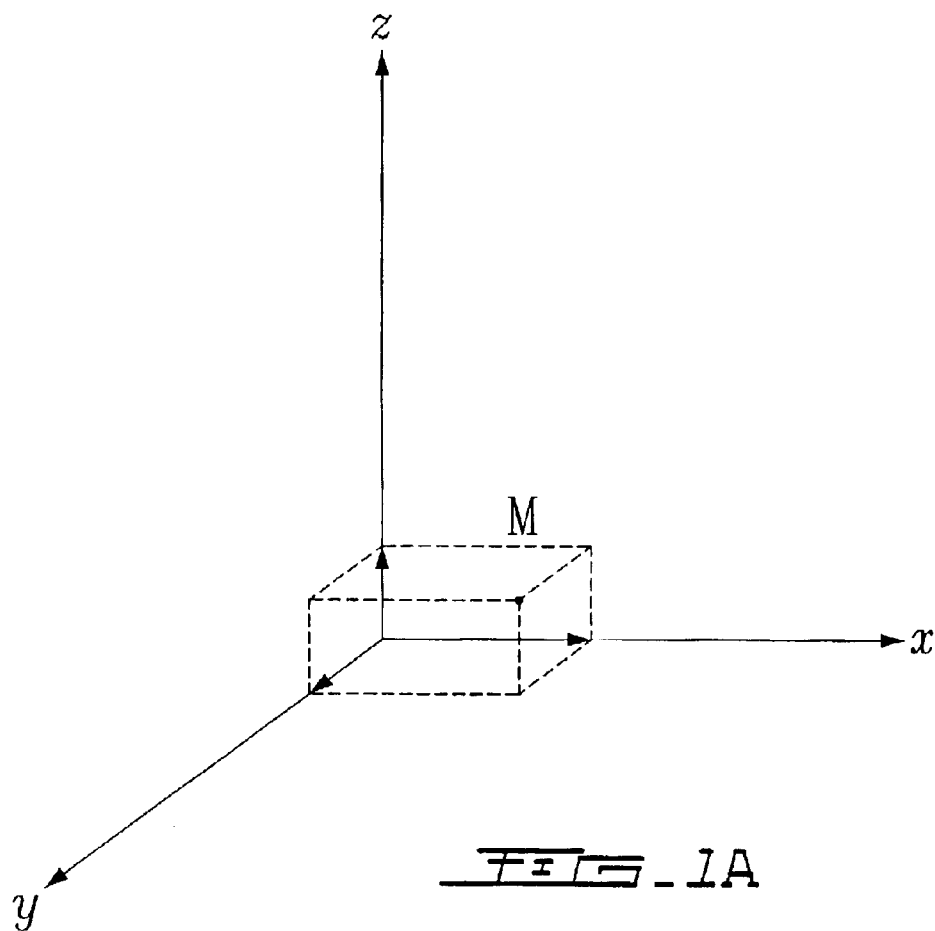
FIG_1A
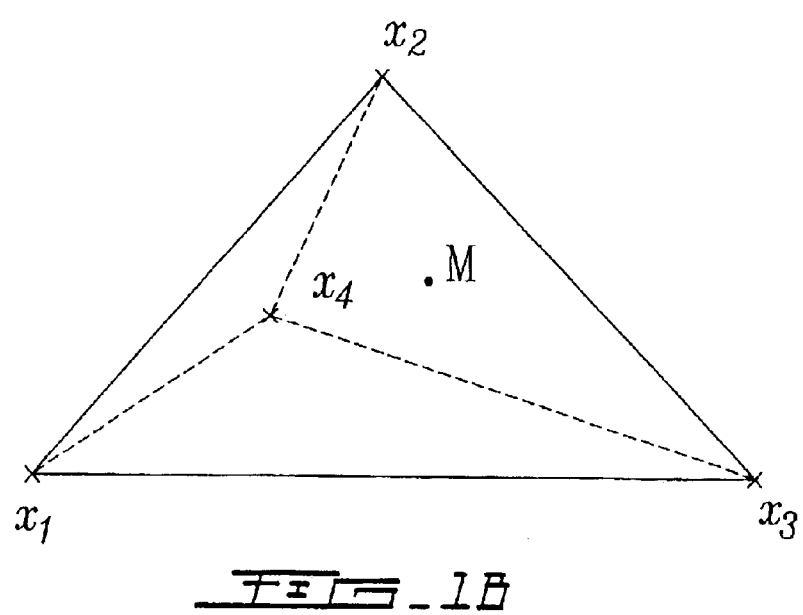
FIG_1B

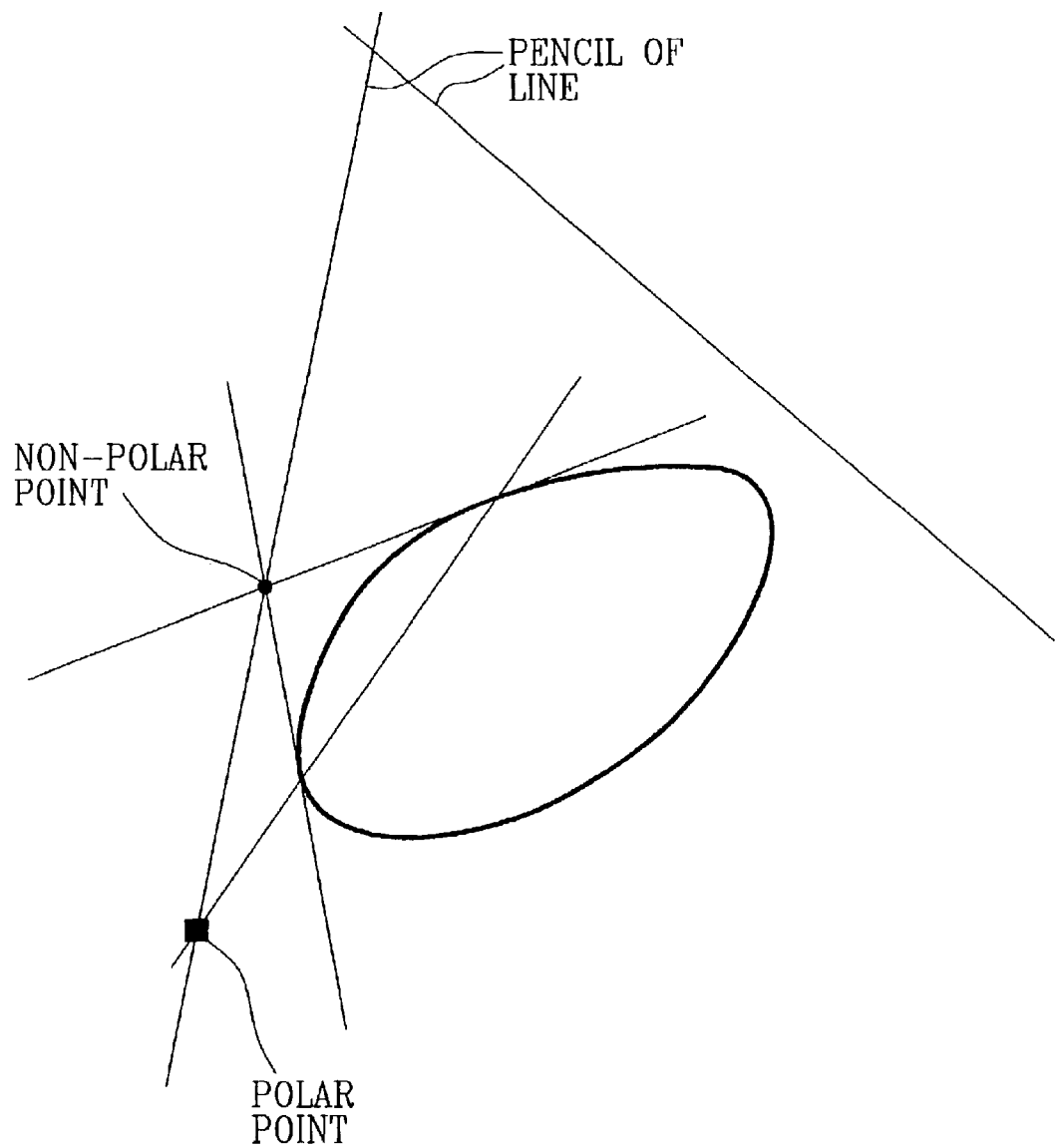

| SECTION S3 | LINE 1 / 2 | LINE 2 / 2 | LINE 3 / 1 |
|---|---|---|---|

| SECTION S2 | LINE 1 / 2 | LINE 2 / 1 |
|---|---|---|

| SECTION S1 | LINE 1 / 1 |
|---|---|

*FIG_4A*

| SECTION S4 | LINE 1 / 3 | LINE 2 / 3 | LINE 3 / 2 | LINE 4 / 1 |
|---|---|---|---|---|

| SECTION S3 | LINE 1 / 3 | LINE 2 / 2 | LINE 3 / 1 |
|---|---|---|---|

| SECTION S2 | LINE 1 / 2 | LINE 2 / 1 |
|---|---|---|

| SECTION S1 | LINE 1 / 1 |
|---|---|

*FIG_4B*

| SECTION S5 | LINE 1 | LINE 2 | LINE 3 | LINE 4 | LINE 5 |
|---|---|---|---|---|---|
| | 4 | 4 | 3 | 2 | 1 |

| SECTION S4 | LINE 1 | LINE 2 | LINE 3 | LINE 4 |
|---|---|---|---|---|
| | 4 | 3 | 2 | 1 |

| SECTION S3 | LINE 1 | LINE 2 | LINE 3 |
|---|---|---|---|
| | 3 | 2 | 1 |

| SECTION S2 | LINE 1 | LINE 2 |
|---|---|---|
| | 2 | 1 |

| SECTION S1 | LINE 1 |
|---|---|
| | 1 |

FIG. 4C

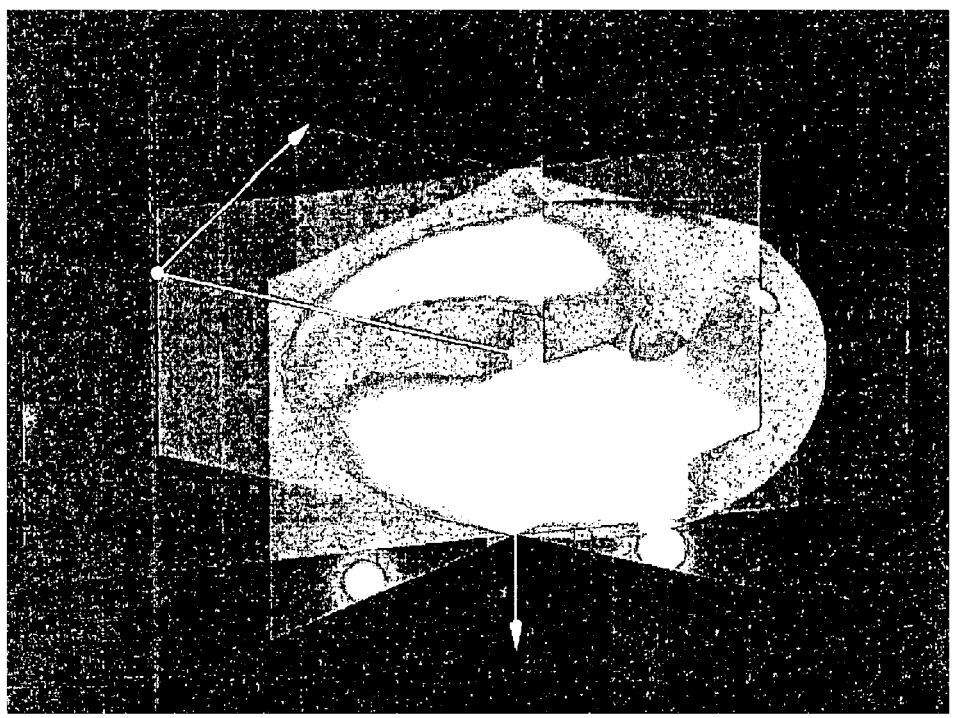
FIG_5A
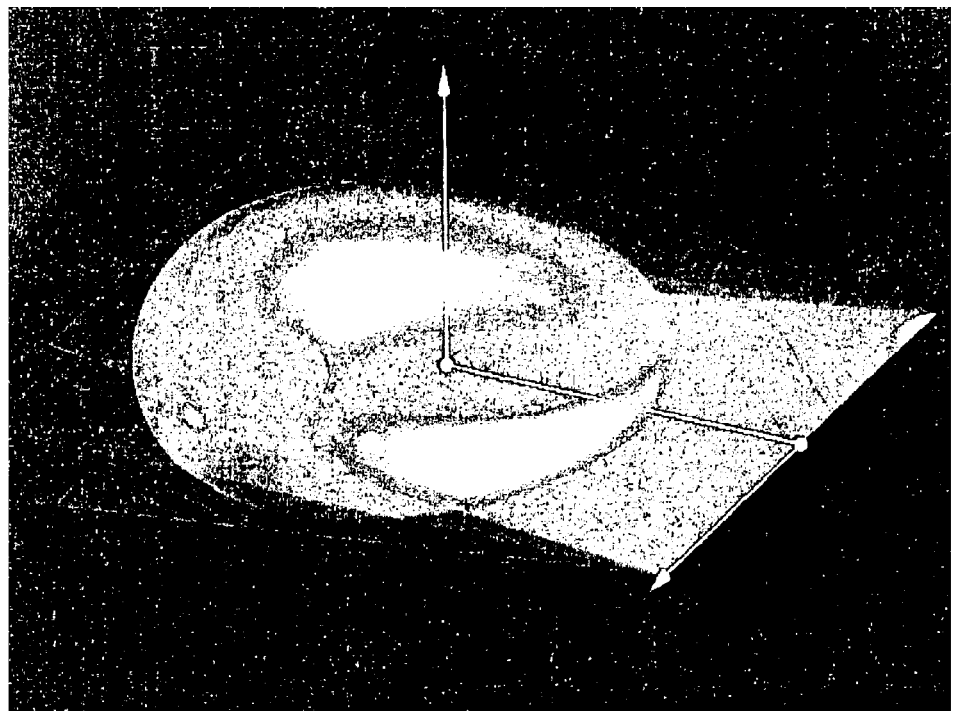
FIG_5B

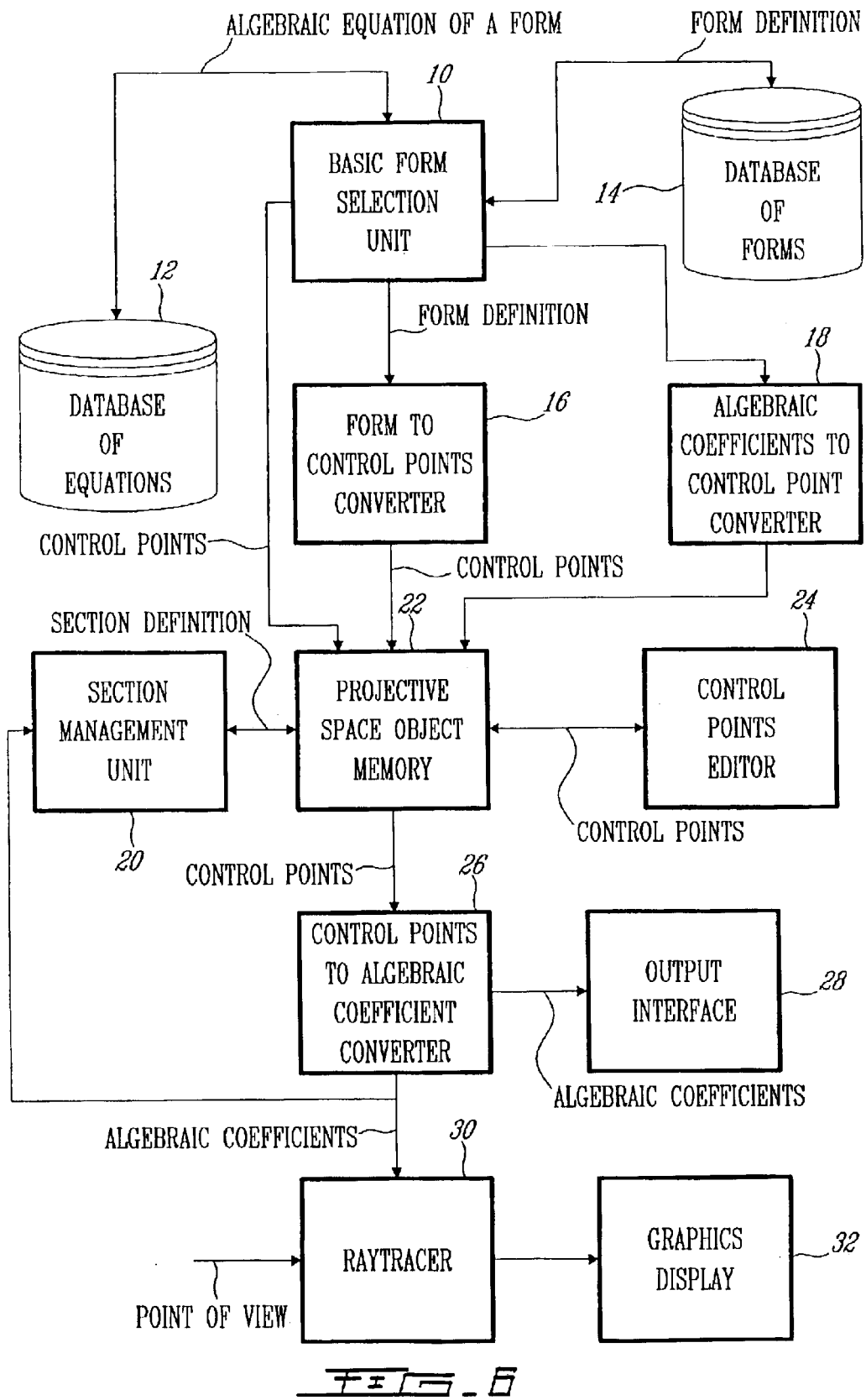
FIG_8

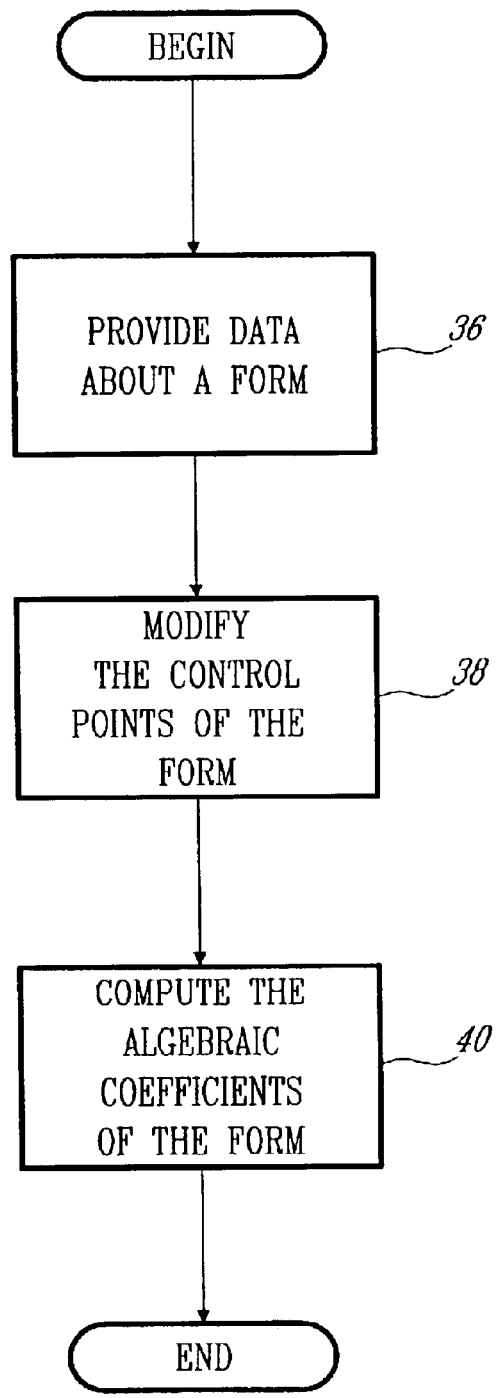
FIG_7

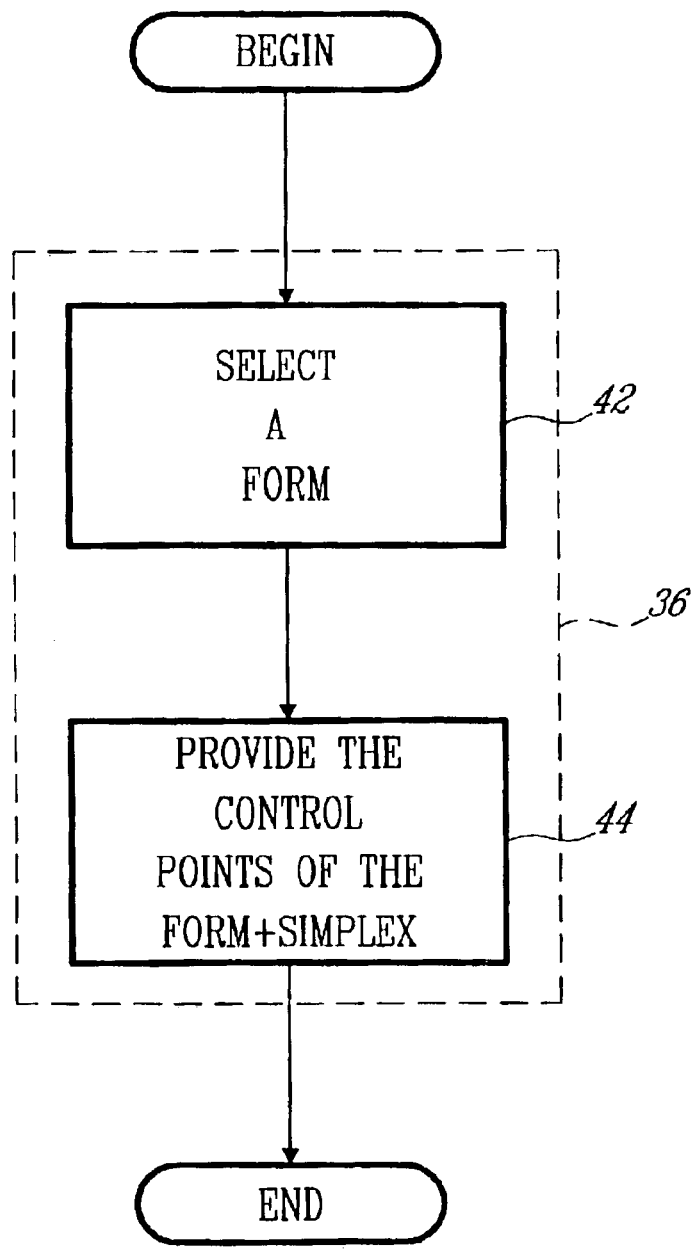

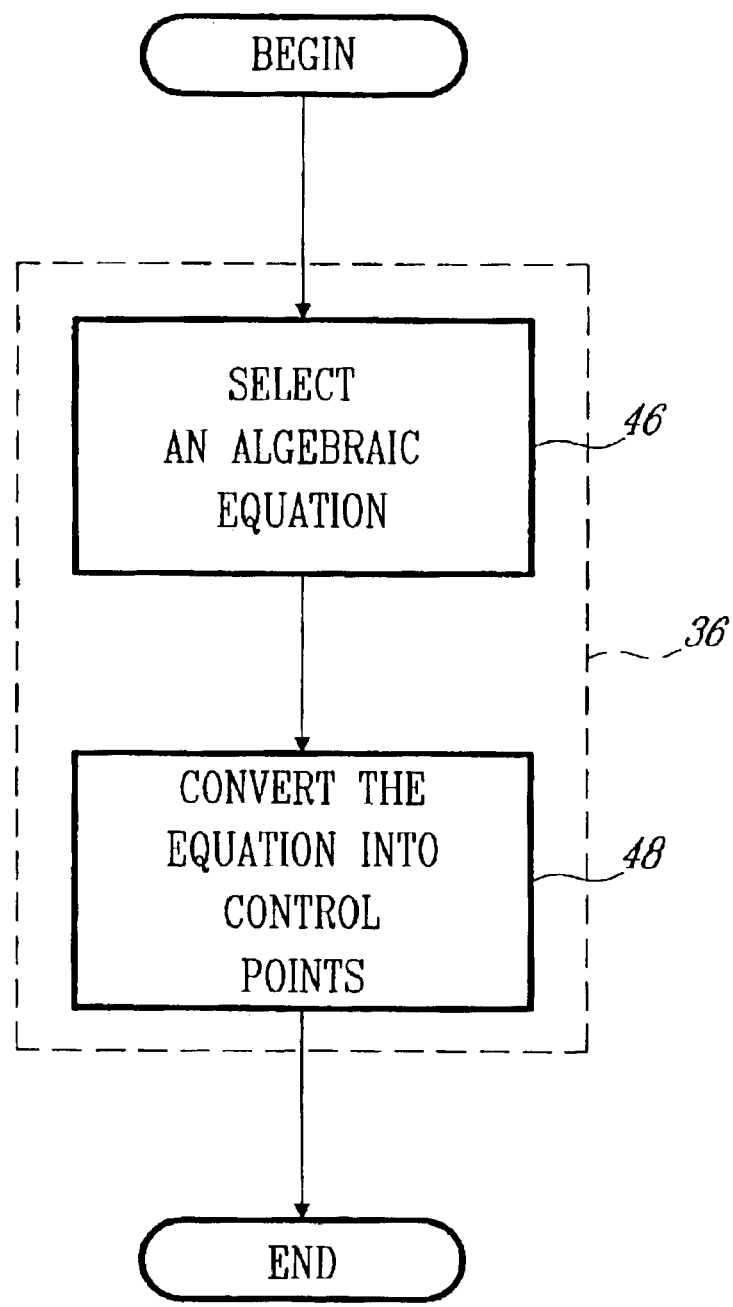
FIG_9

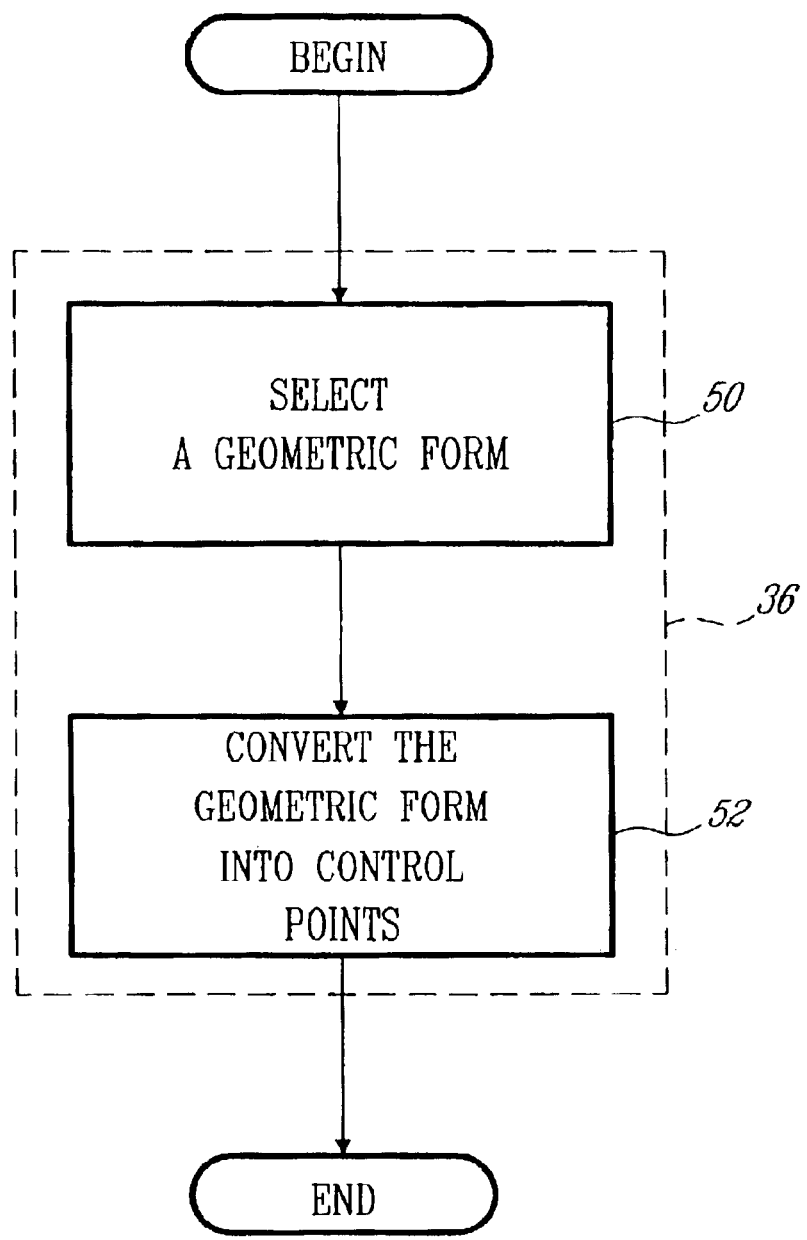
FIG_10

FIG_12

FIG_14

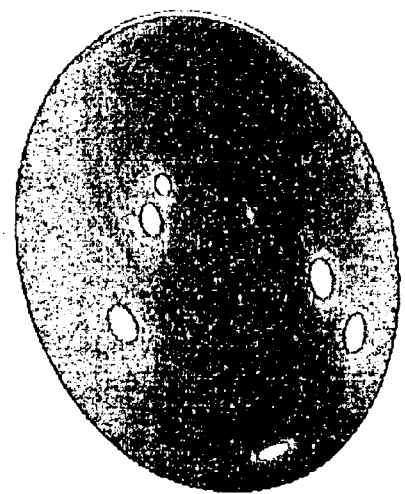
FIG_17
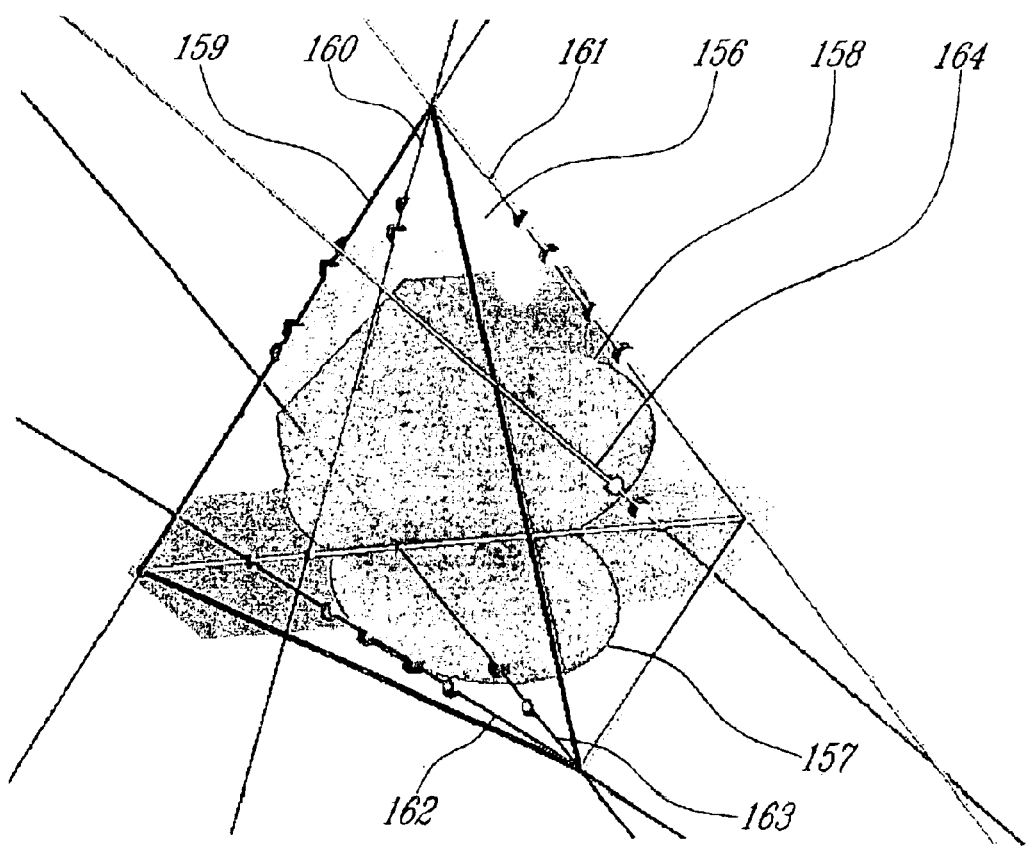
FIG_18

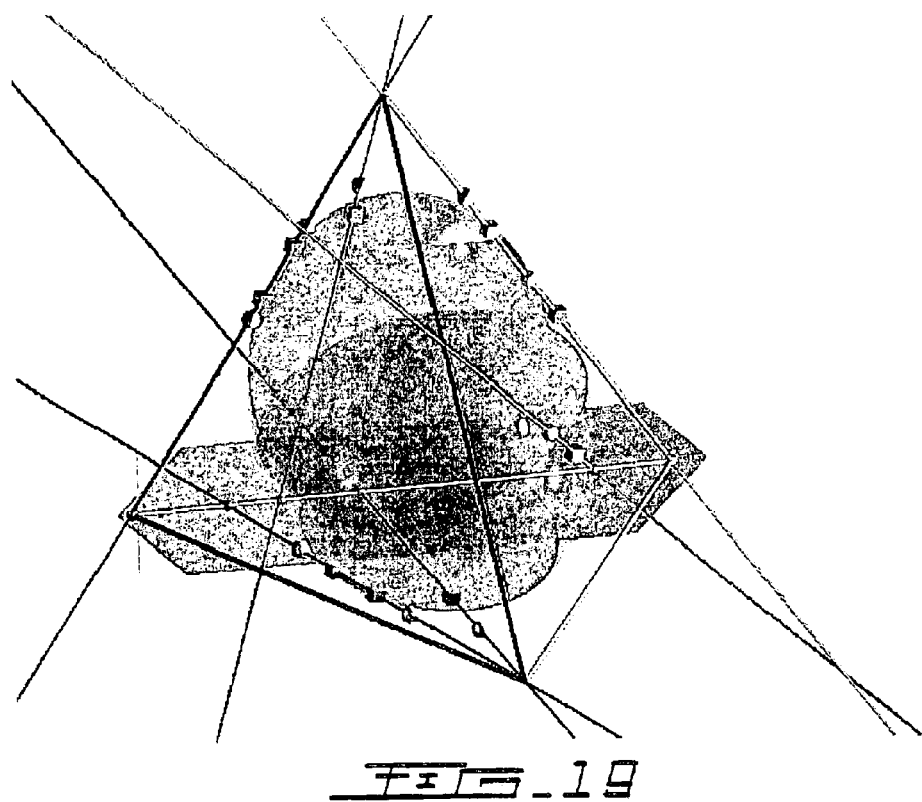
FIG_19
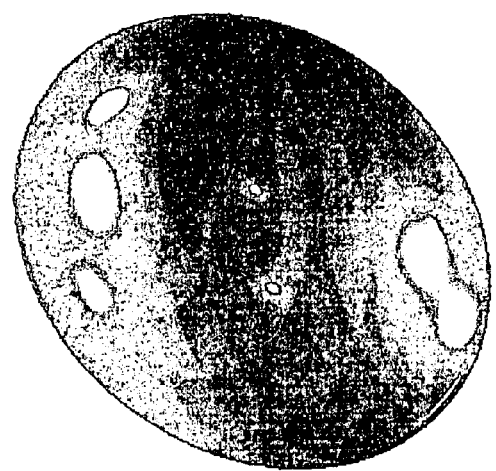
FIG_20

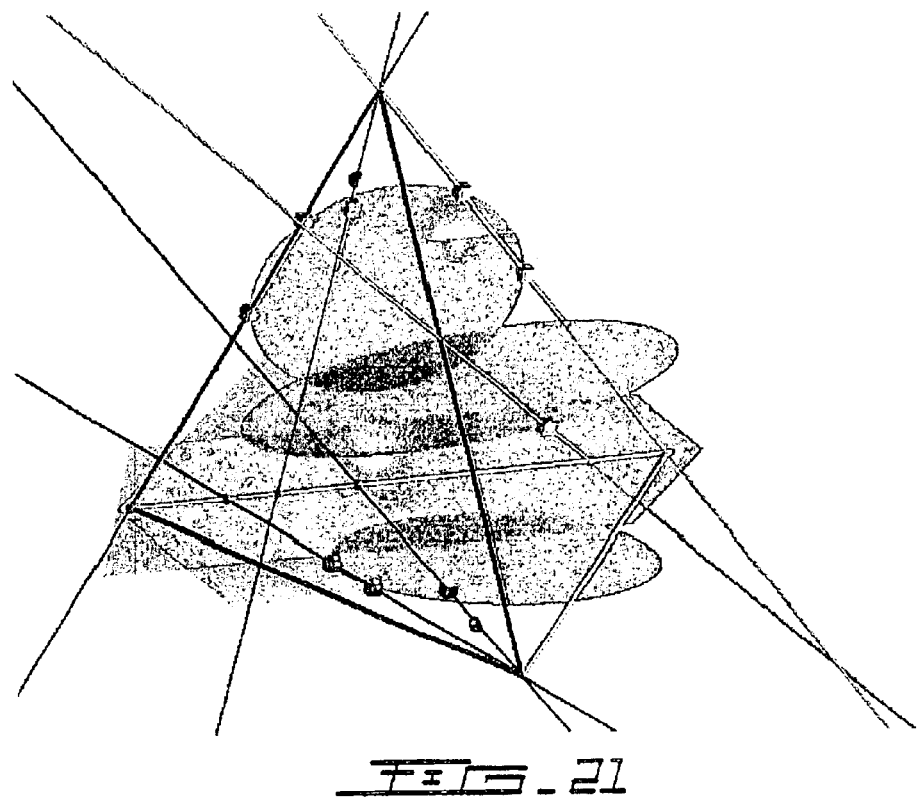
FIG_21
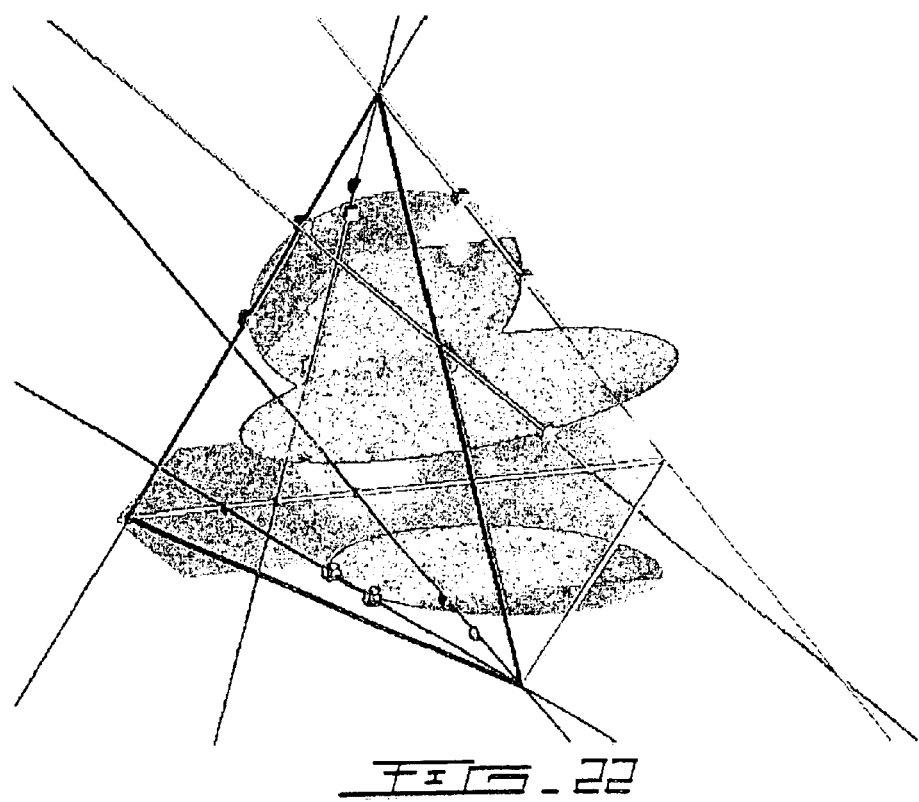
FIG_22

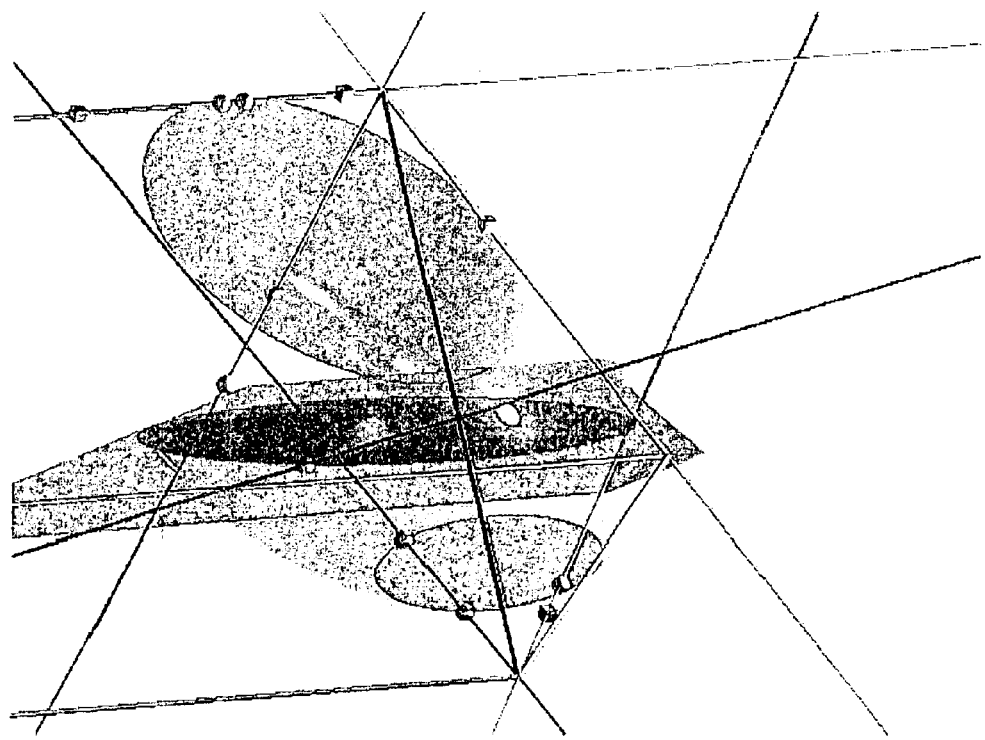
FIG_25
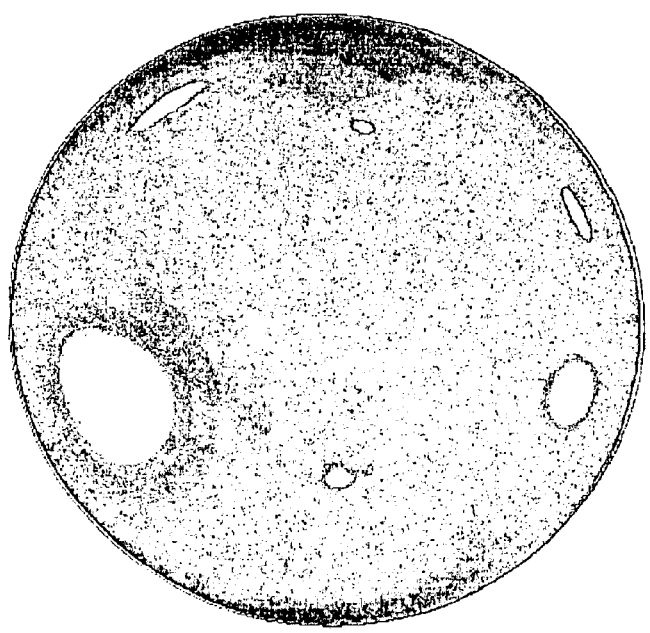
FIG_26

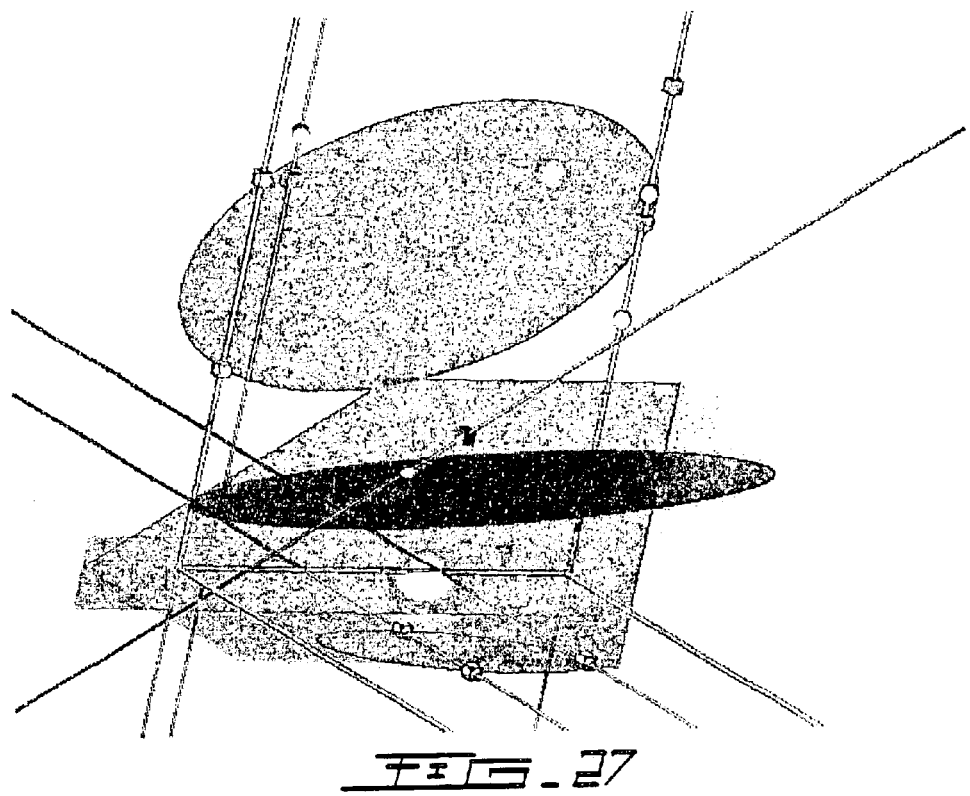
FIG_27
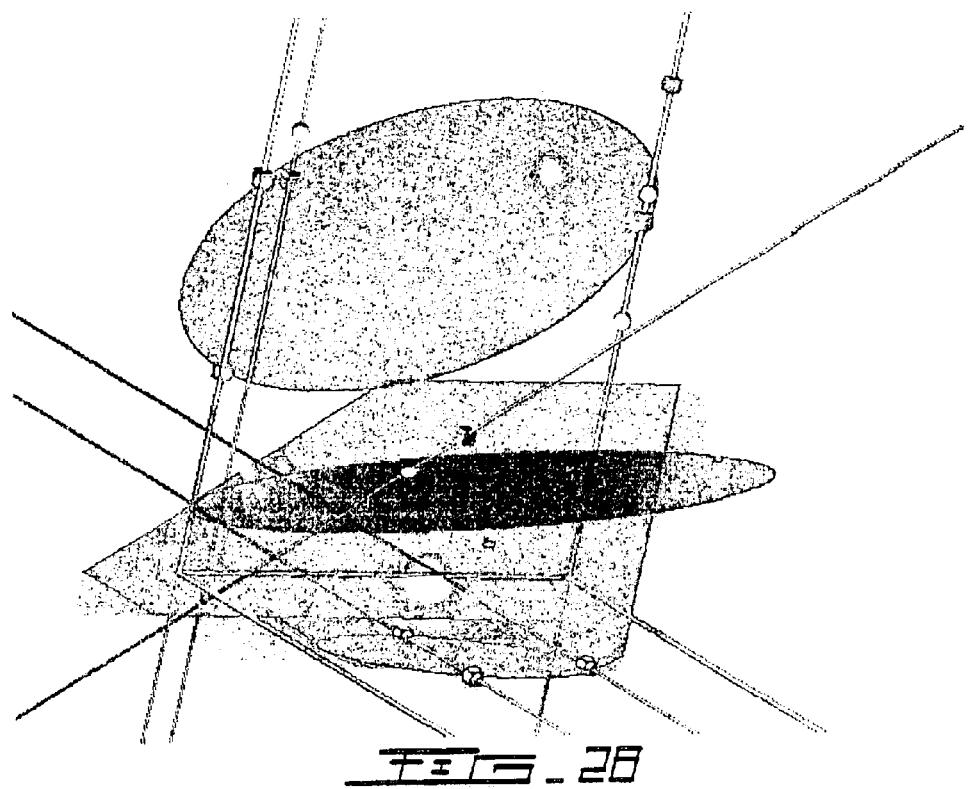
FIG_28

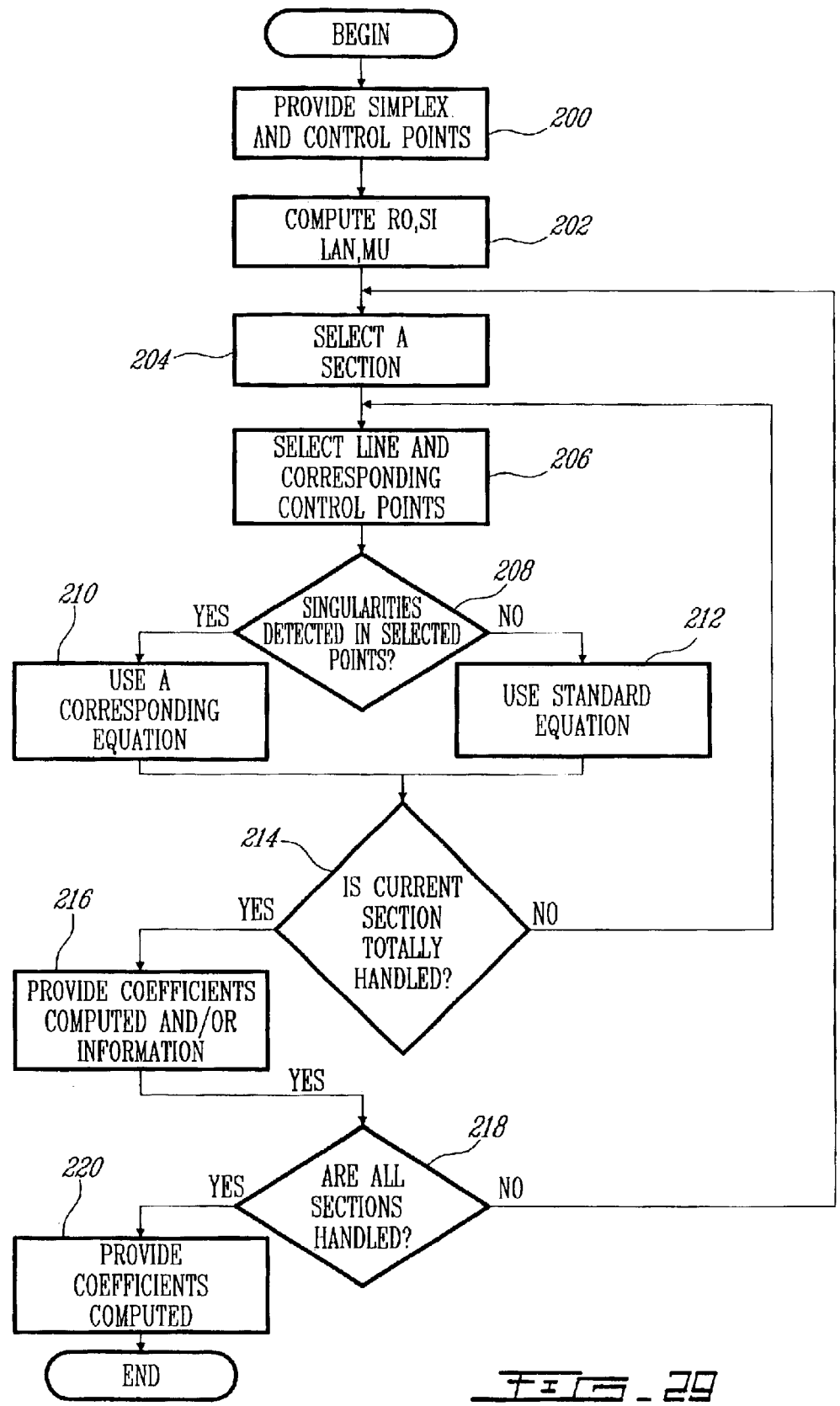
FIG_29

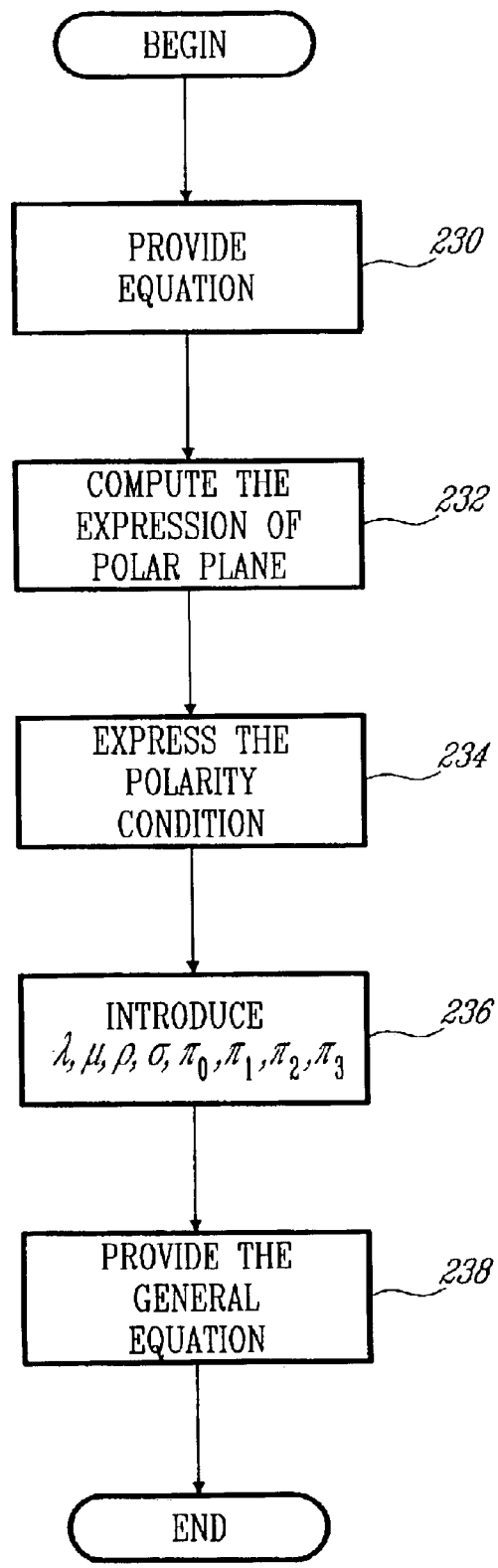
FIG_32

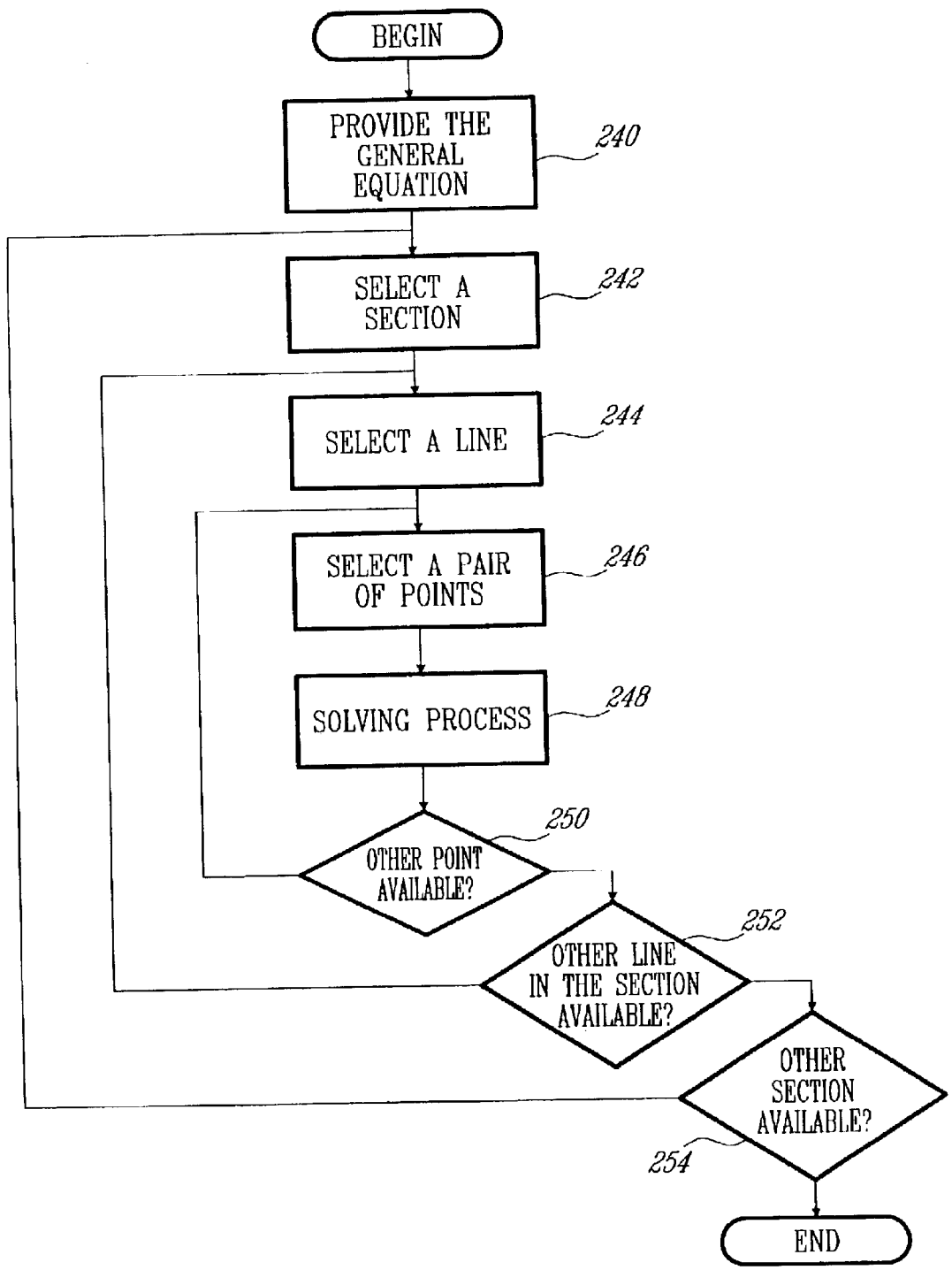
FIG_33

$$\begin{bmatrix} Coefficient & x3 & x2 & x1 & x0 & membre \\ z21 & 0 & 0 & 0 & 2 & x0^2 \\ z22 & 0 & 0 & 1 & 1 & x1\ x0 \\ z23 & 0 & 0 & 2 & 0 & x1^2 \\ z24 & 0 & 1 & 0 & 1 & x2\ x0 \\ z25 & 0 & 1 & 1 & 0 & x2\ x1 \\ z26 & 0 & 2 & 0 & 0 & x2^2 \\ z27 & 1 & 0 & 0 & 1 & x3\ x0 \\ z28 & 1 & 0 & 1 & 0 & x3\ x1 \\ z29 & 1 & 1 & 0 & 0 & x3\ x2 \\ z210 & 2 & 0 & 0 & 0 & x3^2 \end{bmatrix}$$

FIG. 34A $$\begin{bmatrix}
\text{Coefficient} & x3 & x2 & x1 & x0 & \text{membre} \\
z41 & 0 & 0 & 0 & 4 & x0^4 \\
z42 & 0 & 0 & 1 & 3 & x1\,x0^3 \\
z43 & 0 & 0 & 2 & 2 & x1^2\,x0^2 \\
z44 & 0 & 0 & 3 & 1 & x1^3\,x0 \\
z45 & 0 & 0 & 4 & 0 & x1^4 \\
z46 & 0 & 1 & 0 & 3 & x2\,x0^3 \\
z47 & 0 & 1 & 1 & 2 & x2\,x1\,x0^2 \\
z48 & 0 & 1 & 2 & 1 & x2\,x1^2\,x0 \\
z49 & 0 & 1 & 3 & 0 & x2\,x1^3 \\
z410 & 0 & 2 & 0 & 2 & x2^2\,x0^2 \\
z411 & 0 & 2 & 1 & 1 & x2^2\,x1\,x0 \\
z412 & 0 & 2 & 2 & 0 & x2^2\,x1^2 \\
z413 & 0 & 3 & 0 & 1 & x2^3\,x0 \\
z414 & 0 & 3 & 1 & 0 & x2^3\,x1 \\
z415 & 0 & 4 & 0 & 0 & x2^4 \\
z416 & 1 & 0 & 0 & 3 & x3\,x0^3 \\
z417 & 1 & 0 & 1 & 2 & x3\,x1\,x0^2 \\
z418 & 1 & 0 & 2 & 1 & x3\,x1^2\,x0 \\
z419 & 1 & 0 & 3 & 0 & x3\,x1^3 \\
z420 & 1 & 1 & 0 & 2 & x3\,x2\,x0^2 \\
z421 & 1 & 1 & 1 & 1 & x3\,x2\,x1\,x0 \\
z422 & 1 & 1 & 2 & 0 & x3\,x2\,x1^2 \\
z423 & 1 & 2 & 0 & 1 & x3\,x2^2\,x0 \\
z424 & 1 & 2 & 1 & 0 & x3\,x2^2\,x1 \\
z425 & 1 & 3 & 0 & 0 & x3\,x2^3 \\
z426 & 2 & 0 & 0 & 2 & x3^2\,x0^2 \\
z427 & 2 & 0 & 1 & 1 & x3^2\,x1\,x0 \\
z428 & 2 & 0 & 2 & 0 & x3^2\,x1^2 \\
z429 & 2 & 1 & 0 & 1 & x3^2\,x2\,x0 \\
z430 & 2 & 1 & 1 & 0 & x3^2\,x2\,x1 \\
z431 & 2 & 2 & 0 & 0 & x3^2\,x2^2 \\
z432 & 3 & 0 & 0 & 1 & x3^3\,x0 \\
z433 & 3 & 0 & 1 & 0 & x3^3\,x1 \\
z434 & 3 & 1 & 0 & 0 & x3^3\,x2 \\
z435 & 4 & 0 & 0 & 0 & x3^4
\end{bmatrix}$$

FIG. 34B

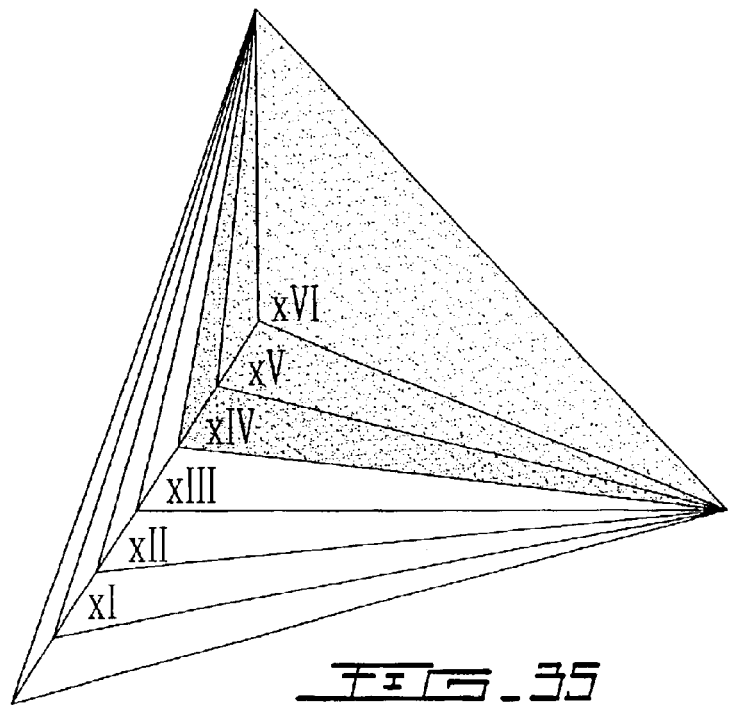
FIG_35
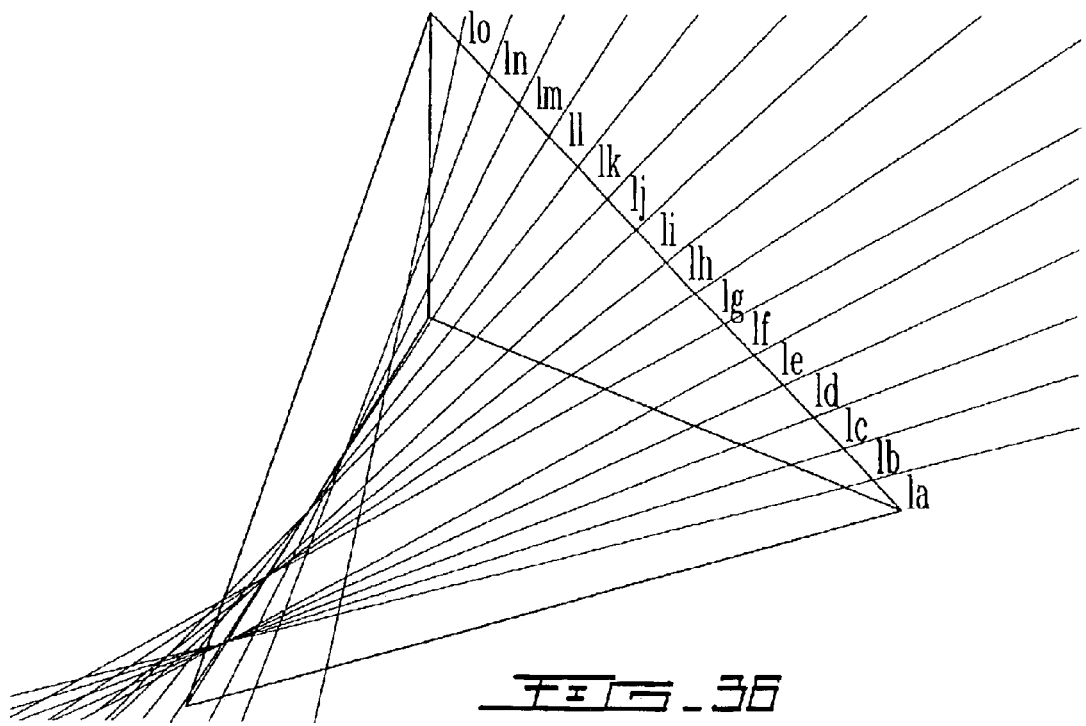
FIG_36

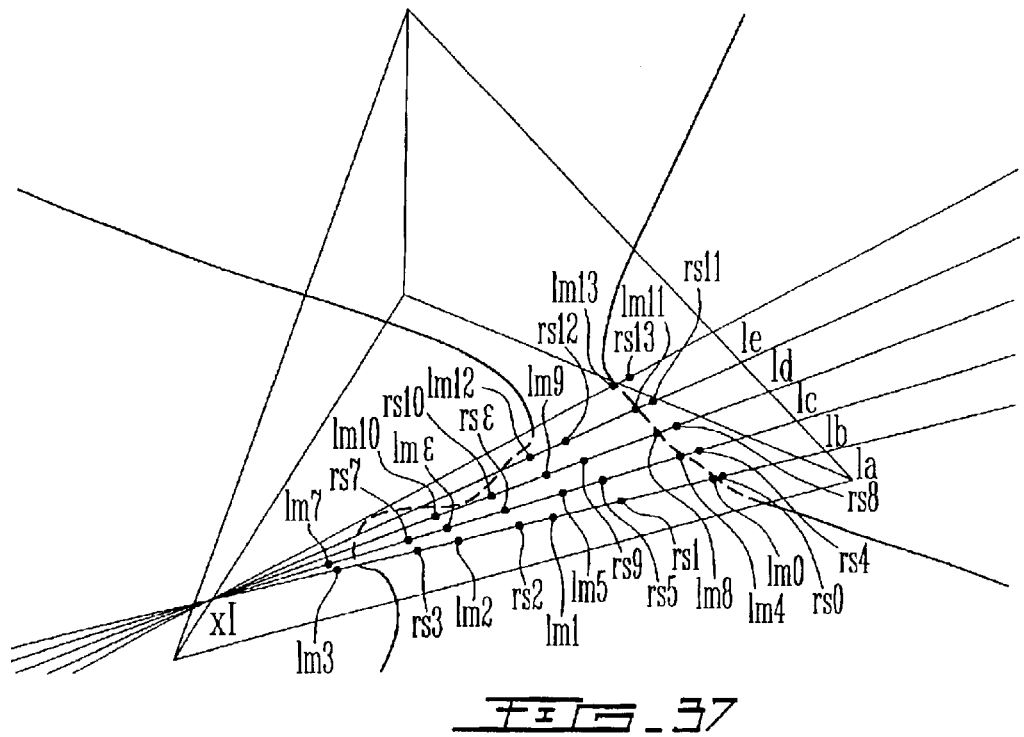
FIG_37
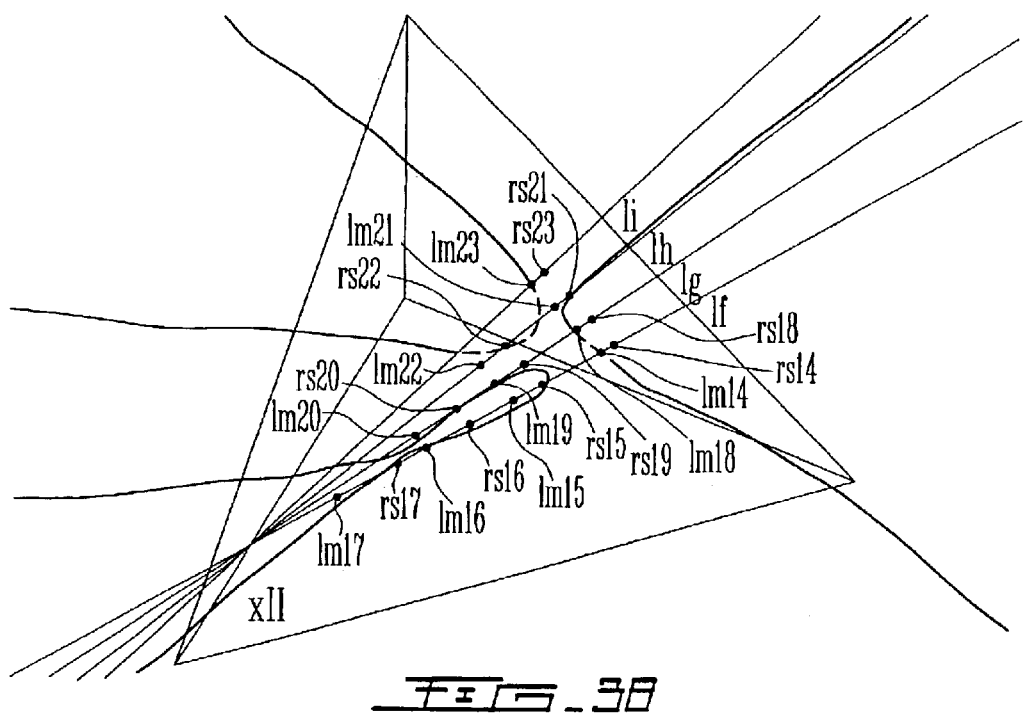
FIG_38

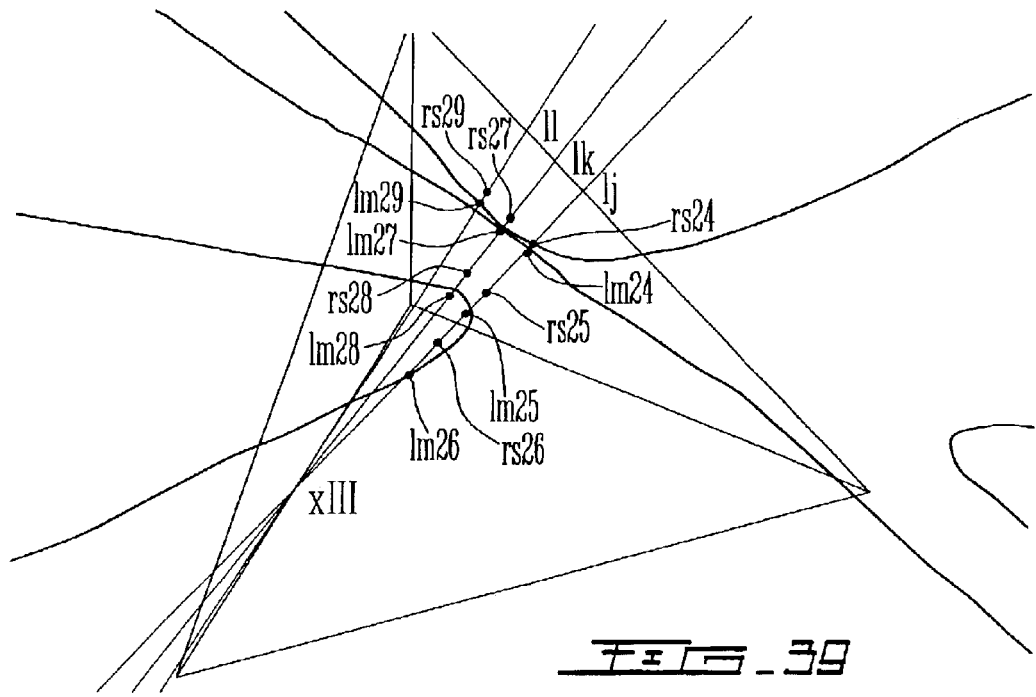
FIG_39
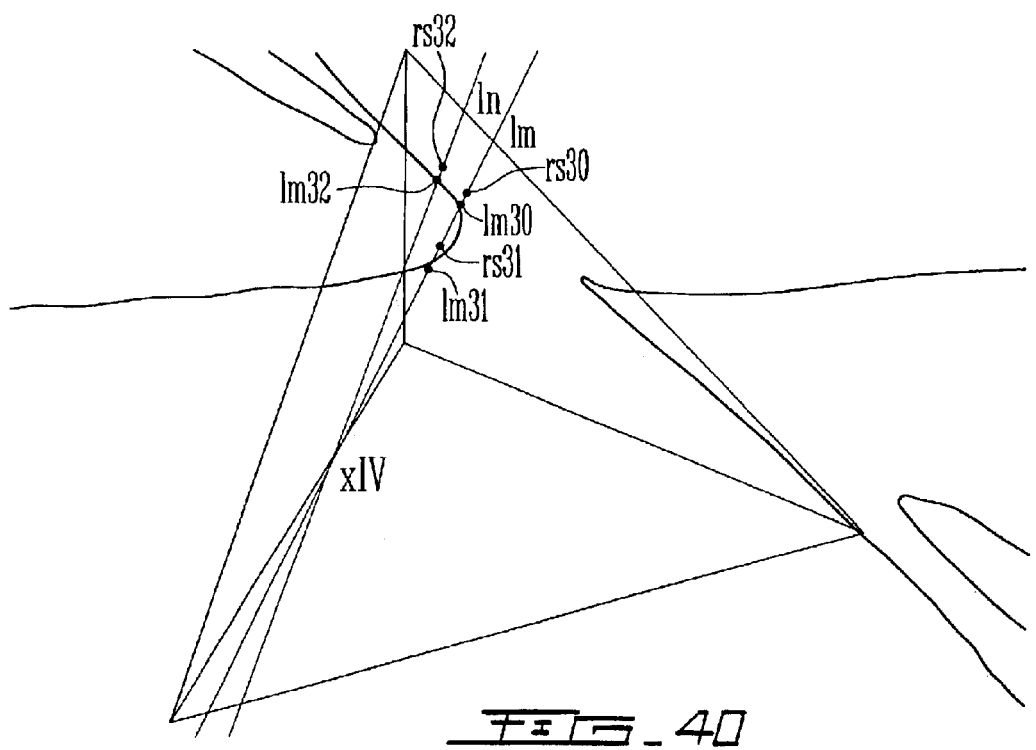
FIG_40

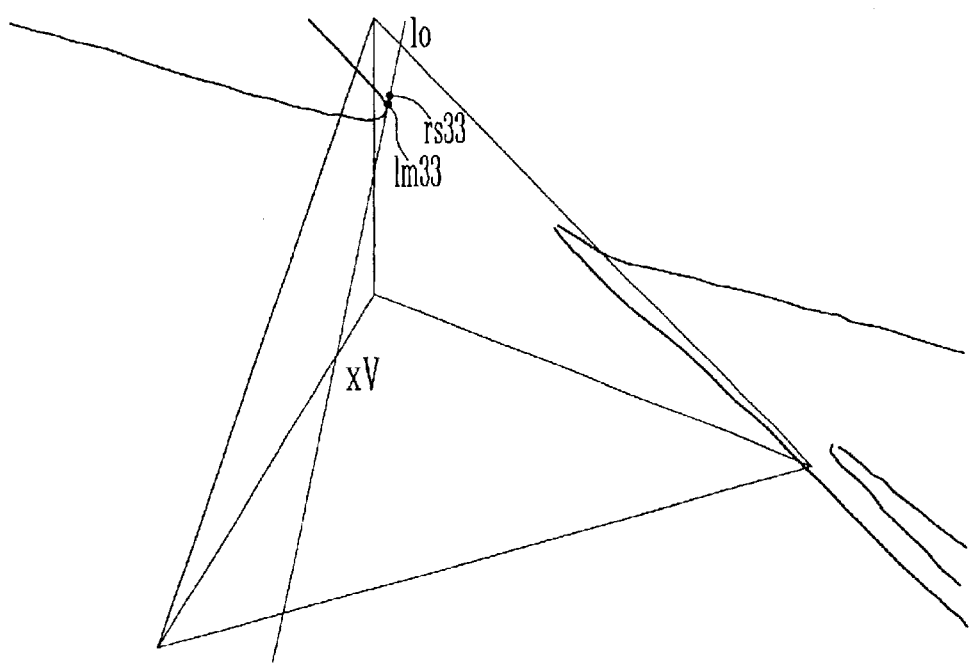
FIG_41

$$\begin{bmatrix} x0 & x1 & x2 & x3 & x4 \\ 4\alpha0 & \beta0 & 2\gamma0 & \delta0 & 4\varepsilon0 \\ 4\alpha1 & \beta1 & 2\gamma1 & \delta1 & 4\varepsilon1 \\ 4\alpha2 & \beta2 & 2\gamma2 & \delta2 & 4\varepsilon2 \\ 4\alpha3 & \beta3 & 2\gamma3 & \delta3 & 4\varepsilon3 \end{bmatrix}$$

FIG. 42

$$\begin{bmatrix} x5 & x6 & x7 & x8 & x9 \\ 4\alpha4 & \beta4 & 2\gamma4 & \delta4 & 4\varepsilon4 \\ 4\alpha5 & \beta5 & 2\gamma5 & \delta5 & 4\varepsilon5 \\ 4\alpha6 & \beta6 & 2\gamma6 & \delta6 & 4\varepsilon6 \\ 4\alpha7 & \beta7 & 2\gamma7 & \delta7 & 4\varepsilon7 \end{bmatrix}$$

FIG. 43

$$\begin{bmatrix} x10 & x11 & x12 \\ a1 & a0 & -x1 \; x5 \\ b1 & b0 & -x6 \; x0 \end{bmatrix}$$

FIG. 44

$$\begin{bmatrix} x13 & x14 & x15 & x16 \\ 2\gamma8 & \delta8 & 4\varepsilon8 & \beta8 \; y0 + 4\alpha8 \; x12 \; x0 \; x5 \\ 2\gamma9 & \delta9 & 4\varepsilon9 & \beta9 \; y0 + 4\alpha9 \; x12 \; x0 \; x5 \\ 2\gamma10 & \delta10 & 4\varepsilon10 & \beta10 \; y0 + 4\alpha10 \; x12 \; x0 \; x5 \end{bmatrix}$$

FIG. 45

$$\begin{bmatrix} x17 & x18 & x19 & x20 & \\ a1^2 & a1\,a0 & a0^2 & -x16\ x12\ x2\ x5 \\ b1^2 & b1\,b0 & b0^2 & -x16\ x12\ x7\ x0 \\ c1^2 & c1\,c0 & c0^2 & -x13 \end{bmatrix}$$

FIG. 46

$$\begin{bmatrix} x21 & x22 & x23 \\ \delta 11 & 4\varepsilon 11 & \beta 11\ y1\ +\ 2\gamma 11\ y2\ +\ 4\alpha 11\ x20\ x16\ x12\ x0\ x5 \\ \delta 12 & 4\varepsilon 12 & \beta 12\ y1\ +\ 2\gamma 12\ y2\ +\ 4\alpha 12\ x20\ x16\ x12\ x0\ x5 \end{bmatrix}$$

FIG. 47

$$\begin{bmatrix} x24 & x25 & x26 & x27 & x28 \\ a1^3 & a1^2\,a0 & a1\,a0^2 & a0^3 & -x23\ x20\ x16\ x12\ x3\ x5 \\ b1^3 & b1^2\,b0 & b1\,b0^2 & b0^3 & -x23\ x20\ x16\ x12\ x8\ x0 \\ c1^3 & c1^2\,c0 & c1\,c0^2 & c0^3 & -x23\ x20\ x14 \\ d1^3 & d1^2\,d0 & d1\,d0^2 & d0^3 & -x21 \end{bmatrix}$$

FIG. 48

$$\begin{bmatrix} x29 & x30 & x31 & x32 & x33 & x34 \\ a1^4 & a1^3\,a0 & a1^2\,a0^2 & a1\,a0^3 & a0^4 & -x28\ x23\ x20\ x16\ x12\ x4\ x5 \\ b1^4 & b1^3\,b0 & b1^2\,b0^2 & b1\,b0^3 & b0^4 & -x28\ x23\ x20\ x16\ x12\ x9\ x0 \\ c1^4 & c1^3\,c0 & c1^2\,c0^2 & c1\,c0^3 & c0^4 & -x28\ x23\ x20\ x15 \\ d1^4 & d1^3\,d0 & d1^2\,d0^2 & d1\,d0^3 & d0^4 & -x28\ x22 \\ 4\varepsilon13\ e1^4 & 4\varepsilon13\ e1^3 e0 & 4\varepsilon13\ e1^2 e0^2 & 4\varepsilon13\ e1\ e0^3 & 4\varepsilon13\ e0^4 & \beta13\ y3 + 2\gamma13\ y4 + \delta13\ y5 + 4\ \alpha13\ x28\ x23\ x20\ x16\ x12\ x0\ x5 \end{bmatrix}$$

FIG. 49

$$\begin{bmatrix} x35 & x36 & x37 & x38 & x39 \\ 4\alpha 14 & \beta 14 & 2\gamma 14 & \delta 14 & 4\varepsilon 14\ y6 \\ 4\alpha 15 & \beta 15 & 2\gamma 15 & \delta 15 & 4\varepsilon 15\ y6 \\ 4\alpha 16 & \beta 16 & 2\gamma 16 & \delta 16 & 4\varepsilon 16\ y6 \\ 4\alpha 17 & \beta 17 & 2\gamma 17 & \delta 17 & 4\varepsilon 17\ y6 \end{bmatrix}$$

FIG_50

$$\begin{bmatrix} x40 & x41 & x42 & x43 \\ \beta 18 & 2\gamma 18 & \delta 18 & 4\alpha 18\ x35\ +\ 4\varepsilon 18\ y7\ x39 \\ \beta 19 & 2\gamma 19 & \delta 19 & 4\alpha 19\ x35\ +\ 4\varepsilon 19\ y7\ x39 \\ \beta 20 & 2\gamma 20 & \delta 20 & 4\alpha 20\ x35\ +\ 4\varepsilon 20\ y7\ x39 \end{bmatrix}$$

FIG_51

$$\begin{bmatrix} x44 & x45 & x46 \\ f1 & f0 & -x43\ x36 \\ g1 & g0 & -x40 \end{bmatrix}$$

FIG_52

$$\begin{bmatrix} x47 & x48 & x49 \\ 2\gamma 21 & \delta 21 & 4\alpha 21\ x46\ x43\ x35\ +\ \beta 21\ y9\ +\ 4\ x46\ x43\ x39\ y8\ \varepsilon 21 \\ 2\gamma 22 & \delta 22 & 4\alpha 22\ x46\ x43\ x35\ +\ \beta 22\ y9\ +\ 4\ x46\ x43\ x39\ y8\ \varepsilon 22 \end{bmatrix}$$

FIG_53

$$\begin{bmatrix} x50 & x51 & x52 & x53 \\ f1^2 & f1\ f0 & f0^2 & -x49\ x46\ x43\ x37 \\ g1^2 & g1\ g0 & g0^2 & -x49\ x46\ x41 \\ h1^2 & h1\ h0 & h0^2 & -x47 \end{bmatrix}$$

FIG_54

$$\begin{bmatrix} x54 & x55 & x56 & x57 & x58 \\ f1^3 & f1^2\,f0 & f1\,f0^2 & f0^3 & -x53\;x49\;x46\;x43\;x38 \\ g1^3 & g1^2\,g0 & g1\,g0^2 & g0^3 & -x53\;x49\;x46\;x42 \\ h1^3 & h1^2\,h0 & h1\,h0^2 & h0^3 & -x53\;x48 \\ \delta 31\;i1^3 & \delta 31\;i1^2\;i0 & \delta 31\;i1\;i0^2 & \delta 31\;i0^3 & 4\alpha 23\;x53\;x49\;x46\;x43\;x35 + \beta 23\;x53\;x49\;y11 + 2\gamma 23\;y12 + 4\varepsilon 23\;x53\;x49\;x46\;x43\;x39\;y10 \end{bmatrix}$$

FIG. 55

$$\begin{bmatrix} x59 & x60 & x61 \\ \pi 3_i & \pi 2_i & -x58\ x53\ x49\ x46\ x43\ x39\ x34\ x24 \\ \pi 3_{II} & \pi 2_{II} & -x54 \end{bmatrix}$$

FIG_56A $$\begin{bmatrix} x62 & x63 & x61 \\ \pi 3_i & \pi 2_i & -x58\ x53\ x49\ x46\ x43\ x39\ x34\ x25 \\ \pi 3_{II} & \pi 2_{II} & -x55 \end{bmatrix}$$

FIG_56B $$\begin{bmatrix} x64 & x65 & x61 \\ \pi 3_i & \pi 2_i & -x58\ x53\ x49\ x46\ x43\ x39\ x34\ x26 \\ \pi 3_{II} & \pi 2_{II} & -x56 \end{bmatrix}$$

FIG_56C $$\begin{bmatrix} x66 & x67 & x61 \\ \pi 3_i & \pi 2_i & -x58\ x53\ x49\ x46\ x43\ x39\ x34\ x27 \\ \pi 3_{II} & \pi 2_{II} & -x57 \end{bmatrix}$$

FIG_56D $$\begin{bmatrix} x68 & x69 & x70 & x71 \\ 4\alpha 24 & \beta 24 & 2\gamma 24 & 4\varepsilon 24 \; x61 \; x58 \; x53 \; x49 \; x46 \; x43 \; x39 \; y13 + y16 & \delta 24 \\ 4\alpha 25 & \beta 25 & 2\gamma 25 & 4\varepsilon 25 \; x61 \; x58 \; x53 \; x49 \; x46 \; x43 \; x39 \; y13 + y16 & \delta 25 \\ 4\alpha 26 & \beta 26 & 2\gamma 26 & 4\varepsilon 26 \; x61 \; x58 \; x53 \; x49 \; x46 \; x43 \; x39 \; y13 + y16 & \delta 26 \end{bmatrix}$$

FIG_57

$$\begin{bmatrix} x72 & x73 & x74 \\ \beta 27 & 2\gamma 27 & x71 \; y20 \; \delta 27 + 4\alpha 27 \; x68 + 4\varepsilon 27 \; x71 \; x61 \; x58 \; x53 \; x49 \; x46 \; x43 \; x39 \; y17 \\ \beta 28 & 2\gamma 28 & x71 \; y20 \; \delta 28 + 4\alpha 28 \; x68 + 4\varepsilon 28 \; x71 \; x61 \; x58 \; x53 \; x49 \; x46 \; x43 \; x39 \; y17 \end{bmatrix}$$

FIG_58

$$\begin{bmatrix} x75 & x76 & x77 \\ j1 & j0 & -x74 \; x69 \\ k1 & k0 & -x72 \end{bmatrix}$$

FIG_59

$$\begin{bmatrix} x78 & x79 & x80 & x74\ x77\ x71\ y24\ \xi29 + 4\ \alpha29\ x77\ x74\ x68 + \beta29\ y25 + 4\ x77\ x74\ x71\ x61\ x58\ x53\ x49\ x46\ x43\ x39\ y21\ \varepsilon29 & x81 \\ j1^2 & j1\ j0 & j0^2 & & -x77\ x74\ x70 \\ k1^2 & k1\ k0 & k0^2 & & -x77\ x73 \\ 2\gamma 29\ 11\ 2 & 2\gamma 29\ 11\ 10 & 2\gamma 29\ 10^2 & & \end{bmatrix}$$

FIG. 60

$$\begin{bmatrix} x82 & x83 & x84 & & & & x85 & & & & & & \\ \pi 3_i^2 & \pi 3_i \, \pi 2_i & \pi 2_i^2 & & & & & & & & & & \\ \pi 3_{II} & \pi 3_{II} \, \pi 2_{II} & \pi 2_{II}^2 & & & & & & & & & & \\ \pi 3_{III} & \pi 3_{III} \, \pi 2_{III} & \pi 2_{III}^2 & -x81 & x77 & x74 & x71 & x61 & x58 & x53 & x49 & x46 & x43 & x39 & x34 & x28 & x23 & x17 \\ & & & -x81 & x77 & x74 & x71 & x61 & x58 & x74 & x71 & x61 & x58 & x50 \\ & & & & & & & -x78 & & & & & & \end{bmatrix}$$

FIG. 61A $$\begin{bmatrix} x86 & x87 & x88 & & & & x85 & & & & & & \\ \pi 3_i^2 & \pi 3_i \, \pi 2_i & \pi 2_i^2 & & & & & & & & & & \\ \pi 3_{II} & \pi 3_{II} \, \pi 2_{II} & \pi 2_{II}^2 & & & & & & & & & & \\ \pi 3_{III} & \pi 3_{III} \, \pi 2_{III} & \pi 2_{III}^2 & -x81 & x77 & x74 & x71 & x61 & x58 & x53 & x49 & x46 & x43 & x39 & x34 & x28 & x23 & x18 \\ & & & & & & & & & x74 & x71 & x61 & x58 & x51 \\ & & & & & & & -x79 & & & & & & \end{bmatrix}$$

FIG. 61B $$\begin{bmatrix} x89 & x90 & x91 & & & & x85 & & & & & & \\ \pi 3_i^2 & \pi 3_i \, \pi 2_i & \pi 2_i^2 & & & & & & & & & & \\ \pi 3_{II} & \pi 3_{II} \, \pi 2_{II} & \pi 2_{II}^2 & & & & & & & & & & \\ \pi 3_{III} & \pi 3_{III} \, \pi 2_{III} & \pi 2_{III}^2 & -x81 & x77 & x74 & x71 & x61 & x58 & x53 & x49 & x46 & x43 & x39 & x34 & x28 & x23 & x19 \\ & & & & & & & & & x74 & x71 & x61 & x58 & x52 \\ & & & & & & & -x80 & & & & & & \end{bmatrix}$$

$$\begin{bmatrix} x92 & x93 & x94 \\ 4\alpha30 & \beta30 & 2y35\ \gamma30 + 4\ x85\ x81\ x77\ x74\ x71\ y34\ \delta30 + 4\ x85\ x81\ x77\ x74\ x71\ x61\ x58\ x53\ x49\ x46\ x43\ x39\ y33\ \varepsilon30 \\ 4\alpha31 & \beta31 & 2y35\ \gamma31 + 4\ x85\ x81\ x77\ x74\ x71\ y34\ \delta31 + 4\ x85\ x81\ x77\ x74\ x71\ x61\ x58\ x53\ x49\ x46\ x43\ x39\ y33\ \varepsilon31 \end{bmatrix}$$

FIG. 63

$$\begin{bmatrix} x95 & x96 & x97 \\ m1 & m0 & -93 \\ \beta32\ n1 & \beta32\ n0 & \beta32\ x94\ x85\ x81\ x77\ x74\ x71\ y37 + 4\ x94\ x85\ x81\ x77\ x74\ x71\ x61\ x58\ x53\ x49\ x46\ x43\ x39\ y63\ \varepsilon32 + 4\ \alpha32\ x82 + 2\ x94\ y38\ \gamma32 \end{bmatrix}$$

$$\begin{bmatrix} x98 & x99 & x100 & x101 & x102 \\ \pi 3_i^3 & \pi 3_i^2 \pi 2_i & \pi 3_i \pi 2_i^2 & \pi 2_i^3 & \\ \pi 3_{II}^3 & \pi 3_{II}^2 \pi 2_{II} & \pi 3_{II} \pi 2_{II}^2 & \pi 2_{II}^3 & -x97\ x94\ x85\ x81\ x77\ x74\ x71\ x61\ x58\ x53\ x49\ x46\ x43\ x39\ x34\ x28\ x23\ x20\ x16\ x10 \\ \pi 3_{III}^3 & \pi 3_{III}^2 \pi 2_{III} & \pi 3_{III} \pi 2_{III}^2 & \pi 2_{III}^3 & -x97\ x94\ x85\ x81\ x77\ x74\ x71\ x61\ x58\ x53\ x49\ x44 \\ \pi 3_{IV}^3 & \pi 3_{IV}^2 \pi 2_{IV} & \pi 3_{IV} \pi 2_{IV}^2 & \pi 2_{IV}^3 & -x97\ x94\ x85\ x81\ x75 \\ & & & & -x95 \end{bmatrix}$$

FIG. 64A $$\begin{bmatrix} x103 & x104 & x105 & x106 & x102 \\ \pi 3_i^3 & \pi 3_i^2 \pi 2_i & \pi 3_i \pi 2_i^2 & \pi 2_i^3 & \\ \pi 3_{II}^3 & \pi 3_{II}^2 \pi 2_{II} & \pi 3_{II} \pi 2_{II}^2 & \pi 2_{II}^3 & -x97\ x94\ x85\ x81\ x77\ x74\ x71\ x61\ x58\ x53\ x49\ x46\ x43\ x39\ x34\ x28\ x23\ x20\ x16\ x11 \\ \pi 3_{III}^3 & \pi 3_{III}^2 \pi 2_{III} & \pi 3_{III} \pi 2_{III}^2 & \pi 2_{III}^3 & -x97\ x94\ x85\ x81\ x77\ x74\ x71\ x61\ x58\ x53\ x49\ x45 \\ \pi 3_{IV}^3 & \pi 3_{IV}^2 \pi 2_{IV} & \pi 3_{IV} \pi 2_{IV}^2 & \pi 2_{IV}^3 & -x97\ x94\ x85\ x81\ x76 \\ & & & & -x96 \end{bmatrix}$$

FIG. 64B $$[x107, x108, x109, x110, x111, x112],$$
$$[\pi 3_I^4, \pi 3_I^3 \pi 2_I, \pi 3_I^2 \pi 2_I^2, \pi 3_I \pi 2_I^3, \pi 2_I^4, -x102\ x97\ x94\ x85\ x81\ x77\ x74\ x71\ x61\ x58\ x53\ x49\ x46\ x43\ x39\ x34\ x28\ x23\ x20\ x16\ x12\ x0\ x5],$$
$$[\pi 3_{II}^4, \pi 3_{II}^3 \pi 2_{II}, \pi 3_{II}^2 \pi 2_{II}^2, \pi 3_{II} \pi 2_{II}^3, \pi 2_{II}^4, -x102\ x97\ x94\ x85\ x81\ x77\ x74\ x71\ x61\ x58\ x53\ x49\ x46\ x43\ x25],$$
$$[\pi 3_{III}^4, \pi 3_{III}^3 \pi 2_{III}, \pi 3_{III}^2 \pi 2_{III}^2, \pi 3_{III} \pi 2_{III}^3, \pi 2_{III}^4, -x102\ x97\ x94\ x85\ x81\ x77\ x74\ x68],$$
$$[\pi 3_{IV}^4, \pi 3_{IV}^3 \pi 2_{IV}, \pi 3_{IV}^2 \pi 2_{IV}^2, \pi 3_{IV} \pi 2_{IV}^3, \pi 2_{IV}^4, -x102\ x97\ x92],$$
$$[4\,\alpha 33\,\pi 3_V^4,\ 4\,\alpha 33\,\pi 3_V^3\,\pi 2_V,\ 4\,\alpha 33\,\pi 3_V^2\,\pi 2_V^2,\ 4\,\alpha 33\,\pi 3_V\,\pi 2_V^3,\ 4\,\alpha 33\,\pi 2_V^4,$$
$$x83\ x94\ x74\ x77\ x85\ x71\ x97\ x102\ x81\ y49 + 4\ x102\ x97\ x94\ x85\ x81\ x77\ x74\ x71\ x61\ x58\ x53\ x49\ x46\ x43\ x39\ y48\ \varepsilon 33 + \beta 33\ y51 + 2\ x102\ x97\ x94\ y50\ \gamma 33\ ],$$

*FIG. 65*

| | $\alpha^\rho_{n,0} = \alpha$ | $\alpha^\rho_{n,1} = \beta$ | $\alpha^\rho_{n,2} = \gamma$ | $\alpha^\rho_{n,3} = \delta$ | $\alpha^\rho_{n,4} = \varepsilon$ |
|---|---|---|---|---|---|
| $Z^1_4$ | $4\rho\lambda^3$ | $\lambda^2(\lambda\sigma+3\mu\rho)$ | $2\lambda\mu(\lambda\sigma+\mu\rho)$ | $\mu^2(3\lambda\sigma+\mu\rho)$ | $4\sigma\mu^3$ |
| $Z^2_4$ | $6\lambda^2\rho^2$ | $3\lambda\rho(\mu\rho+\lambda\sigma)$ | $\lambda^2\sigma^2+4\lambda\mu\rho\sigma+\mu^2\rho^2$ | $3\mu\sigma(\lambda\sigma+\mu\rho)$ | $6\mu^2\sigma^2$ |
| $Z^3_4$ | $4\lambda\rho^3$ | $\rho^2(3\lambda\sigma+\mu\rho)$ | $2\rho\sigma(\lambda\sigma+\mu\rho)$ | $\sigma^2(\lambda\sigma+3\mu\rho)$ | $4\mu\sigma^3$ |
| $Z^1_3$ | $3\lambda^2\rho$ | $\lambda(2\rho\mu+\sigma\lambda)$ | $\mu(\rho\mu+2\sigma\lambda)$ | $3\mu^2\sigma$ | |
| $Z^2_3$ | $3\lambda\rho^2$ | $\rho(\rho\mu+2\sigma\lambda)$ | $\sigma(2\rho\mu+\sigma\lambda)$ | $3\mu\sigma^2$ | |
| $Z^1_2$ | $2\lambda\rho$ | $\sigma\lambda+\mu\rho$ | $2\mu\sigma$ | | |

FIG. 66

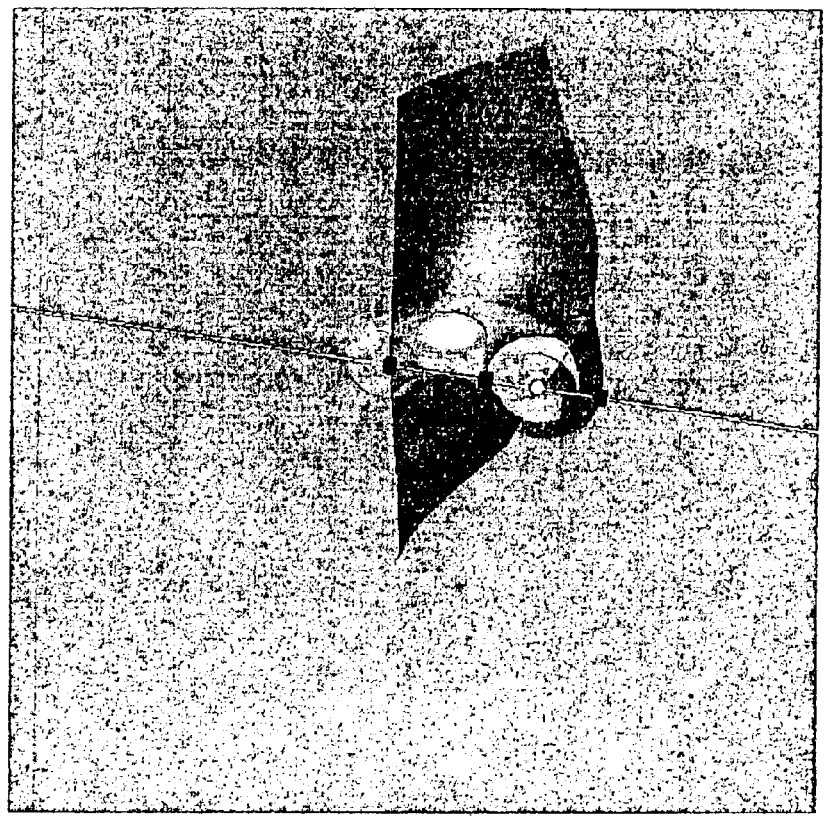
FIG_69

$$\begin{vmatrix} a_{11} & a_{12} & a_{13} \cdots a_{1n} \\ a_{21} & a_{22} & a_{23} \cdots a_{2n} \\ \vdots & \vdots & \vdots \\ a_{n1} & a_{n2} & a_{n3} \cdots a_{nn} \end{vmatrix} = a_{11} \begin{vmatrix} a_{22} & a_{23} \cdots a_{2n} \\ \vdots & \vdots \\ a_{n2} & a_{n3} \cdots a_{nn} \end{vmatrix} - a_{12} \begin{vmatrix} a_{21} & a_{23} \cdots a_{2n} \\ \vdots & \vdots \\ a_{n1} & a_{n3} \cdots a_{nn} \end{vmatrix}$$

$$+ \ldots + (-1)^{n+1} a_{1n} \begin{vmatrix} a_{21} & a_{22} \cdots a_{2(n-1)} \\ \vdots & \vdots \\ a_{n1} & a_{n2} \cdots a_{n(n-1)} \end{vmatrix}$$

$$\begin{vmatrix} x0 & x1 & x2 & x3 & x4 \\ p0\alpha0 & p1\beta0 & p2\gamma0 & p3\delta0 & p4\varepsilon0 \\ p0\alpha1 & p1\beta1 & p2\gamma1 & p3\delta1 & p4\varepsilon1 \\ p0\alpha2 & p1\beta2 & p2\gamma2 & p3\delta2 & p4\varepsilon2 \\ p0\alpha3 & p1\beta3 & p2\gamma3 & p3\delta3 & p4\varepsilon3 \end{vmatrix} = x0 \begin{vmatrix} p1\beta0 & p2\gamma0 & p3\delta0 & p4\varepsilon0 \\ p1\beta1 & p2\gamma1 & p3\delta1 & p4\varepsilon1 \\ p1\beta2 & p2\gamma2 & p3\delta2 & p4\varepsilon2 \\ p1\beta3 & p2\gamma3 & p3\delta3 & p4\varepsilon3 \end{vmatrix} + x1 \begin{vmatrix} p0\alpha0 & p2\gamma0 & p3\delta0 & p4\varepsilon0 \\ p0\alpha1 & p2\gamma1 & p3\delta1 & p4\varepsilon1 \\ p0\alpha2 & p2\gamma2 & p3\delta2 & p4\varepsilon2 \\ p0\alpha3 & p2\gamma3 & p3\delta3 & p4\varepsilon3 \end{vmatrix}$$

$$+ \ldots + x4 \begin{vmatrix} p0\alpha0 & p1\beta0 & p2\gamma0 & p3\delta0 \\ p0\alpha1 & p1\beta1 & p2\gamma1 & p3\delta1 \\ p0\alpha2 & p1\beta2 & p2\gamma2 & p3\delta2 \\ p0\alpha3 & p1\beta3 & p2\gamma3 & p3\delta3 \end{vmatrix}$$

where:

$\alpha = \rho\lambda^3$
$\beta = \gamma^2(\lambda\sigma + 3\mu\rho)$
$\gamma = \lambda\mu(\lambda\sigma + \mu\rho)$
$\delta = \mu^2(3\lambda\sigma + \mu\rho)$
$\varepsilon = \sigma\mu^3$ $$\Delta double_1 = \begin{vmatrix} p_0\alpha_2 & p_1\beta_2 \\ p_0\alpha_3 & p_1\beta_3 \end{vmatrix}, \quad \Delta double_2 = \begin{vmatrix} p_0\alpha_2 & p_2\gamma_2 \\ p_0\alpha_3 & p_2\gamma_3 \end{vmatrix}$$

$$\Delta double_3 = \begin{vmatrix} p_0\alpha_2 & p_3\delta_2 \\ p_0\alpha_3 & p_3\delta_3 \end{vmatrix}, \quad \Delta double_4 = \begin{vmatrix} p_0\alpha_2 & p_3\varepsilon_2 \\ p_0\alpha_3 & p_3\varepsilon_3 \end{vmatrix},$$

$$\Delta double_5 = \begin{vmatrix} p_0\beta_2 & p_3\gamma_2 \\ p_0\beta_3 & p_3\gamma_3 \end{vmatrix}, \quad \Delta double_6 = \begin{vmatrix} p_0\beta_2 & p_3\delta_2 \\ p_0\beta_3 & p_3\delta_3 \end{vmatrix},$$

$$\Delta double_7 = \begin{vmatrix} p_0\beta_2 & p_3\varepsilon_2 \\ p_0\beta_3 & p_3\varepsilon_3 \end{vmatrix}, \quad \Delta double_8 = \begin{vmatrix} p_0\gamma_2 & p_3\delta_2 \\ p_0\gamma_3 & p_3\delta_3 \end{vmatrix}$$

$$\Delta double_9 = \begin{vmatrix} p_0\gamma_2 & p_3\varepsilon_2 \\ p_0\gamma_3 & p_3\varepsilon_3 \end{vmatrix}, \quad \Delta double_{10} = \begin{vmatrix} p_0\delta_2 & p_3\varepsilon_2 \\ p_0\delta_3 & p_3\varepsilon_3 \end{vmatrix}$$

FIG_72

$$\Delta triple_1 = \begin{vmatrix} p_0\alpha_1 & p_1\beta_1 & p_2\gamma_1 \\ p_0\alpha_2 & p_1\beta_2 & p_2\gamma_2 \\ p_0\alpha_3 & p_1\beta_3 & p_2\gamma_3 \end{vmatrix}, \Delta triple_2 = \begin{vmatrix} p_0\alpha_1 & p_1\beta_1 & p_3\delta_1 \\ p_0\alpha_2 & p_1\beta_2 & p_3\delta_2 \\ p_0\alpha_3 & p_1\beta_3 & p_3\delta_3 \end{vmatrix}$$

$$\Delta triple_3 = \begin{vmatrix} p_0\alpha_1 & p_1\beta_1 & p_4\varepsilon_1 \\ p_0\alpha_2 & p_1\beta_2 & p_4\varepsilon_2 \\ p_0\alpha_3 & p_1\beta_3 & p_4\varepsilon_3 \end{vmatrix}, \Delta triple_4 = \begin{vmatrix} p_0\alpha_1 & p_2\gamma_1 & p_3\delta_1 \\ p_0\alpha_2 & p_2\gamma_2 & p_3\delta_2 \\ p_0\alpha_3 & p_2\gamma_3 & p_3\delta_3 \end{vmatrix},$$

$$\Delta triple_5 = \begin{vmatrix} p_0\alpha_1 & p_2\gamma_1 & p_4\varepsilon_1 \\ p_0\alpha_2 & p_2\gamma_2 & p_4\varepsilon_2 \\ p_0\alpha_3 & p_2\gamma_3 & p_4\varepsilon_3 \end{vmatrix}, \Delta triple_6 = \begin{vmatrix} p_0\alpha_1 & p_3\delta_1 & p_4\varepsilon_1 \\ p_0\alpha_2 & p_3\delta_2 & p_4\varepsilon_2 \\ p_0\alpha_3 & p_3\delta_3 & p_4\varepsilon_3 \end{vmatrix},$$

$$\Delta triple_7 = \begin{vmatrix} p_1\beta_1 & p_2\gamma_1 & p_3\delta_1 \\ p_1\beta_2 & p_2\gamma_2 & p_3\delta_2 \\ p_1\beta_3 & p_2\gamma_3 & p_3\delta_3 \end{vmatrix}, \Delta triple_8 = \begin{vmatrix} p_1\beta_1 & p_2\gamma_1 & p_4\varepsilon_1 \\ p_1\beta_2 & p_2\gamma_2 & p_4\varepsilon_2 \\ p_1\beta_3 & p_2\gamma_3 & p_4\varepsilon_3 \end{vmatrix}$$

$$\Delta triple_9 = \begin{vmatrix} p_1\beta_1 & p_3\delta_1 & p_4\varepsilon_1 \\ p_1\beta_2 & p_3\delta_2 & p_4\varepsilon_2 \\ p_1\beta_3 & p_3\delta_3 & p_4\varepsilon_3 \end{vmatrix}, \Delta triple_{10} = \begin{vmatrix} p_2\gamma_1 & p_3\delta_1 & p_4\varepsilon_1 \\ p_2\gamma_2 & p_3\delta_2 & p_4\varepsilon_2 \\ p_2\gamma_3 & p_3\delta_3 & p_4\varepsilon_3 \end{vmatrix}$$

FIG. 73

$$\Delta \text{quadruple}_1 = \begin{vmatrix} p0\alpha0 & p1\beta0 & p2\gamma0 & p3\delta0 \\ p0\alpha1 & p1\beta1 & p2\gamma1 & p3\delta1 \\ p0\alpha2 & p1\beta2 & p2\gamma2 & p3\delta2 \\ p0\alpha3 & p1\beta3 & p2\gamma3 & p3\delta3 \end{vmatrix}, \quad \Delta \text{quadruple}_2 = \begin{vmatrix} p0\alpha0 & p1\beta0 & p2\gamma0 & p4\varepsilon0 \\ p0\alpha1 & p1\beta1 & p2\gamma1 & p4\varepsilon1 \\ p0\alpha2 & p1\beta2 & p2\gamma2 & p4\varepsilon2 \\ p0\alpha3 & p1\beta3 & p2\gamma3 & p4\varepsilon3 \end{vmatrix}$$

$$\Delta \text{quadruple}_3 = \begin{vmatrix} p0\alpha0 & p1\beta0 & p3\delta0 & p4\varepsilon0 \\ p0\alpha1 & p1\beta1 & p3\delta1 & p4\varepsilon1 \\ p0\alpha2 & p1\beta2 & p3\delta2 & p4\varepsilon2 \\ p0\alpha3 & p1\beta3 & p3\delta3 & p4\varepsilon3 \end{vmatrix}, \quad \Delta \text{quadruple}_4 = \begin{vmatrix} p1\beta0 & p2\gamma0 & p3\delta0 & p4\varepsilon0 \\ p1\beta1 & p2\gamma1 & p3\delta1 & p4\varepsilon1 \\ p1\beta2 & p2\gamma2 & p3\delta2 & p4\varepsilon2 \\ p1\beta3 & p2\gamma3 & p3\delta3 & p4\varepsilon3 \end{vmatrix}$$

$$\Delta \text{quadruple}_5 = \begin{vmatrix} p0\alpha0 & p2\gamma0 & p3\delta0 & p4\varepsilon0 \\ p0\alpha1 & p2\gamma1 & p3\delta1 & p4\varepsilon1 \\ p0\alpha2 & p2\gamma2 & p3\delta2 & p4\varepsilon2 \\ p0\alpha3 & p2\gamma3 & p3\delta3 & p4\varepsilon3 \end{vmatrix}$$

FIG. 74

METHOD AND APPARATUS FOR GENERATING M-DEGREE FORMS IN A N-DIMENSION SPACE

This application claims the benefit of Provisional Application No. 60/339,406, filed Dec. 14, 2001.

FIELD OF THE INVENTION

The invention pertains to the field of computer graphics and more precisely to the field of modeling forms.

BACKGROUND OF THE INVENTION

The representation of objects in space is not a new art. For many centuries, people have tried to represent forms or shapes in space for various purposes ranging from Architecture to Art. Most modern computer graphics systems use a very simple representation of forms, namely polygons that are combined in great numbers to compose complex 3D forms. Polygons are mathematically very simple to specify and to use in the generation of the display output.

A form may be represented by a surface in two different ways.

A first way to represent a form is by using a parametric surface. Parametric surfaces comprises, for instance, Bezier curves, Splines, nonuniform rational B-splines (NURBS), etc. This first way to represent forms is widely used by computers, and in fact, the parametric surfaces are linked to the base polygon structure of the form. However, it will be appreciated that these surfaces are approximation. To overcome such limitations, it is possible to combine a plurality of parametric surfaces to represent a more complex form.

A person skilled in the art will appreciate the fact that such an approach is resource intensive. Using such simplified "primitives" to build a representation of a complex object required a great deal of specification for an object, and also requires significant data processing and management to create and display forms. It will also be appreciated that such an approach provides often only an approximation of the form. This is particularly the case when a complex form must be created. When such a form is magnified, the boundaries between the primitives are often noticeable.

A second way to represent the form is by using implicit surfaces. Implicit surfaces may be either of the algebraic form or of the geometric form as explained in Introduction to Implicit surfaces by Chandrajit Bajaj et al and published by Morgan Kaufmann Publishers, Inc, the specification of which is enclosed by reference.

For instance, a sphere centered at the origin can be defined in an algebraic form using its algebraic equation, $x^2+y^2+z^2=r^2$, and the size of the sphere determined by setting the value of its radius 'r'. The algebraic equation for a sphere having its center at coordinates (a,b,c) is $(x-a)^2+(y-b)^2+(z-c)^2=r^2$. A sphere is defined in the geometric form using geometric properties. In this particular case, the radius and the center are used to uniquely define the surface. When a substantial portion of a form is represented by an algebraic expression, detail is not lost when the form is displayed with great magnification. In the case of a sphere, it will also be appreciated that the form is represented by four values, namely a,b,c,r, while a parametric expression based on Bezier primitives would require a much larger number of components to define the form.

A person skilled in the art will note that it is actually very difficult to provide an equation for a high order surface used to represent a complex form in general. While a general equation can be used for a sphere, it is a challenge to provide a general system able to provide an algebraic expression for a form as defined by its geometric properties, such as center and radius. In most cases, the derivation of the algebraic equation corresponding to a form defined by geometric properties is not only computationally complex and time consuming, but also unpredictable and unstable, namely the algorithms lead to unsolvable equations. While a combination of more simple algebraic forms may be used to create a shape representing the form, it will be appreciated that such way is not efficient as it is also highly resource intensive. As a consequence, a transfer of data related to a shape representing a form requires a large bandwidth. It will also be appreciated that it is usually not possible to have an idea of the shape when an algebraic form is used.

Applicant, Jean Francois Rotgé, demonstrated in his thesis "L'Arithmetique des Formes: Une introduction à la logique de l'espace", Chapter 55 how to define second order 3D surfaces by their geometric properties. The approach demonstrated in the thesis is not generally known or applied in the art of computer graphics, and is based on mathematics that cannot be extended to higher orders. Second order forms, such as spheres, ellipsoids, hyperboloids and the like are of relative simplicity in comparison to higher order forms. By combining such second order surfaces, it is possible to generate a shape for representing a complex form. Unfortunately, since the method is restricted to the second order, it is of limited value for modeling complex objects.

In view of the above, there is a need for a method and apparatus that will overcome the above-identified drawbacks.

SUMMARY OF THE INVENTION

It is an object of the invention to provide a method and apparatus for determining the algebraic coefficients of a fixed m-degree form in an n-dimension space for improved display in a computer graphics system. Preferably, m is greater than 2, and typically n is three. In the case of four dimensional forms, the fourth dimension is preferably time, and the displayed forms can thus be animated.

It is another object of the invention to provide a method and apparatus for determining the algebraic coefficients of a plurality of m-degree forms in an n-dimension space used to generate a complex form for improved display of the complex form in a computer graphics system.

It is another object of the invention to provide a method and apparatus for determining the algebraic coefficients of a fixed m-degree form in an n-dimension space for improved display in a computer graphics system and that will operate using integer operations.

Yet another object of the invention is to provide a framework for generating a m-degree form.

Yet another object of the invention is to provide a method and apparatus for enabling an operator to modify in a controlled manner a shape in an interactive manner and to provide data identifying the modified shape.

Yet another object of the invention is to provide a method and apparatus for enabling a user to modify an m-degree form in an n-dimension space in a flexible way.

According to one broad aspect of the invention, there is provided a computer graphics design system having an interface for defining a desired 3D form by geometric properties, means for converting the geometric properties into an algebraic expression of order greater than two representing the desired form, and means for providing a graphics output of the form using the algebraic expression, wherein the means for converting are stable for all possible geometric properties.

According to another broad aspect of the invention, there is provided a computer graphics design system having a user interface for defining a desired 3D form by geometric properties using a reference simplex imposing constraints on values defining the geometric properties, means for converting the geometric properties into an algebraic expression of order greater than two representing the desired form, means for providing a graphics output of the form using the algebraic expression, and means for adjusting the reference simplex with respect to the desired form to facilitate further definition of the form using the reference simplex as adjusted.

According to an aspect of the invention, there is provided a method for generating an m-degree form using algebraic coefficients of an equation defining the m-degree form in an n-dimension space using a plurality of points defining the form, the method comprising the steps of providing a framework, comprising more than one geometric surface, each of the more than one geometric surface comprising at least one line, each of the at least one line comprising at least one point of the plurality of points, providing a solving equation using the equation defining the m-degree form, the solving equation depending on at least three points, for each of the plurality of points, generating a corresponding equation by applying the solving equation to each of the plurality of points and two points located on one of the more than one geometric surface, the two selected points defining the line of the framework where each of the plurality of points is, resolving the generated corresponding equations in an iterative manner to provide the algebraic coefficients of the m-degree form; the iterative manner consisting in handling the generated equation using each of the plurality of points in a certain order, the certain order consisting in selecting the generated corresponding equation corresponding to a point located on the line having the highest number of points on it and the line located in the at least one geometric surface of the framework where there is the highest number of lines on it and generating the m-degree form using the provided algebraic coefficients of the m-degree form.

According to another object of the invention, there is provided an apparatus for generating a m-degree form using algebraic coefficients of an equation defining the m-degree form in an n-dimension space using a plurality of points defining the form, the apparatus comprising an object memory, comprising more than one geometric surface, each of the more than one geometric surface comprising at least one line, each of the at least one line comprising at least one point of the plurality of points, a control point to algebraic converter unit receiving each of the plurality of points and a solving equation defined using the equation defining the m-degree form and depending on at least three points, the control point to algebraic converter unit generating a corresponding equation by applying the solving equation to each of the plurality of points and two points located on one of the more than one geometric surface, the two selected points defining the line of the framework where each of the plurality of points is and resolving the generated corresponding equations in an iterative manner to provide the algebraic coefficients of the m-degree form; the iterative manner consisting in handling the generated equation using each of the plurality of points in a certain order, the certain order consisting in selecting the generated corresponding equation corresponding to a point located on the line having the highest number of points on it and the line located in the at least one geometric surface of the framework where there is the highest number of lines on it, and an outputting unit, receiving the provided algebraic coefficients of the m-degree form and generating the m-degree form.

According to another object of the invention, there is provided A method for monitoring a deformation of an m-degree form using algebraic coefficients of an equation defining the m-degree form in an n-dimension space using a plurality of points defining the form, the method comprising the steps of providing a framework in accordance with a modification of a form planned, the framework comprising more than one geometric surface, each of the more than one geometric surface comprising at least one line, each of the at least one line comprising at least one point of the plurality of points, modifying at least one part of the provided framework in accordance with the modification of the form planned, providing a solving equation using the equation defining the m-degree form, the solving equation depending on at least three points, for each of the plurality of points, generating a corresponding equation by applying the solving equation to each of the plurality of points and two points located on one of the more than one geometric surface, the two selected points defining the line of the framework where each of the plurality of points is, resolving the generated corresponding equations in an iterative manner to provide the algebraic coefficients of the m-degree modified form; the iterative manner consisting in handling the generated equation using each of the plurality of points in a certain order, the certain order consisting in selecting the generated corresponding equation corresponding to a point located on the line having the highest number of points on it and the line located in the at least one geometric surface of the framework where there is the highest number of lines on it and outputting the algebraic coefficients of the modified form.

BRIEF DESCRIPTION OF THE DRAWINGS

FIG. 1a is a diagram which shows a point in Cartesian geometry;

FIG. 1b is a diagram which shows a point with a reference simplex in projective geometry;

FIG. 3 shows how a polar point is created using a related non-polar point in one embodiment;

FIG. 4a shows the number of geometric conditions necessary for a quadric in a 3-dimension space; in this embodiment of the invention, three sections are defined and a fixed number of lines and points is introduced for each defined section;

FIG. 4b shows the number of geometric conditions necessary for a cubic in a 3-dimension space; in this embodiment of the invention, four sections are defined and a fixed number of lines and points is introduced for each defined section;

FIG. 4c shows the number of geometric conditions necessary for a quartic in a 3-dimension space; in this embodiment of the invention, five sections are defined and a fixed number of lines and points is introduced for each defined section;

FIG. 5a shows a first embodiment of the sections for defining a cyclid using a quartic;

FIG. 5b shows a second embodiment of the sections for defining a cyclid using a quartic;

FIG. 6 is a block diagram which shows each component of the preferred embodiment of the invention;

FIG. 7 is a flow chart which shows the various steps performed in the preferred embodiment of the invention; according to a first step, data about a form is provided; then according to a second step, control points of the form are modified; then according to a third step, the algebraic coefficients of the modified form are computed;

FIG. 8 is a flow chart which shows another embodiment of how data about a form is provided; in this embodiment data is provided using existing control points;

FIG. 9 is a flow chart which shows another alternative embodiment of how data about a form is provided; in this other alternative embodiment, data is provided using an existing algebraic equation, the existing algebraic equation is then converted into control points;

FIG. 10 is a flow chart which shows another alternative embodiment of how data about a form is provided; in this other alternative embodiment, data is provided using an existing form;

FIG. 17 is a screenshot of a first quadric;

FIG. 18 is a screenshot which shows three sections of the first quadric, the control points and the reference simplex;

FIG. 19 is a screenshot which shows the quadric, three sections of the first quadric, the control points and the reference simplex;

FIG. 20 is a screenshot of a second quadric;

FIG. 21 is a screenshot which shows three sections of the second quadric, the control points and the reference simplex;

FIG. 22 is a screenshot which shows the second quadric, three sections of the second quadric, the control points and the reference simplex;

FIG. 25 is a screenshot which shows the third quadric, three sections of the third quadric, the control points and the reference simplex;

FIG. 26 is a screenshot of a fourth quadric;

FIG. 27 is a screenshot which shows three sections of the fourth quadric, the control points and the reference simplex;

FIG. 28 is a screenshot which shows the fourth quadric, three sections of the fourth quadric, the control points and the reference simplex;

FIG. 29 is a flow chart which shows the steps performed in order to generate the algebraic coefficients when the expression of the coefficient is known;

FIG. 32 is a flow chart which shows how the equation is provided;

FIG. 33 is a flow chart which shows the steps performed in order to find out the expression of the coefficients;

FIG. 34a is a table which provide the algebraic equation of a quadric;

FIG. 34b is a table which provide the algebraic equation of a quartic;

FIG. 35 is a screenshot which shows 5 sections of the quartic;

FIG. 36 is a screenshot which shows the quartic with 15 lines;

FIG. 37 is a screenshot which shows a first section of the quartic; the first section comprises 5 lines;

FIG. 38 is a screenshot which shows a second section of the quartic; the second section comprises 4 lines;

FIG. 39 is a screenshot which shows a third section of the quartic; the third section comprises 3 lines;

FIG. 40 is a screenshot which shows a fourth section of the quartic; the fourth section comprises 2 lines;

FIG. 41 is a screenshot which shows a fifth section of the quartic; the fifth section comprises 1 line;

FIG. 42 shows equation system Eq. 2;
FIG. 43 shows equation system Eq. 3;
FIG. 44 shows equation system Eq. 5;
FIG. 45 shows equation system Eq. 7;
FIG. 46 shows equation system Eq. 8;
FIG. 47 shows equation system Eq. 10;
FIG. 48 shows equation system Eq. 11;
FIG. 49 shows equation system Eq. 14;
FIG. 50 shows equation system Eq. 17;
FIG. 51 shows equation system Eq. 19;
FIG. 52 shows equation system Eq. 21;
FIG. 53 shows equation system Eq. 23;
FIG. 54 shows equation system Eq. 24;
FIG. 55 shows equation system Eq. 27;
FIG. 56A shows equation system Eq. 29;
FIG. 56B shows equation system Eq. 31;
FIG. 56C shows equation system Eq. 33;
FIG. 56D shows equation system Eq. 35;
FIG. 57 shows equation system Eq. 36;
FIG. 58 shows equation system Eq. 38;
FIG. 59 shows equation system Eq. 40;
FIG. 60 shows equation system Eq. 42;
FIG. 61A shows equation system Eq. 44;
FIG. 61B shows equation system Eq. 46;
FIG. 61C shows equation system Eq. 48;
FIG. 62 shows equation system Eq. 49;
FIG. 63 shows equation system Eq. 53;
FIG. 64A shows equation system Eq. 55;
FIG. 64B shows equation system Eq. 57;
FIG. 65 shows equation system Eq. 60;

FIG. 66 is a table which shows the parameters characterizing a line for a polarity of degree 1, 2 and 3 for an algebraic surface of degree 2, 3 and 4.

FIG. 69 is a screenshot which shows a quartic together with three polar points located on a polar surface of degree 3 and a non-polar point;

FIG. 70 shows a decomposition of a determinant into a sum of minors;

FIG. 71 shows a decomposition of a determinant into a sum of minors in the case of a quartic;

FIG. 72 shows 10 2×2 minors;

FIG. 73 shows 10 3×3 minors; and

FIG. 74 shows 5 4×4 minors.

PREFERRED EMBODIMENT OF THE INVENTION

Brief Introduction to Projective Geometry

Figure 2:
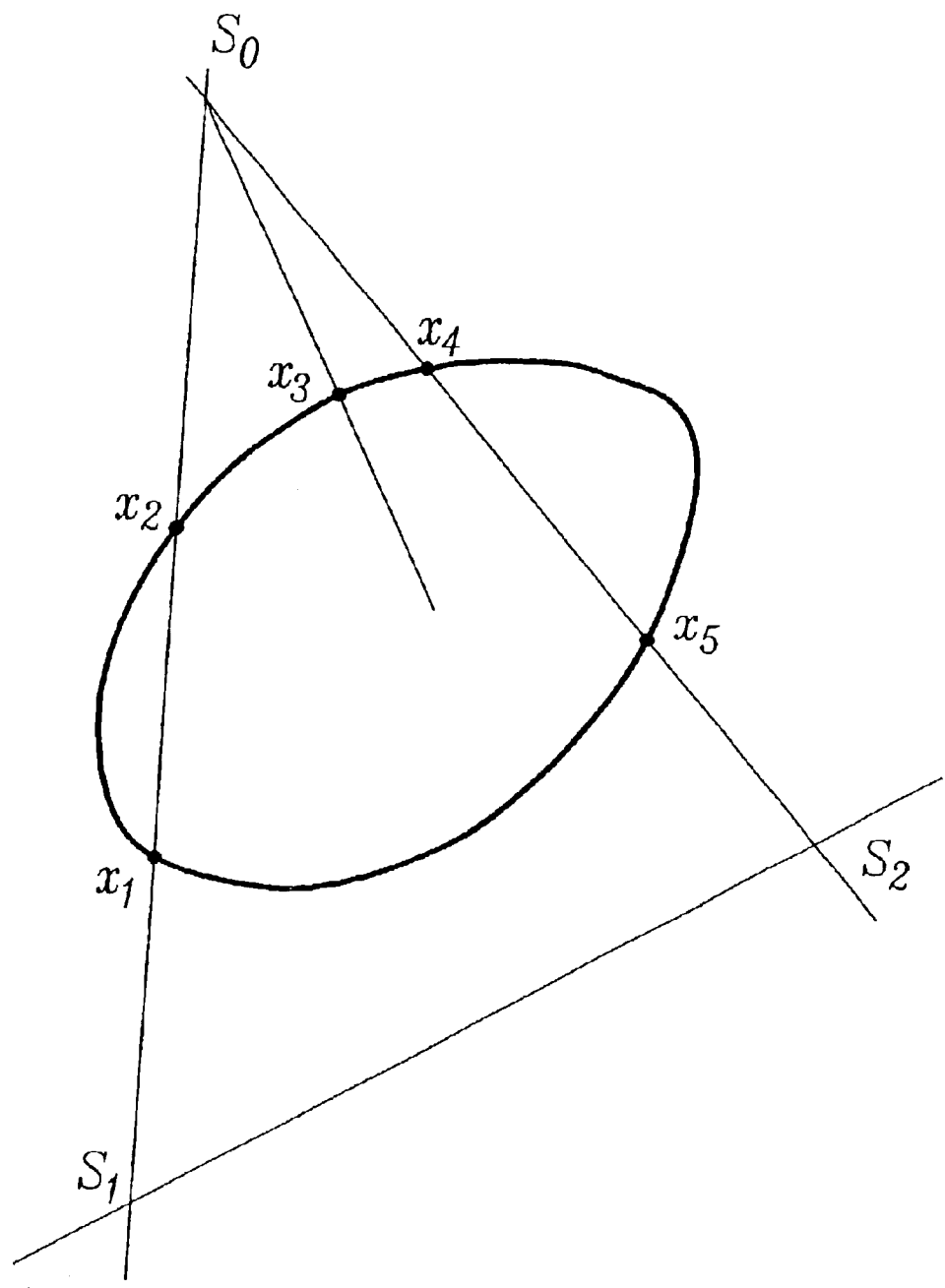
FIG. 2 is a diagram which shows a quadric in a two-dimension space with a reference simplex; four intersection points are necessary to fully define the quadric.

The origin of projective geometry is found in the work of Pappus and Gerard Désargue. It became a discipline with the work of J. V. Poncelet (1822) and was placed on an axiomatic basis by K. G. C. Von Staudt (1847). Mathematicians adopted the pure or synthetic approach in which algebraic and analytic methods are avoided and the treatment is purely geometric.

It is well known, by someone skilled in the art, that a surface of m degree in n dimension has a number $N_C$ of algebraic coefficients which is equal to:

$$N_C = \prod_{i=1}^{n} \frac{(m+i)}{i} = \binom{m+n}{n}$$

The number of geometric conditions $N_G$ that define the surface is equal to:

$$N_G = \prod_{i=1}^{n} \frac{(m+i)}{i} - 1 = \binom{m+n}{n} - 1$$

A surface of m degree in 3 dimensions has a number of algebraic coefficient $N_C$ which is therefore equal to:

$$N_C = \frac{(m+1) \cdot (m+2) \cdot (m+3)}{1 \cdot 2 \cdot 3}$$

For a quadric m=2, $N_C$=10 while in the case of a quartic, m=4, $N_C$=35.

The number of geometric conditions $N_G$ required is equal to:

$$N_G = \frac{(m+1) \cdot (m+2) \cdot (m+3)}{1 \cdot 2 \cdot 3} - 1.$$

Therefore, 9 geometric conditions are required for a quadric in 3 dimensions. 34 geometric conditions are required for a quartic in 3 dimensions. The geometric conditions required will be inputted in a certain way in the preferred embodiment of the invention and as described below.

Now referring to FIG. 1*a*, there is shown a point M in a referential in Euclidean geometry. The point M is characterized by three coordinates which are, in the example (2,1,1); being respectively the x, y and z coordinate of the referential.

Now referring to FIG. 1*b*, there is shown the point M with its reference simplex. In projective geometry, a reference simplex in 3 dimensions comprises 4 points. The point M has 4 coordinates in such a reference simplex.

It is possible to express the coordinates of a point in a projective space from an Euclidean space using a transfer matrix. It is possible to express the coordinates of a point in an Euclidean space from a projective space using the inverse of the transfer matrix.

In a 2-dimension Euclidian space, if a point M has coordinates x and y (M(x,y)) in the Euclidean space, M will have a third coordinate in the projective plane. More generally, a point in an n-dimensional Euclidean space is represented as a point in an (n+1)-dimensional projective space.

M(x,y,1) is the expression of the point M in the projective plane. In projective space, overall scaling is unimportant, therefore (x,y,1)=(a·x,a·y,a·z). However a=0 is avoided. As scaling is unimportant, (x,y,z) are called the homogeneous coordinates of the point. In order to transform the expression of a point expressed in projective space, back in the Euclidean space, a division is performed of the coordinates by the scaling factor. At this point, it is important to note that the projective plane comprises more points than the Euclidean space. For instance the points whose last coordinate in the projective space is at zero. These points are called ideal points or point at infinity. All the ideal points lie on a line which is called the ideal line or the line at infinity. In two dimensions, the line is represented by (0,0,1).

Now referring to FIG. 2, there is shown a conic in a 2-dimension space. The conic is defined using 5 geometric conditions:

$$N_G = \binom{2+2}{2} - 1 = 5.$$

A reference simplex is first chosen. The geometric conditions are then entered using an entity defined as a control point. As will understand someone skilled in the art, the geometric conditions may be inputted using other type of information.

A point is usually defined as the intersection of a curve with another line that would be, in this case, the pencil of line.

In order to extend the concept of points, the control points may be divided, in the preferred embodiment of the invention, into non-polar points and polar points. It will be appreciated that curves such as Lamé's curve cannot be defined using conventional intersection points.

Now referring to FIG. 3, there is shown a polar point and a related non-polar point for a conic, in a 2-dimension space.

According to a first step, a non-polar point is chosen on the pencil of line. According to a second step, this non-polar point becomes the intersection of two tangential lines to the surface. According to a third step, the intersection of the two contacts created by the two tangential lines becomes the polar line. The polar point is defined as the intersection of the polar line with the pencil of line. It will be appreciated by someone skilled in the art that the polar point and the non-polar point are merged when the pencil of line is tangent to the shape. Therefore, the whole concept of intersection is generalized with the use of the polar and the non-polar points. Imaginary points are therefore not used in the preferred embodiment of the invention.

A polar and a related non-polar point define a geometric condition. In the case of a quadric in two dimensions, 5 geometric conditions are necessary. 10 control points may be used to provide these 5 geometric conditions. The 10 control points comprise 5 non-polar points and their 5 related polar points. Alternatively, 5 intersection points could have been provided in order to satisfy the requirement for the 5 geometric conditions.

In the case of a quadric in 3 dimensions, the number of geometric conditions is equal to $$N_G = \binom{2+3}{3} - 1 = 9.$$

In the preferred embodiment of the invention, 18 control points are provided, 9 of which are non-polar points, the other 9 being the related polar points of the 9 first non-polar points. It will be appreciated that non-polar and polar points allow the user to set the pencil in a place of interest. Advantage will be used of the technique as described above.

In the case of a quartic in 3 dimensions, the number of geometric conditions is equal to:

$$N_G = \binom{4+3}{3} - 1 = 34$$

In the preferred embodiment of the invention, 68 control points are provided, 34 control points of which are non-polar points, the other 34 points, being the related polar points of the 34 first non-polar points.

It will be appreciated by someone skilled in the art that the surface that defines the polar plane is a n−1 degree shape, if the shape has a degree n.

In order to be able to identify the algebraic coefficients of a shape using the information provided by the control points, it is important to group the information provided by the control points.

In the preferred embodiment of the invention, sections are defined to group the control points in order to enable an iterative solving process using the geometric conditions provided.

At this point, it is important to understand how a number of sections is determined, in the preferred embodiment of the invention. The number of geometric conditions determines the number of sections.

Now referring to the Pascal triangle, it is known that:

$$\sum_{S=0}^{S=m} \binom{n-1+s}{n-1} = \binom{m+n}{n}$$

wherein m is the degree of the surface and n is the dimension space number.

Preferably the number of sections is defined by:

$$\operatorname{Card}\left(\sum_{S=0}^{S=m} \binom{n-1+s}{n-1}\right) = m+1.$$

Now referring back to the following equation:

$$\sum_{S=0}^{S=m} \binom{n-1+s}{n-1} = \binom{m+n}{n},$$

It is possible to identify the m+1 sections and to break them up into another element. In the preferred embodiment of the invention, each section is further broken up into lines.

$$\binom{n-1}{n-1} + \binom{n-1+1}{n-1} + \ldots + \binom{n+m-1}{n-1} = \sum_{S=0}^{S=m} \binom{n-1+s}{n-1} = \binom{m+n}{n}$$

$$1 + \sum_{S=0}^{S=1} \binom{n-2+s}{n-2} + \ldots + \sum_{S=0}^{S=m} \binom{n-2+s}{n-2} = \sum_{S=0}^{S=m} \binom{n-1+s}{n-1} = \binom{m+n}{n}$$

The last equation shows that each section may be decomposed in lines. Each line comprises a certain number of control points. For instance, the first section $S_1$ defined by:

$$S_1 : \binom{n-1}{n-1}$$

comprises 1 line which has 2 control points, one of which is a non-polar point, the other one being the related polar point of the non-polar point.

The second section $S_2$ defined by:

$$S_2 : \sum_{S=0}^{S=1} \binom{n-2+s}{n-2}$$

comprises 2 lines. The first line will provide $$\binom{n-2}{n-2}$$

geometric conditions, i.e. it will comprise $$2 \cdot \binom{n-2}{n-2}$$

control points; half of which are non-polar points, the other half being the related polar points of the first half.

The second line will provide $$\binom{n-2+1}{n-2}$$

geometric conditions i.e. it will comprise $$2 \cdot \binom{n-2+1}{n-2}$$

control points; half of which are non-polar points, the other half being the related polar points of the first half.

The $S_{m+1}$ section defined by:

$$S_{m+1} = \sum_{S=0}^{S=m} \binom{n-2+s}{n-2}$$

comprises m+1 lines. The first line of the section $S_{m+1}$ will provide $$\binom{n-2+0}{n-2}$$

geometric conditions i.e. it will comprise $$2 \cdot \binom{n-2+0}{n-2}$$

control points; half of which are non-polar points, the other half being the related polar points of the first half.

The second line of the section $S_{m+1}$ will provide $$\binom{n-2+1}{n-2}$$

geometric conditions i.e. it will comprise $$2 \cdot \binom{n-2+1}{n-2}$$

control points; half of which are non-polar points, the other half being the related polar points of the first half.

The m+1 line of the section $S_{m+1}$ will provide $$\binom{n-2+m}{n-2} - 1$$

geometric conditions. It will be appreciated that 1 geometric condition is subtracted from the total number. It will provide $$2 \cdot \left( \binom{n-2+m}{n-2} - 1 \right)$$

control points; half of which are non-polar points, the other half being the related polar points of the first half.

In the preferred embodiment of the invention, the control points are provided to each section in a certain way. More precisely, the control points are first provided to section $S_{m+1}$, then the control points are provided to section $S_m$, to section $S_1$ and finally to section $S_0$.

Now referring to FIG. 4a, there is shown the break up in lines of each section for the quadric in 3 dimensions. For instance, section $S_3$ comprises 3 lines, the first line provides 2 geometric conditions using 4 control points. The second line of section $S_3$ provides 2 geometric conditions using 4 control points. The third line of section $S_3$ provides 1 geometric condition using 2 control points.

Now referring to FIG. 4b, there is shown the decomposition in line of each section for the cubic in 3 dimensions. For instance, section $S_4$ comprises 4 lines, the first line provides 3 geometric conditions using 6 control points. The second line of section $S_4$ provides 3 geometric conditions using 6 control points. The third line of section $S_4$ provides 2 geometric conditions using 4 control points. The fourth line of section $S_4$ provides 1 geometric condition using 2 control points.

Now referring to FIG. 4c, there is shown the decomposition in line of each section for the quartic in 3 dimensions.

In the preferred embodiment, the user may provide the control points using a graphics user interface. The graphics user interface is located on a computer.

Using a mouse or any devices that allow to select a pixel on the screen the user selects a pixel. The point selected is characterized using the coordinates of the pixel selected, in the preferred embodiment, the coordinates of the pixel comprise two integer elements. The coordinates of the pixel are then converted, in the preferred embodiment of the invention, into world coordinates, as known by someone skilled in the art.

The conversion of the pixel coordinates into the world coordinates is performed using a multiplication by a matrix. In the preferred embodiment, the world coordinates comprise three "float" values. Still in the preferred embodiment, the world coordinates are then converted into projective homogeneous coordinates. The projective homogeneous coordinates are obtained by adding a new coordinate which is 1. The new coordinate may be 0 in the case where it is desirable to express "infinity".

The polar plane may be expressed by derivation of the equation of the surface with respect to each coordinate of the reference simplex.

Now referring to FIG. 5a, there is shown a first embodiment of the sections for defining a cyclid using a quartic.

Now referring to FIG. 5b, there is shown a second embodiment of the sections for defining a cyclid using a quartic.

More precisely, 5 sections are defined as explained in FIG. 4c.

It will be appreciated that 4 sections are necessary to define a cubic as explained in FIG. 4b.

Now referring to FIG. 6, there is shown the preferred embodiment of the invention. The preferred embodiment of the invention comprises a database of equations 12, a database of forms 14, a basic form selection unit 10, a form to control points converter 16, an algebraic coefficients to control points converter 18, a section management unit 20, a projective space object memory 22, a control points editor 24, a control points to algebraic coefficients converter 26, an output interface 28, a raytracer unit 30 and a graphics display 32.

The database of equations 12 comprises algebraic equations of various forms. More precisely, the database of equations comprises the algebraic coefficients of the algebraic equation of the form and an identifier of the form. The form is selected using the identifier. It will be appreciated that the degree of the algebraic equation that defines the form is not limited to a certain value as explained below; therefore, this enables the generation of any types of form.

The database of forms 14 comprises, for each form, an identifier of a form and information about the form. The information about a form comprises the control points that define the form. The information about the form further comprises the reference simplex. In another embodiment, the information may be geometric information about the form such as the radius and the center in the case of the form being a sphere.

The basic form selection unit 10 enables a user to select data from at least the database of equations 12 and the database of forms 14 and to provide the selected data to either the projective space object memory 22, if the selected data comprises control points and a reference simplex, or to the form to control points converter 16, if the selected data comprises a form definition of the object, or to the algebraic coefficients to control points converter 18, if the selected data comprises the algebraic coefficients.

The form to control points converter 16 performs a conversion of a form defined into control points. A converter is dedicated for converting each type of form defined into control points. For instance, for a sphere, the form is defined by a radius and the coordinates of the center. The form to control points converter 16 converts these informations into a set of control points.

In the preferred embodiment, the user provides a reference simplex in order to generate the control points. In another embodiment, a reference simplex is generated automatically by the form to control points converter 16.

The algebraic coefficients to control points converter 18 performs a conversion of the algebraic coefficients that define a form into a set of control points that will define the form in a projective space. In the preferred embodiment, the user may provide a reference simplex. The reference simplex will be generated with reference to this simplex. In another embodiment of the invention, the reference simplex is generated automatically by the algebraic coefficients to control points converter 18.

The section management unit 20 allows a user to create, edit or delete a section of the projective space object memory 22. The section management unit 20 may also use the algebraic coefficients when a user wishes to redefines new sections.

The projective space object memory 22 stores data of a form in projective space. In the preferred embodiment of the invention, the data of a form in the projective space object memory 22 comprises the control points of the form as well as the reference simplex. The control points comprise polar and related non-polar points. The control points are located on lines of a line pencil and a subset of at least one line defines a section as explained previously.

The control points editor 24 enables a user to create, edit or delete control points. In the preferred embodiment of the invention, and as explained previously, the control points comprise polar and related non-polar points.

The control points to algebraic coefficients converter 26 performs a conversion of the control points that define a form into the algebraic coefficients which define the form. As control points are related to a reference simplex, the reference simplex is preferably also used to perform the conversion.

The output interface 28 receives the algebraic coefficients and provides an interface in order to export the algebraic coefficients that define the form.

A raytracing unit 30 receives the algebraic coefficients and provides data to the graphics display 32.

The raytracing unit 30 operates under a principle described at pages 701 and 702 of the second edition of Computer Graphics principles and practices by James D. Foley. Andries van Dam, Steven K. Feiner and John F. Hughes, published by Addison-Wesley, the specification of which is incorporated by reference.

The graphics display 32 enables the user to visualize the geometric form using a graphics interface. Preferably, the raytracing unit 30 further receive a point of view signal. In one embodiment of the invention, the graphics display is performed under an i386 architecture, in another embodiment, the graphics display is performed under a MAC architecture.

Now referring to FIG. 7, there is shown the preferred embodiment of the invention.

According to step 36 of the invention, data is provided about a form. In the preferred embodiment, the data provided comprises a reference simplex and control points. The form is defined in a projective space using the reference simplex and the control points.

Still referring to FIG. 7 of the application and according to step 38 of the invention, the control points that define the form are modified. It will be appreciated that a user may modify the control points by only modifying the reference simplex.

According to step 40, the algebraic coefficients of the form defined by the modified control points are computed using the modified control points and the reference simplex. The algebraic coefficients of the form may be used to provide an Euclidean view of the object.

Now referring to FIG. 8, there is shown one embodiment of how data is provided according to step 36 of the invention. In this embodiment, and according to step 42, a form is selected in the database of forms 14. The form is selected by the basic form selection unit 10 using an identifier. As explained previously, the information attached to the identifier comprises the control points and the reference simplex. According to step 44 of the invention, the control points and the reference simplex are provided.

Now referring to FIG. 9, there is shown another embodiment of how data is provided according to step 36. In this embodiment, and according to step 46, an algebraic equation is selected. The algebraic equation is selected depending on the form desired. The algebraic equation is selected by the basic form selection unit 10 in the database of equations 12. According to step 48, the algebraic equation is converted into control points. The algebraic equation is converted using the algebraic coefficients to control points converter 14. In the preferred embodiment, a reference simplex is provided by a user. In another embodiment, the reference simplex is automatically generated.

Now referring to FIG. 10, there is shown another embodiment of how data is provided according to step 36 of the invention. According to step 50 of this embodiment, a geometric form is selected. The geometric form is selected using the basic form selection unit 10 and the database of forms 14. According to step 52 of FIG. 10, the geometric form selected is converted into control points using the form to control points converter 16. In the preferred embodiment, a reference simplex is provided by a user. In another embodiment, the reference simplex is automatically generated. The control points generated will be generated with respect to this reference simplex.

Figure 11:
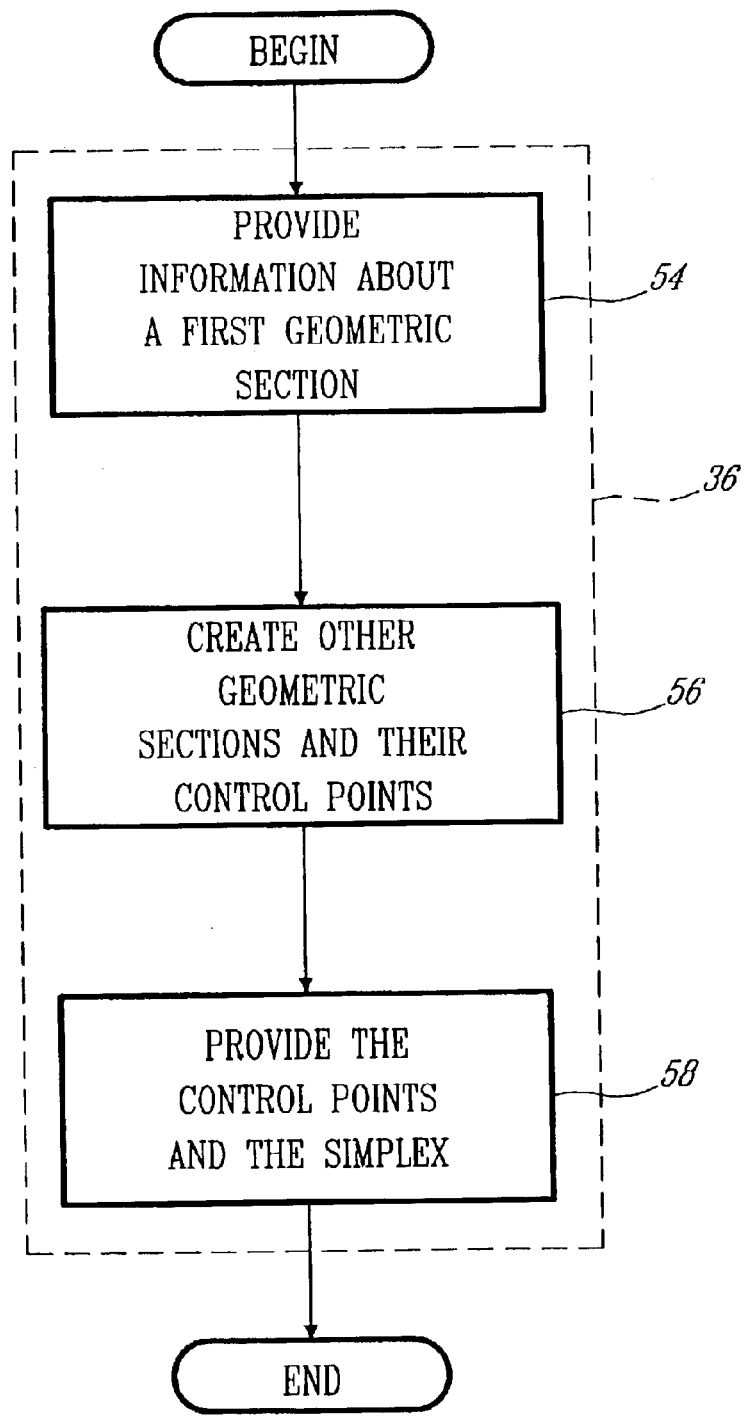
FIG. 11 is a flow chart which shows another alternative embodiment of how data about a form is provided; in this other alternative embodiment, data is provided in an hybrid way using both algebraic information and geometric information.

Now referring to FIG. 11, there is shown another embodiment of how data is provided according to step 36 of the invention.

According to step 54, information about a first geometric section 54 is provided. The information is provided using the basic form selection unit 10. The information may be the algebraic equation of the first geometric section; in this case, the algebraic equation is stored in the database of equations 12.

According to step 56, the other geometric sections and their control points are created. In the preferred embodiment, the control points are created using the control points editor 24. Still in the preferred embodiment, the other geometric sections are created using the section management unit 20. In the preferred embodiment, a reference simplex is provided by a user. In another embodiment, the reference simplex is automatically generated.

According to step 58, the control points of each sections are provided with the reference simplex.

Figure 12:
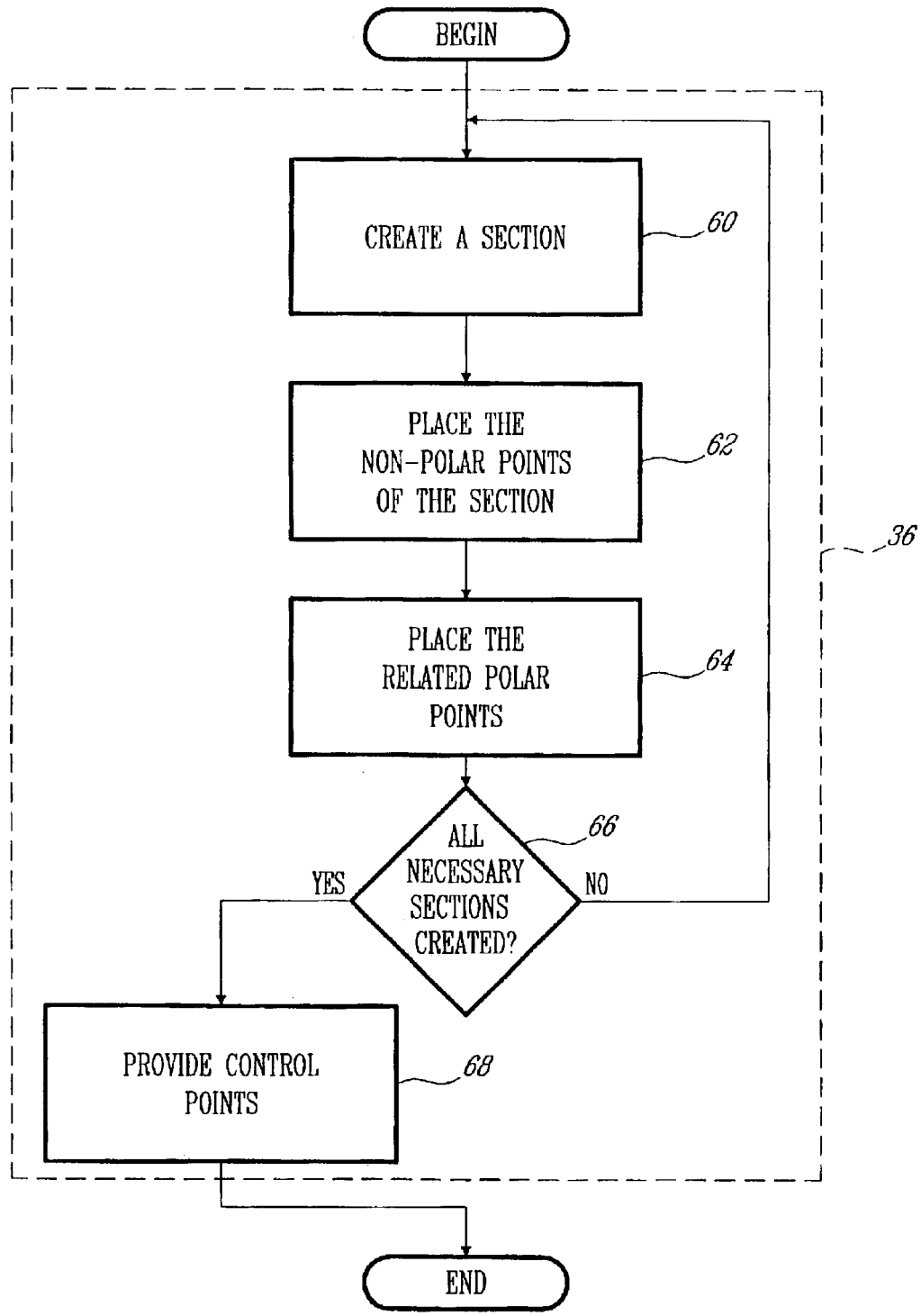
FIG. 12 is a flow chart which shows another embodiment of how data about a form is provided; in this embodiment, data is provided using control points that are inputted in the preferred embodiment of the invention using sections.

Now referring to FIG. 12, there is shown another embodiment of how data is provided according to step 36 of the invention. In this embodiment, the data is created by the user.

According to step 60, a geometric section is created. In the preferred embodiment, a reference simplex is provided by a user. In another embodiment, the reference simplex is automatically generated. The geometric section is created using the section management unit 20. According to step 62, the non-polar points, related to this section, are placed using the control points editor 24. According to step 64, polar points related to this section are placed using the control points editor 24. Someone skilled in the art will appreciate that polar points may be placed in the section created before the non-polar points.

Depending on the order of the form, a certain number of control points is necessary for each section in order to represent the form as explained before. According to step 66 of the invention, a check is performed in order to check if all the necessary sections have been created. As explained, a certain number of section is necessary in order to fully define a form. If all the necessary sections have not been entered yet, steps 60, 62, and 64 are achieved another time.

If all the necessary sections have been created, the control points are provided according to step 68. The control points comprise the polar points and the non-polar points for each section. The reference simplex is also provided, as control points are defined using this reference simplex.

Figure 13:
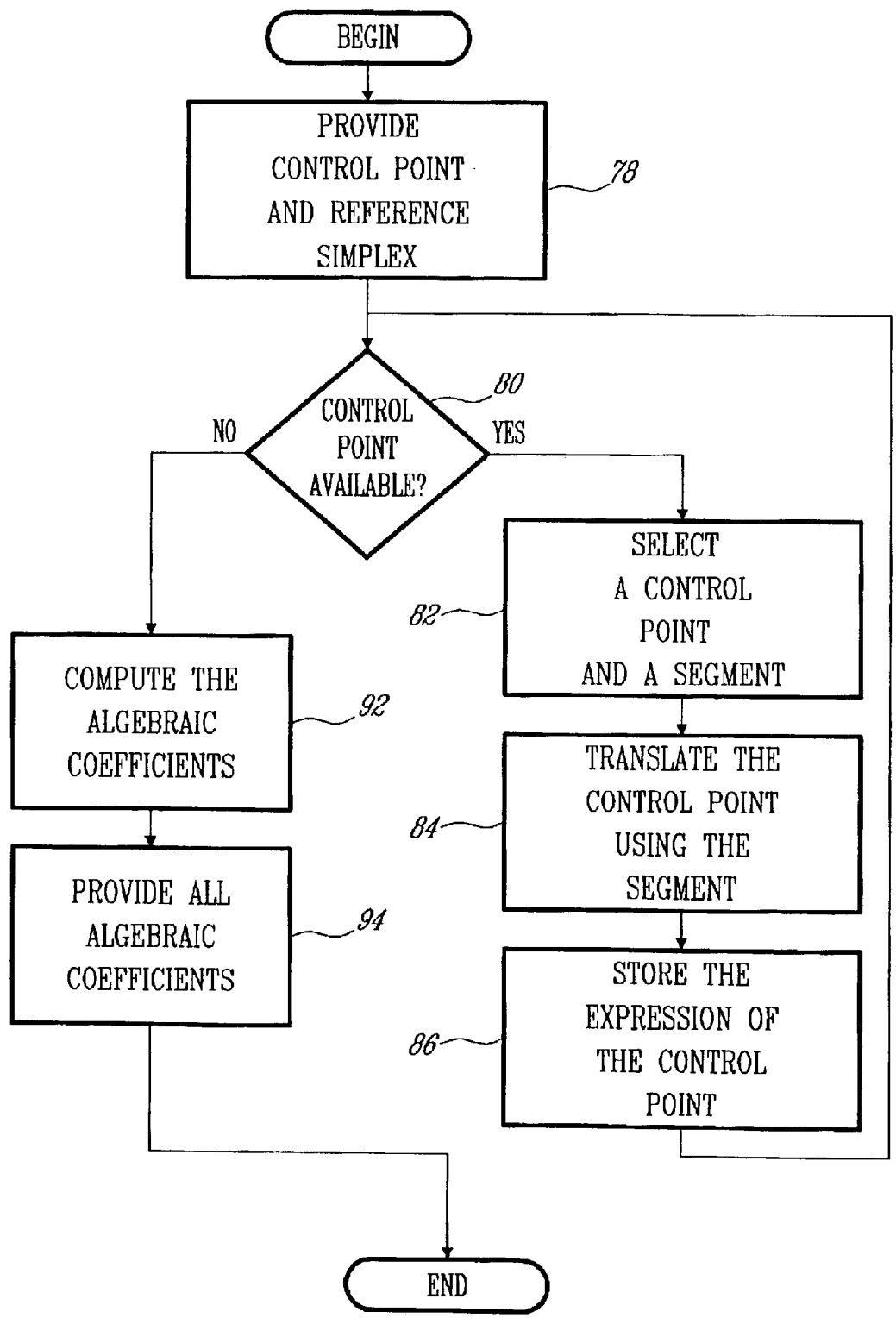
FIG. 13 is a flow chart which shows how algebraic coefficients that define the form are computed using the control points of the form.

Now referring to FIG. 13, there is shown how the control points that define the form are converted into algebraic coefficients.

According to step 78, the control points and a reference simplex are provided.

According to step 80, a check is performed in order to find out if all the control points are available. If all the control points are available, and according to step 92 of FIG. 13, the algebraic coefficients are computed. According to step 94 of FIG. 13, the algebraic coefficients are provided.

According to step 84, the coordinates of the selected control point are translated in one dimension using the extremities of the segment where the control point is located. This step will be more detailed below.

According to step 86, the expression in one dimension of the selected control point is stored.

Steps 82, 84, and 86 are performed for each available control point.

Figure 14:
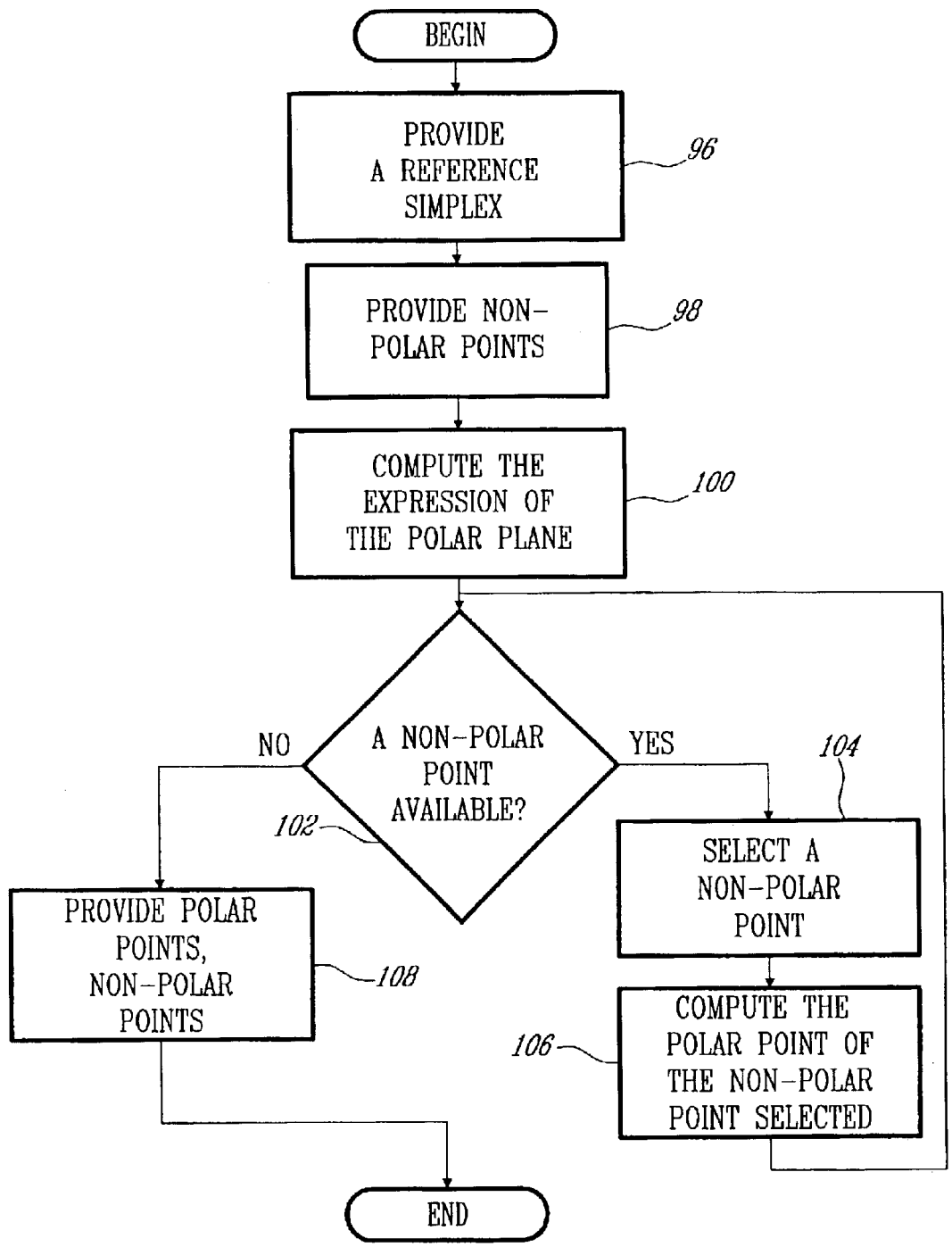
FIG. 14 is a flow chart that shows how polar points are computed using at least the non-polar points.

Now referring to FIG. 14 and according to step 96, a reference simplex is provided by the user. In another embodiment, the reference simplex is generated automatically.

According to step 98, the non-polar points are provided by the user. In the preferred embodiment, the non-polar points are provided using the control points editor 24.

According to step 100, the expression of the polar plane is computed, the expression of the polar plane is computed using the algebraic equation of the form as explained.

According to step 102, a test is performed in order to find out if at least one of the more than one non-polar points is available. If at least one of the more than one non-polar points is available, an available non-polar point is selected according to step 104.

According to step 106, the polar point of the selected non-polar point is computed using at least the expression of the polar plane.

If no non-polar point is available and according to step 108, the control points as well as the reference simplex are provided.

Figure 15:
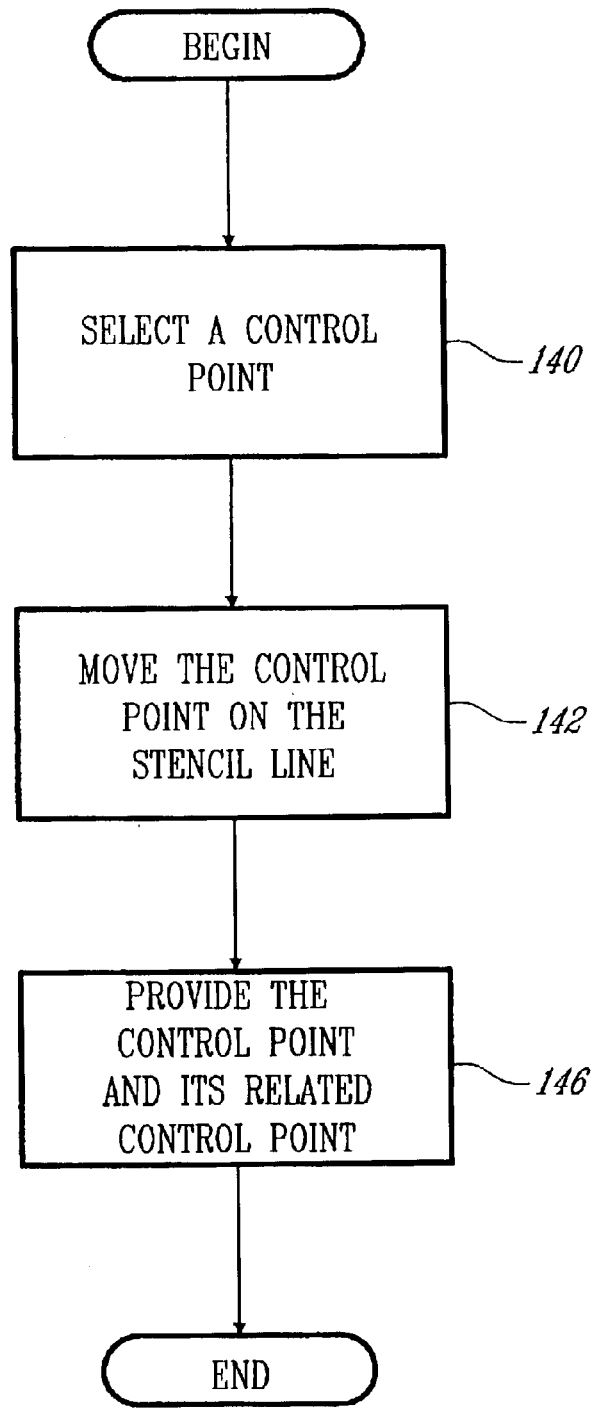
FIG. 15 is a flow chart which shows how control points are moved on a line.

Now referring to FIG. 15, there is shown how the control points editor operates.

According to step 140, a control point is selected. A polar point as well as a non-polar point may be selected.

The control point is selected using the mouse on the user interface in the preferred embodiment of the invention.

According to step 142 of the invention, the selected control point is moved on the stencil line using the cursor of the mouse in the preferred embodiment of the invention.

According to step 146, the new control point is provided. The new control point may be a polar point as well as a non-polar point.

Figure 16:
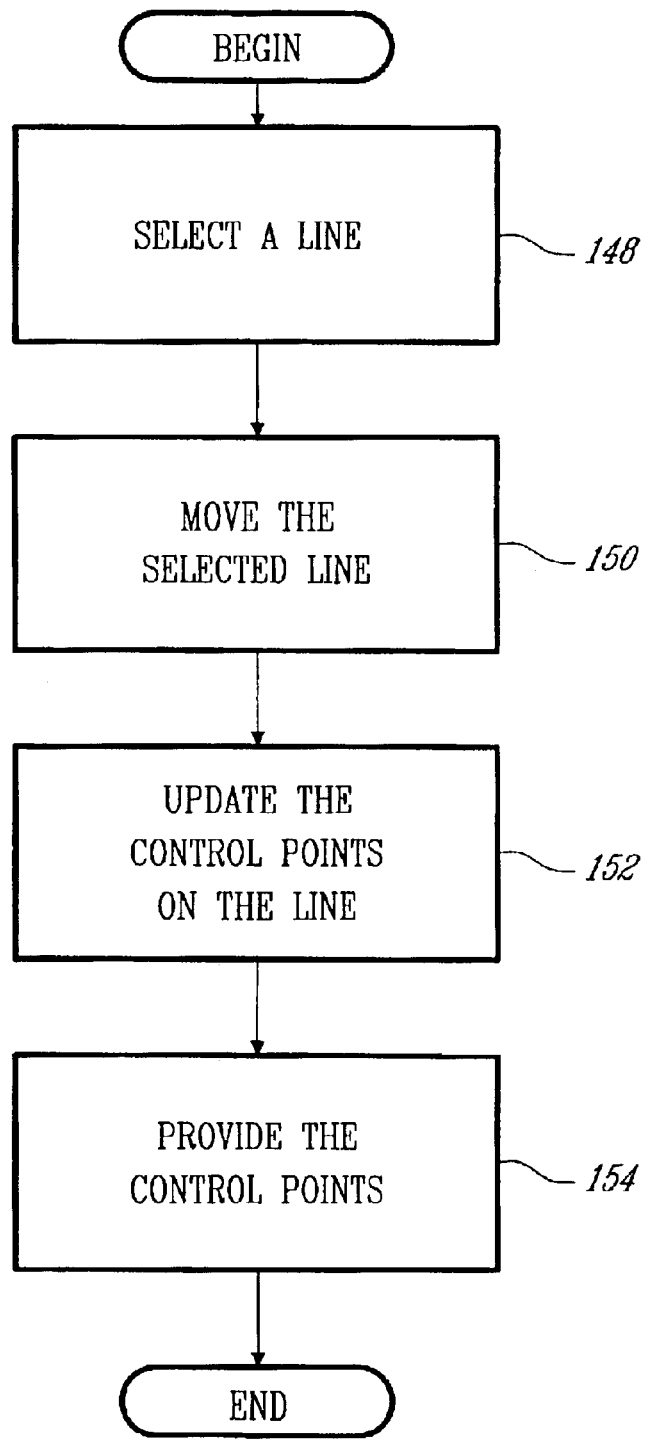
FIG. 16 is a flow chart which shows how lines are moved.

According to FIG. 16, there is shown how the section management unit operates. In the preferred embodiment of the invention, a line is selected according to step 148 of the invention. The line is selected using the mouse and the click button.

According to step 150, the selected line is moved using the mouse and preferably a predetermined key.

According to step 152, the control points located on the line as well as other dependent control points if any are updated.

According to step 154, the new control points are provided.

Now referring to FIG. 17, there is shown a quadric in a 3-dimension space.

Now referring to FIG. 18, there is shown how the quadric has been created using the preferred embodiment of the invention. The quadric has been created using a reference simplex, three sections defined, and control points on each lines of a pencil of lines.

As explained previously, three sections were defined. The first section 156 is defined using lines 159 and 160 and 161. The second section 157 is defined using lines 162 and 163. The third line 158 is defined using line 164. Control points are inserted on each line of the three sections. As explained previously, and in the preferred embodiment of the invention, the first section 156 comprises three lines, the first line 159 comprises 4 control points (as 2 geometric conditions are necessary), the second line 161 of the first section 156 comprises 4 control points (as 2 geometric conditions are necessary) and the third line 160 of the first section 156 comprises 2 control points (as 1 geometric condition is necessary).

The first line 162 of the section second 157 comprises 4 control points (as 2 geometric conditions are necessary), the second line 163 of the second section 157 comprises 2 control points (as 1 geometric condition is necessary).

The first line 164 of the third section 158 comprises 2 control points (as 1 geometric condition is necessary).

FIG. 19 shows the first quadric, shown in FIG. 18, superimposed with the reference simplex and the control points.

FIG. 20 shows a second quadric.

Now referring to FIG. 21, there is shown the reference simplex and the control points that define the second quadric. In this embodiment, three sections are also defined. It will be appreciated by the reader that in this embodiment 7 non-polar control points are merged with their respective polar control points.

Now referring to FIG. 22, the user will appreciate that when the polar control point and its related non-polar control point are merged, the resulting point is located on the surface of the quadric.

Figure 23:
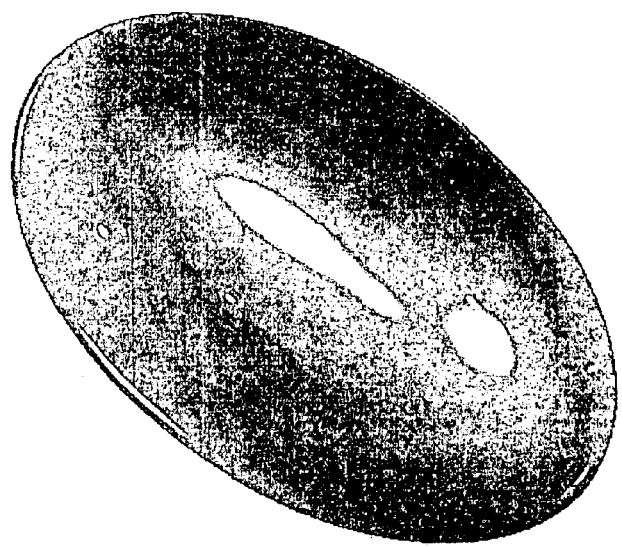
FIG. 23 is a screenshot of a third quadric.
Figure 24:
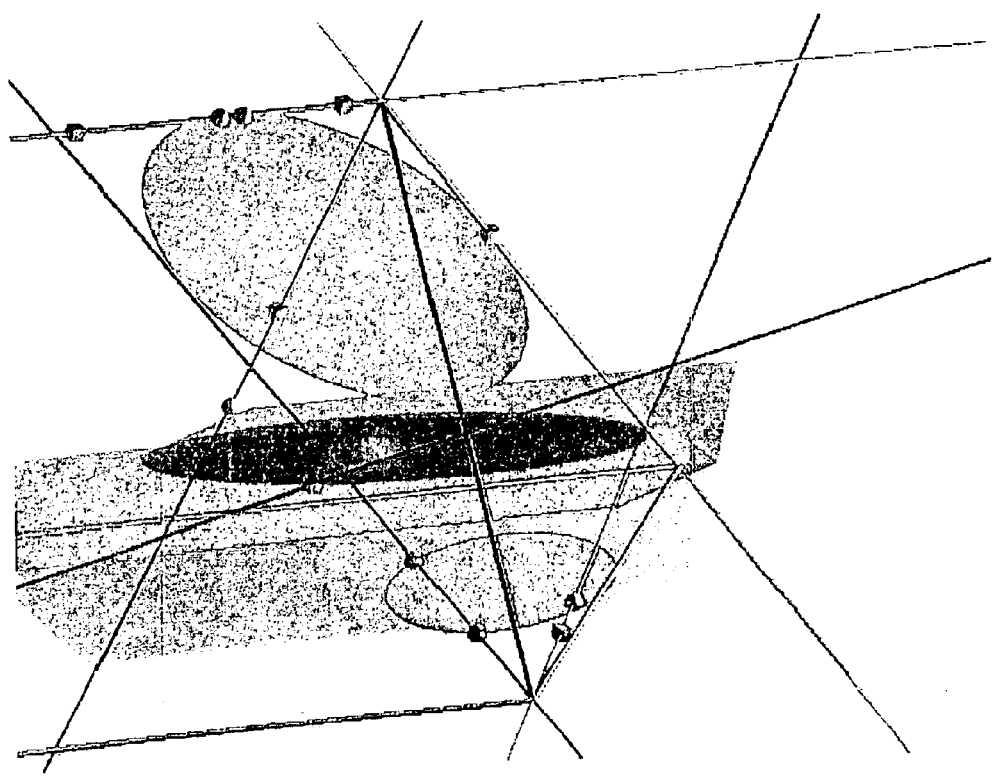
FIG. 24 is a screenshot which shows three sections of the third quadric, the control points and the reference simplex.

Now referring to FIG. 23, there is shown a third quadric. In this third example of a quadric, one point that defines the reference simplex was sent to "infinity" as shown in FIG. 24.

The same number of section, lines and control points is necessary. Sending a point to infinity enables the user to have access to new types of quadrics. FIG. 25 shows the third quadric with the control points and the reference simplex.

FIG. 26 shows a fourth quadric. In this fourth example of quadric 2 points that define the reference simplex were sent to "infinity" as shown in FIG. 27. This embodiment allows for instance to create a sphere.

FIG. 28 shows the fourth quadric with the control points and the reference simplex.

Control Points to Algebraic Coefficient Converter

Now referring to FIG. 29, there is shown how the control points to algebraic coefficient converter 26 works. More precisely, there is shown how coefficients from the algebraic equation are determined using the control points entered by the user. As explained above, the control points comprise polar and non-polar points in the preferred embodiment of the invention.

According to step 200 of FIG. 29, the simplex as well as the control points are provided to the control points to the algebraic coefficient converter 26. As explained previously, the simplex as well as the control points originate from the projective space object memory 22.

According to step 202 of FIG. 29, and in the preferred embodiment of the invention, $\lambda,\mu$ and $\rho,\sigma$ are computed for the control points. The $\lambda,\mu$ are used to designate a non-polar point while the $\rho,\sigma$ are used to designate a polar point.

Figure 30:
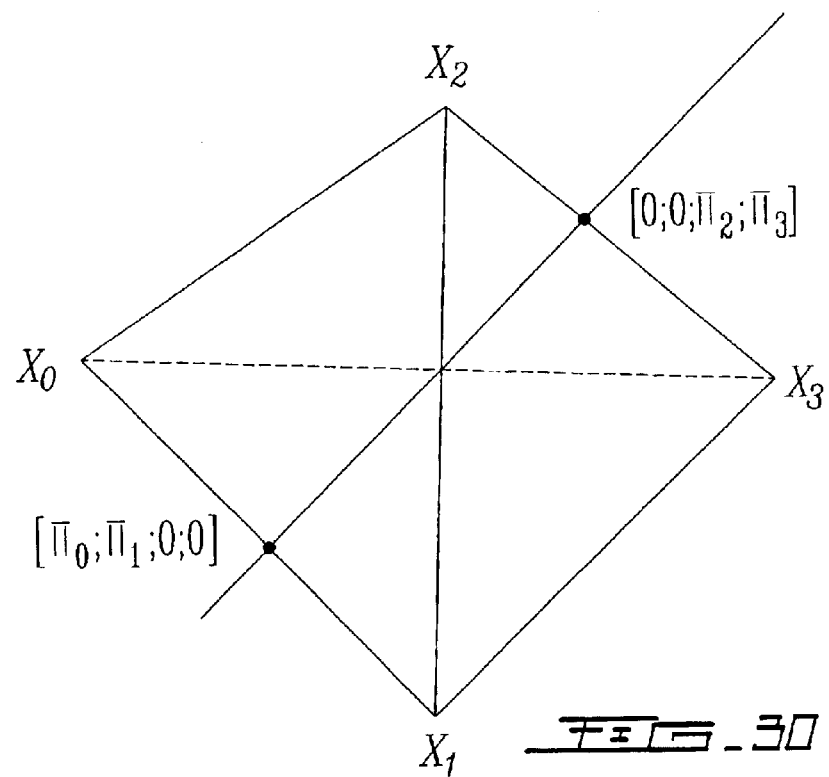
FIG. 30 is a diagram which shows how $\pi_0, \pi_1, \pi_2, \pi_3$ are introduced.

Now referring to FIG. 30, there is shown the origin of the use of the $\lambda,\mu$ and the $\rho,\sigma$. So far, each control point may be introduced using its four coordinates in the reference simplex (namely $x_0,x_1,x_2,x_3$). Using the mechanism explained below, each point will be introduced using two coordinates, either the $\lambda,\mu$ or the $\rho,\sigma$ depending if the control point is a polar point or a non-polar point as explained above. By performing the following variable change:

$x_0 = \mu \cdot \pi_0$ $x_1 = \mu \cdot \pi_1$, it is possible to achieve the goal.

$x_2 \lambda = \pi_2$ $x_3 = \lambda \cdot \pi_3$

To achieve the goal, it is mandatory to provide two points that will define a line and therefore provide the $\pi_0;\pi_1,\pi_2,\pi_3$. Therefore, it is possible to express each control point, in one dimension, using two coordinates, when two points forming the line where the control point is, are defined. The person skilled in the art will note that such scheme will provide an easy way to simplify the mechanism, as a point in any dimension is always located on a line.

Figure 31:
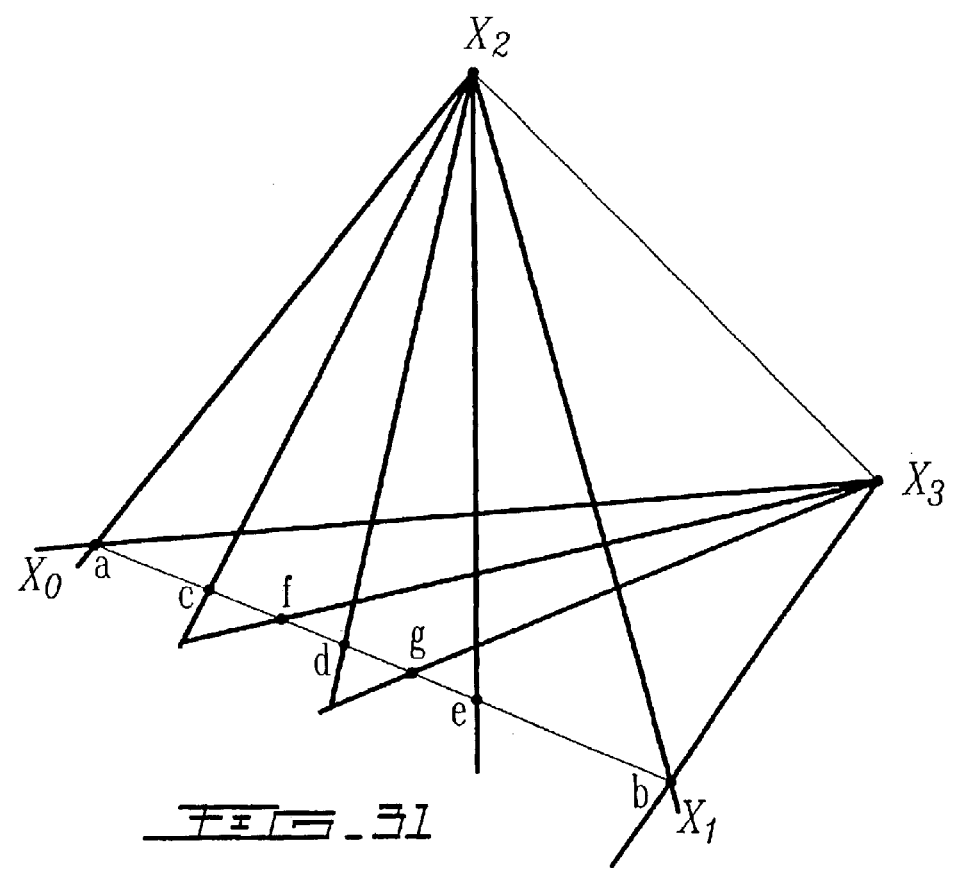
FIG. 31 is a diagram which shows the different sections used for a quartic and how the different sections used are located with respect to the reference simplex in the preferred embodiment of the invention.

Now referring to FIG. 31, there is shown the lines used, in the preferred embodiment of the invention, in the case of the first and the second section (namely $S_5$ and $S_4$). Someone skilled in the art may use another way to define the supporting line of a control point but it will be noted that the scheme described in FIG. 31 enables an easy computing of the algebraic coefficients by introducing advantageous simplifications. For instance, the coordinate $\pi_3$ will be equal to zero for all points located in the section $S_5$ while the coordinate $\pi_2$ will be equal to zero for all points located in the section $S_4$.

Now, referring back to FIG. 29, and according to step 204, a section is selected. The section selected is the remaining section where there is the largest number of control points in the preferred embodiment of the invention. For instance, in the case of a quartic, the first section selected is the section $S_5$, which comprises 14 control points, as shown in FIG. 4b.

According to step 206, a line and the corresponding control points on the selected line are selected. The line selected, in the preferred embodiment of the invention, is the remaining line where there is the largest number of control points. For instance, line 1 is first selected in the section $S_5$.

According to step 208, a check is then performed in order to find out if singularities are located with the point located on the selected line. A singularity is defined as more than one control point having the same spatial location. If such singularities are detected, a corresponding equation is used according to step 210; if no singularity is detected, the standard equation is used according to step 212.

According to step 214, a check is then performed in order to find out if all the lines where the control points are located have been handled. If this is the case, and according to step 216, the coefficients computed and/or information are provided. The information provided may be in some cases equations.

According to step 218, a check is performed in order to find out if all the sections have been handled. If this is the case and according to step 220, the coefficients computed are provided. If this a section has not been already handled, a new section is selected according to step 204.

For instance, in the case of the quartic, the first section handled is the section named $S_5$, the second section handled is the section named $S_4$, the third section handled is the section $S_3$, the fourth section handled is $S_2$ and the last section handled is the section named $S_1$. When the first section $S_5$ is handled, the first line handled is line 1, the second line handled is line 2, the third line handled is line 3, the fourth line handled is line 4 and the fifth line handled is line 5. When the second section $S_4$ is handled, the first line handled is line 1, the second line handled is line 2, the third line handled is line 3, the fourth line handled is line 4. When the third section $S_3$ is handled, the first line handled is line 1, the second line handled is line 2 and the third line handled is line 3. When the fourth section $S_2$ is handled, the first line handled is line 1 and the second line handled is line 2. Finally, when the fifth section $S_1$ is handled, the line handled is line 1.

Still in the case of the quartic, the first section will provide 16 coefficients; the second section will provide 10 coefficients; the third section will provide 3 coefficients and three equations that will be used later; the fourth section will provide 4 coefficients and one equation and the fifth section will provide the last 3 coefficients of the equation.

The person skilled in the art will note that the approach developed above allows to work with any type of dimension as the information comprised in each control point is handled at the line level. However it is now important to understand how the standard equation and the corresponding equation used in step 210 and 212 to find out the coefficient are generated. The person skilled in the art will be then able to find out the standard equation and the corresponding equation used in steps 210 and 212 and therefore be able to determine the algebraic coefficients in any dimension.

General Principles Regarding the Method Used to Find out the Standard Equation and the Corresponding Equation The user, via the user interface, may provide control points on a line as explained above, still as explained above, each control point comprises a polar and a non-polar point.

In order to find out the standard equation and the corresponding equation, an iterative method will be used. It will be appreciated that the iterative method enables someone skilled in the art to find out the algebraic coefficients in an n-dimension space. It will also be appreciated that the method described below is the preferred method; a skilled person in the art will be able to find other variants.

Now referring to FIG. 32, there is shown how the general equation is created.

According to step 230, the algebraic equation is provided. The algebraic equation depends on $x_0, x_1, x_2, x_3$. Now referring to FIGS. 34a and 34b, there are shown the algebraic equations of a quadric and a quartic. According to step 232, each component of the polar plane is computed. A component of the polar plane is computed by deriving the algebraic equation with respect to the variable of the component. For instance, the $x_0$ component of the polar plane is equal to the derivative of the algebraic equation with respect to $x_0$.

According to step 234, the condition of polarity is expressed. More precisely, it is expressed that:

$$F_{x_0} \cdot z_0 + F_{x_1} \cdot z_1 + F_{x_2} \cdot z_2 + F_{x_3} \cdot z_3 = 0 \quad \text{(Eq. 0)}$$

where $F_{x_0}, F_{x_1}, F_{x_2}, F_{x_3}$ are the components of the polar plane with respect to $x_0, x_1, x_2, x_3$ and $z_0, z_1, z_2, z_3$ are the coordinates of a polar point.

According to step 236, a change of variable is performed. The change of variable is performed using the $\lambda, \mu$ and the $\rho, \sigma$.

More precisely, the change of variable performed is:

$x_0 = \mu \cdot \pi_0$ $x_1 = \mu \cdot \pi_1$ $x_2 = \lambda \cdot \pi_2$ $x_3 = \lambda \cdot \pi_3$ $z_0 = \rho \cdot \pi_0$ $z_1 = \rho \cdot \pi_1$ $z_2 = \sigma \cdot \pi_2$ $z_3 = \sigma \cdot \pi_3$ Eq. 0 with the change of variable performed in step 236 now depends on $\pi, \lambda, \rho, \sigma$ and $\pi_0, \pi_1, \pi_2, \pi_3$. The new equation may be used with any control points, located on any line, in any section. The new equation offers a universal tool to provide a correspondence between the algebraic coefficients and the geometric information provided by the control points.

According to step 238, the general equation obtained is provided.

However, as explained below, a special solving scheme will be used to determine the coefficients using this general equation applied to each control point.

Someone skilled in the art could propose to simply solve the equation system created by applying the general equation to each control point and inverting the equation system created. However, this inverting operation would be too time-consuming, furthermore, the operation would be impossible for high-order system and finally, a singularity would make the operation impossible. There is therefore a need for an iterative approach to solve the equation system.

Pursuant the duty to disclose the preferred embodiment, FIG. 33 will provide the mechanism used to solve the equation provided in step 238.

According to step 240, the general equation is provided.

According to step 242, a section is selected; in the preferred embodiment, the section selected is chosen according a scheme described previously. By selecting a section, the value of $\pi_2$ and $\pi_3$ are set.

According to step 244, a line is selected; in the preferred embodiment the line selected is chosen in the section selected according to a scheme described previously. By selecting a line, the value of $\pi_0$ and $\pi_1$ are set.

According to step 246, a non-polar point and its related polar point are selected on the selected line of the selected section. According to step 248, the non-polar point and its related polar point selected are inputted in the general equation provided. By selecting a non-polar point and its related polar point, the values of $\lambda, \mu$ and $\rho, \sigma$ are set.

According to step 248, the information provided by the selected pair of point is used to compute the coefficients.

More precisely, the general equation is used with the values of $\lambda, \mu$ and $\rho, \sigma$ and a system of equations is generated at the line level. It will be appreciated that for each section, $\pi_2$ and $\pi_3$ are fixed. Therefore, a factorization by $\pi_2$ and $\pi_3$ or any linear combination of $\pi_2$ and $\pi_3$ is performed in each equation of the equation systems generated in the same section. A factorization by the algebraic coefficients as well as their linear combination is also performed. This leads to secondary equation systems where the unknown variables are now polynomials which are depending on the linear combination of the coefficients instead of the primary equation systems which are depending on the coefficients. These secondary equation systems are then solved using Kramer solving schemes, in the preferred embodiment, allowing the primary equation systems to be solved.

It will be appreciated that each time an equation system is solved, the equation system being a primary or a secondary type, the resulting solution is provided with a new unknown variable which is an homogeneous factor. An homogeneous factor will be solved at the end of the solving process and this will allow to find recurrently each homogeneous factor introduced during the solving process.

When the primary type and the secondary type equation systems are created, a check is performed in order to find out if a factorization by a known polynomial which depends on $\lambda, \mu$ and $\rho, \sigma$ is possible. A known polynomial is a polynomial which would represent a particular geometric configuration; such particular configuration could be a configuration where two control points are located in the same physical location (meaning $\lambda_1 = \lambda_2$, $\mu_1 = \lambda_2$). In the last mentioned case, the polynomial would be $\lambda_1 \cdot \mu_2 - \lambda_2 \cdot \mu_1$. In the case of the quartic, the particular geometric configurations searched are the cases of a double point, the case of a double double point and the case of a triple point. If such polynomials are detected, a division by these polynomials is performed in the determinant in order to avoid these particular cases that would make the solving scheme fail as the determinant would be equal to zero. It is therefore important to be cautious at this level. In the case of the detection of a singularity, a new equation for the coefficient will be provided.

More precisely, there is shown in FIG. 71 a determinant for which a solving scheme is performed in the case where at least two points are located at the same place.

As shown in FIG. 70, it is possible to expand a determinant by any row or column. Such expansion is explained page 373 of the Seventh Edition of Advanced Engineering Mathematics by Erwin Kreyszig, which is enclosed by reference.

Now referring to FIG. 71, there is shown an expansion into a sum of minors of a determinant to solve.

In case of a degeneracy, identical rows and therefore complementary minors will vanish.

Preferably a decomposition of the determinant will be performed to provide minors in case of a multiplicity m.

In the case, for instance, of a multiplicity of 2, where $\lambda_3 = k \cdot \lambda_2, \mu_3 = k \cdot \mu_2$, there is shown in FIG. 72 a decomposition of the determinant shown in FIG. 71 into minors having a size of 2. If $\lambda_3 = k \cdot \lambda_2, \mu_3 = k \cdot \mu_2$ are substituted in some minors shown in FIG. 72, it will be appreciated that $\sigma_3 \cdot \rho_2 - \sigma_2 \cdot \rho_3$ will be a common vanishing factor of these minors. The determinant will be then computed using the other minors.

In the case of two other double points, the method disclosed above will be applied to the other two identical rows in order to extract a common vanishing factor.

Now referring to FIG. 73, there is shown a decomposition of the determinant, shown in FIG. 71, into minors having a size of 3. Such decomposition is performed in the case where three points are placed at the same location. For instance, if $\lambda_3 = k \cdot \lambda_2, \mu_3 = k \cdot \mu_2, \lambda_3 = l \cdot \lambda_2, \mu_3 = l \cdot \mu_2$, the minors shown in FIG. 73, will have $(\lambda_2 \cdot \mu_1 - \lambda_1 \cdot \mu_2), (\sigma_2 \cdot \rho_1 - \sigma_1 \cdot \rho_2)$ as a common vanishing factors. By eliminating such vanishing factors from the minors shown in FIG. 73, it is possible to compute each coefficient associated with $x_1, x_2, x_3, x_4$.

Now referring to FIG. 74, there is shown a decomposition of the determinant shown in FIG. 71 into minors having a size of 4. Such decomposition is performed in the case of quadruple points, i.e. when four points are placed at the same location. By eliminating common vanishing factors from the minors shown in FIG. 74, it is possible to compute each coefficient associated with $x_1, x_2, x_3, x_4$.

According to step 250, a check is performed in order to find out if other control points are available on the selected line of the selected section.

According to step 252, a check is performed in order to find out if another line is available on the selected section.

According to step 254, a check is performed in order to find out if another section is available. If no other section is available, the coefficients computed are provided.

Determination of the Coefficients of a Quartic According to the Preferred Embodiment of the Invention It will be appreciated by someone skilled in the art that this embodiment shows an example for determining the coefficients of a quartic according to the invention.

As explained above and in the preferred embodiment of the invention, a quartic is defined by 5 sections. The 5 sections defining the quartic are shown on FIG. 35.

FIG. 36 shows 15 lines $l_a, l_b, l_c, l_d, l_e, l_f, l_g, l_h, l_i, l_j, l_k, l_l, l_m, l_n, l_o$.

The first section comprises 5 lines $l_a, l_b, l_c, l_d, l_e$, selected in the first section, as shown in FIG. 37. The first line of the first section comprises 4 polar points and its related 4 non-polar points. The second line of the first section comprises 4 polar points and its related 4 non-polar points. The third line of the first section comprises 3 polar points and its related 3 non-polar points. The fourth line of the first section comprises 2 polar points and its related 2 non-polar points. The fifth line of the first section comprises 1 polar point and its related 1 non-polar point.

The second section comprises 4 lines, $l_f, l_g, l_h, l_i$, selected in the second section, as shown in FIG. 38. The first line of the second section comprises 4 polar points and its related 4 non-polar points. The second line of the second section comprises 3 polar points and its related 3 non-polar points. The third line of the second section comprises 2 polar points and its related 2 non-polar points. The fourth line of the second section comprises 1 polar point and its related non-polar point.

The third section comprises 3 lines, $l_j, l_k, l_l$, selected in the third section, as shown in FIG. 39. The first line of the third section comprises 3 polar points and its related 3 non-polar points. The second line of the third section comprises 2 polar points and its related 2 non-polar points. The third line of the third section comprises 1 polar point and its related non-polar point.

The fourth section comprises 2 lines, $l_m, l_n$, selected in the fourth section, as shown in FIG. 40. The first line of the fourth section comprises 2 polar points and its related 2 non-polar points. The second line of the fourth section comprises 1 polar point and its related non-polar point.

The fifth section comprises 1 line, $l_o$, selected in the fifth section, as shown in FIG. 41. The line of the fifth section comprises 1 polar point and its related non-polar point.

According to step 230 of FIG. 32, the general equation of a quartic is provided.

$$z4 := z434x2x3^3 + z43x0^2x1^2 + z49x1^3x2 + z414x1x2^3 + z416x0^3x3 +$$
$$z431x2^2x3^2 + z419x1^3x3 + z413x0x2^3 + z412x1^2x2^2 +$$
$$z410x0^2x2^2 + z46x0^3x2 + z428x1^2x3^2 + z432x0x3^3 +$$
$$z44x0x1^3 + z415x2^4 + z433x1x3^3 + z42x0^3x1 + z426x0^2x3^2 +$$
$$z425x2^3x3 + z41x0^4 + z435x3^4 + z47x0^2x1x2 + z45x1^4 +$$
$$z48x0x1^2x2 + z411x0x1x2^2 + z417x0^2x1x3 + z418x0x1^2x3 +$$
$$z420x0^2x2x3 + z422x1^2x2x3 + z423x0x2^2x3 + z424x1x2^2x3 +$$
$$z427x0x1x3^2 + z429x0x2x3^2 + z430x1x2x3^2 + z421x0x1x2x3$$

According to step 232, the expression of the polar plane is computed, the expression of the polar plane is computed using the general equation of a quartic as explained above.

According to step 234, the polarity condition is expressed. The polarity expression is expressed as explained above.

According to step 236, the change of variable is performed using $\lambda, \mu$ and $\rho, \sigma$.

According to step 238 of FIG. 32, the expression of the polar plane for the quartic is computed. The resulting expression for the polar plane is:

$$4\alpha t_0 + \beta t_1 + 2\gamma t_2 + \delta t_3 + 4\epsilon t_4 = 0$$

where:

$\alpha = \rho \lambda^3$;

$\beta = \lambda^2(\lambda\sigma + 3\mu\rho)$;

$\gamma = \lambda\mu(\lambda\sigma + \mu\rho)$;

$\delta = \mu^2(3\lambda\sigma + \mu\rho)$;

$\epsilon = \sigma\mu^3$;

$t_0 = z_{435}\pi_3^4 + z_{434}\pi_3^3\pi_2 + z_{431}\pi_3^2\pi_2^2 + z_{425}\pi_3\pi_2^3 + z_{415}\pi_2^4$;

$t_1 = (z_{433}\pi_3^3 + z_{430}\pi_3^2\pi_2 + z_{424}\pi_3\pi_2^2 + z_{414}\pi_2^3)\pi_1 +$
$(z_{432}\pi_3^3 + z_{429}\pi_3^2\pi_2 + z_{423}\pi_3\pi_2^2 + z_{413}\pi_2^3)\pi_0$ $t_2 = (z_{428}\pi_3^2 + z_{422}\pi_3\pi_2 + z_{412}\pi_2^2)\pi_1^2 +$
$(z_{427}\pi_3^2 + z_{421}\pi_3\pi_2 + z_{411}\pi_2^2)\pi_0\pi_1 +$
$(z_{426}\pi_3^2 + z_{420}\pi_3\pi_2 + z_{410}\pi_2^2)\pi_0^2$ $t_3 = (z_{419}\pi_3 + z_{49}\pi_2)\pi_1^3 + (z_{418}\pi_3 + z_{48}\pi_2)\pi_1^2\pi_0 +$ and
$(z_{417}\pi_3 + z_{47}\pi_2)\pi_1\pi_0^2 + (z_{416}\pi_3 + z_{46}\pi_2)\pi_0^3$ $t_4 = z_{45}\pi_1^4 + z_{44}\pi_1^3\pi_0 + z_{43}\pi_1^2\pi_0^2 + z_{42}\pi_1\pi_0^3 + z_{41}\pi_0^4$.

In the preferred embodiment of the invention, $\psi_i$, $i = 0 \ldots 14$ are defined as:

$\psi_0 = z_{435}\pi_3^4 + z_{434}\pi_3^3\pi_2 + z_{431}\pi_3^2\pi_2^2 + z_{425}\pi_3\pi_2^3 + z_{415}\pi_2^4$;

$\psi_1 = z_{433}\pi_3^3 + z_{430}\pi_3^2\pi_2 + z_{424}\pi_3\pi_2^2 + z_{414}\pi_2^3$;

$\psi_2 = z_{432}\pi_3^3 + z_{429}\pi_3^2\pi_2 + z_{423}\pi_3\pi_2^2 + z_{413}\pi_2^3$;

$\psi_3 = z_{428}\pi_3^2 + z_{422}\pi_3\pi_2 + z_{412}\pi_2^2$;

$\psi_4 = z_{427}\pi_3^2 + z_{421}\pi_3\pi_2 + z_{411}\pi_2^2$;

$\psi_5 = z_{426}\pi_3^2 + z_{420}\pi_3\pi_2 + z_{410}\pi_2^2$;

$\psi_6 = z_{419}\pi_3 + z_{49}\pi_2$;

$\psi_7 = z_{418}\pi_3 + z_{48}\pi_2$;

$\psi_8 = z_{417}\pi_3 + z_{47}\pi_2$;

$\psi_9 = z_{416}\pi_3 + z_{46}\pi_2$;

$\psi_{10} = z_{45}$;

$\psi_{11} = z_{44}$;

$\psi_{12} = z_{43}$;

$\psi_{13} = z_{42}$; and $\psi_{14} = z_{41}$;

Someone skilled in the art will appreciate that $\psi_i, i=0 \ldots 14$ characterize a selected section as they are depending only on $\pi_2$ and $\pi_3$; which are fixed for the selected section while $t_i, i=0 \ldots 4$ characterize the lines for a specific section as they are depending only on $\pi_0$ and $\pi_1$.

The $\psi_i, i=0 \ldots 14$ are related to the $t_i, i=0 \ldots 4$ as follows.

$t_0 = \psi_0$;

$t_1 = \psi_1 \pi_1 + \psi_2 \pi_0$;

$t_2 = \psi_3 \pi_1^2 + \psi_4 \pi_0 \pi_1 + \psi_5 \pi_0^2$;

$t_3 = \psi_6 \pi_1^3 + \psi_7 \pi_1^2 \pi_0 + \psi_8 \pi_1 \pi_0^2 + \psi_9 \pi_0^3$; and $t_4 = \psi_{10} \pi_1^4 + \psi_{11} \pi_1^3 \pi_0 + \psi_{12} \pi_1^2 \pi_0^2 + \psi_{13} \pi_1 \pi_0^3 + \psi_{14} \pi_0^4$.

In the following, $\psi_i^J$ will refer to $\psi_i$ of section J; $t_{10}$ will refer to $t_i$ of line a.

According to step 242 of FIG. 33, a section is selected. In the preferred embodiment of the invention, the first section is selected.

First Line (Line a) of the First Section

According to step 244 of FIG. 33, a line is selected. In the preferred embodiment of the invention, the first line of the first section ([$a_0$:$a_1$:0:0]) is selected.

According to steps 246, a pair of point is selected. By applying the equation $4\alpha t_0 + \beta t_1 + 2\gamma t_2 + \delta t_3 + 4\epsilon t_4 = 0$ to all the polar points and the non-polar points of the first line of the first section, a system of equations, Eq. 1, is generated having $t_i, i=0 \ldots 4$ as unknown.

A line of cofactors $x_0, x_1, x_2, x_3, x_4$ associated respectively to each element of the added row in the system of equations Eq. 1 is added to generate system of equations Eq. 2.

The system of equations Eq. 2 is shown in FIG. 42.

From the system of equations Eq. 2, $t_{ia}, i=0 \ldots 4$ are expressed as a function of $\psi_i^I, i=0 \ldots 14$.

It is therefore possible to provide $\psi_0^I$ and equations satisfied by $\psi_i^I, i=1 \ldots 14$.

Second Line (Line b) of the First Section

According to step 244 of FIG. 33, the second line of the first section is selected.

According to steps 246, a pair of points is selected. By applying the equation $4\alpha t_0 + \beta t_1 + 2\gamma t_2 + \delta t_3 4\epsilon t_4 = 0$ to all the polar points and the non-polar points of the second line of the first section, a system of equations, Eq. 3, is generated having $t_{ib}, i=0 \ldots 4$ as unknown A line of cofactors $x_5, x_6, x_7, x_8, x_9$ associated respectively to each element of an added row in the system of equations Eq. 3 is added to the system of equations.

The system of equations Eq. 3 is shown in FIG. 43.

From the system of equations Eq. 3, $t_{ib}, i=0 \ldots 4$ are expressed as a function of $\psi_i^I, i=0 \ldots 14$. Using expressions of $t_{1a}$ and $t_{1b}$ system of equations Eq. 4 is generated.

A line of cofactors $x_{10}, x_{11}, x_{12}$ associated respectively to each element of an added row in the system of equations Eq. 4 is added to generate system of equations Eq. 5. System of equations Eq. 5 is shown in FIG. 44.

Using the system of equations Eq. 5, it is possible to provide $\psi_1^I$ and $\psi_2^I$.

Third Line (Line c) of the First Section

According to step 244 of FIG. 33, the third line of the first section is selected.

According to steps 246, a pair of points is selected. By applying the equation $4\alpha t_0 + \beta t_1 + 2\gamma t_2 + \delta t_3 + 4\epsilon t_4 = 0$ to all the polar points and the non-polar points of the third line of the first section, a system of equations, Eq. 6, is generated having $t_{ic}, i=0 \ldots 4$ as unknown.

By substituting $t_{ic}, i=0,1$ by their computed value which is dependent on $\psi_i^I, i=0 \ldots 2$, and by adding a line of cofactors $x_{13}, x_{14}, x_{15}, x_{16}$ associated respectively to each element of an added row in the system of equations, a system of equations Eq. 7 is created; the system of equations Eq. 7 is shown in FIG. 45. It is then possible to provide an expression of $t_{iC}, i=2 \ldots 4$.

Using expression of $t_{2i}, i=a \ldots c$ generated using the first line, the second line and the third line of the first section, a system of equations, Eq. 8, depending on $\psi_i^I, i=3 \ldots 5$ is generated. In the preferred embodiment of the invention, a line of cofactors $x_{17}, x_{18}, x_{19}, x_{20}$ is added to the system of equations Eq. 8; each cofactor is associated respectively to each element of an added row in the system of equations Eq. 8.

The system of equations Eq. 0.8 is shown in FIG. 46.

$\psi_i^I, i=3 \ldots 5$ are provided by solving the system of equations Eq. 8.

Fourth Line (Line d) of the First Section

According to step 244 of FIG. 33, the fourth line of the first section is selected.

According to steps 246, a pair of points is selected. By applying the equation $4\alpha t_0 + \beta t_1 + 2\gamma t_2 + \delta t_3 + 4\epsilon t_4 = 0$ to all the polar points and the non-polar points of the fourth line of the first section, a system of equations, Eq. 9, is generated having $t_{ic}, i=0 \ldots 4$ as unknown.

By substituting $t_{id}, i=0 \ldots 2$ by their computed values which are depending on $\psi_i^I, i=0 \ldots 5$, and by adding a line of cofactors $x_{21}, x_{22}, x_{23}$ associated respectively to each element of an added row in the system of equations Eq. 9, a system of equations Eq. 10 is created. The system of equations Eq. 10 is shown in FIG. 47. It is then possible to provide an expression of $t_{id}, i=3,4$ by solving the system of equations Eq. 10.

Using expression of $t_{3i}, i=a \ldots d$ generated by the first line, the second line, the third line and the fourth line of the first section, it is possible to generate a system of equations Eq. 11 with respect to $\psi_i^I, i=6 \ldots 9$.

In the preferred embodiment of the invention, a line of cofactors $x_{24}, x_{25}, x_{26}, x_{27}$ $x_{28}$ is added to the system of equations Eq. 11; each cofactor is associated respectively to each element of an added row in the system of equations Eq. 11. The generated system of equations Eq. 11 is shown in FIG. 48.

By solving the system of equations Eq. 11, it is possible to compute $\psi_i^I, i=6 \ldots 9$.

Fifth Line (Line e) of the First Section

According to step 244 of FIG. 33, the fifth line of the first section is selected.

According to steps 246, a pair of points is selected. By applying the equation $4\alpha t_0 + \beta t_1 + 2\gamma t_2 + \delta t_3 + 4\epsilon t_4 = 0$ to the polar point and the non-polar point of the fifth line of the first section, equation Eq. 12 is generated.

Using $\psi_i^I, i=0 \ldots 9$, generated by the first line, the second line, the third line and the fourth line of the first section, it is possible to introduce $y_i, i=3 \ldots 5$.

Substituting $y_i, i=3 \ldots 5$ in the equation $4\alpha t_0 + \beta t_1 + 2\gamma t_2 + \delta t_3 + 4\epsilon t_4 = 0$ applied to the fifth line and using expression of $t_{4i}, i=a \ldots d$, it is possible to generate a system of equations Eq. 13 on $\psi_i^I, i=0 \ldots 9$.

A line of cofactors $x_{29}, x_{30}, x_{31}, x_{32}, x_{33}, x_{34}$ associated respectively to each element of the added row is added to the system of equations Eq. 13. Resulting system of equations Eq. 14 is shown in FIG. 49.

Solving the system of equations Eq. 14 provides $\psi_i^I, i=10 \ldots 14$.

It will be therefore appreciated that now $\psi_i^I, i=0 \ldots 14$ are totally defined.

Someone skilled in the art will then appreciate that coefficients $z_{45}, z_{46}, z_{47}, z_{48}$ are provided in the first section.

According to step 254 of FIG. 33, a new section is selected as no other line is available in the current section. In the preferred embodiment and as explained above the second section is selected after handling the first section.

First Line (Line f) of the Second Section

According to step 244 of FIG. 33, the first line of the second section is selected.

According to steps 246, a pair of points is selected. By applying the equation $4\alpha t_0+\beta t_1+2\gamma t_2+\delta t_3+4\epsilon t_4=0$ to all the polar points and the non-polar points of the first line of the second section, a system of equations Eq. 15 is generated having $t_{if}, i=0 \ldots 4$ as unknown. $t_{4f}$ is computed using results from the first section as will note someone skilled in the art.

$y_6$ is then defined.

A new system of equations Eq. 16 is therefore generated using the system of equations Eq. 15.

A line of cofactors $x_{35}, x_{36}, x_{37}, x_{38}, x_{39}$ associated respectively to each element of the added row is added to the system of equations Eq. 16. The resulting system of equations Eq. 17 is shown in FIG. 50.

By solving the system of equations Eq. 17 shown in FIG. 50, it is possible to compute $\psi_0^{II}$. Expressions of $t_{if}, i=1 \ldots 3$ are also available.

Second Line (Line g) of the Second Section

According to step 244 of FIG. 33, the second line of the second section is selected.

According to steps 246, a pair of points is selected.

By applying the equation $4\alpha t_0+\beta t_1+2\gamma t_2+\delta t_3+4\epsilon t_4=0$ to all the polar points and the non-polar points of the second line of the second section, system of equations Eq. 18 is generated having $t_{ig}, i=0 \ldots 4$ as unknown.

$y_7$ is introduced to provide $t_{4g}$.

$t_{0g}$ and $t_{4g}$ are then substituted in the system of equations Eq. 18. A line of cofactors $x_{40}, x_{41}, x_{42}, x_{43}$ associated respectively to each element of the added row is then added to the system of equations Eq. 18. A resulting system of equations Eq. 19 is shown in FIG. 51.

By solving the system of equations Eq. 19, shown in FIG. 51, it is possible to provide expressions of $t_{ig}, i=1 \ldots 3$.

Expressions of $t_{1g}$ and $t_{if}$ are used to create a new system of equations Eq. 20. A line of cofactors $x_{44}, x_{45}, x_{46}$ associated respectively to each element of the added row is then added to the system of equations Eq. 20. Resulting system of equations Eq. 21 is shown in FIG. 52.

By solving the system of equations Eq. 21, it is possible to compute $\psi_i^{II}, i=1 \ldots 2$.

Third Line (Line h) of the Second Section

According to step 244 of FIG. 33, the third line of the second section is selected.

According to steps 246, a pair of points is selected.

By applying the equation $4\alpha t_0+\beta t_1+2\gamma t_2+\delta t_3+4\epsilon t_4=0$ to all the polar points and the non-polar points of the second line of the second section, system of equations Eq. 22 is generated having $t_{ih}, i=0 \ldots 4$ as unknown.

$t_{ih}, i=0,1$ are computed using previously computed $\psi_i^{II}, i=1,2$. Using previous section computation, $t_{4h}$ is computed. $y_8$ is introduced using $t_{4h}$. $y_9$ is also introduced.

$y_8$ and $y_9$ are then substituted in the system of equations Eq. 22. A line of cofactors $x_{47}, x_{48}, x_{49}$ associated respectively to each element of the added row is then added to the system of equations Eq. 22. Resulting system of equations Eq. 23 is shown in FIG. 53.

An expression of $t_{ih}, i=2,3$ is then obtained.

A system of equations Eq. 23 is then generated using $t_{2i}, i=f,g,h$. A line of cofactors $x_{50}, x_{51}, x_{52}, x_{53}$ associated respectively to each element of the added row is then added to the system of equations Eq. 23. Resulting system of equations Eq. 24 is shown in FIG. 54. Solving the resulting system of equations Eq. 24 provides $\psi_i^{II}, i=3 \ldots 5$.

Fourth Line (Line i) of the Second Section

According to step 244 of FIG. 33, the fourth line of the second section is selected.

According to steps 246, a pair of points is selected.

By applying the equation $4\alpha t_0+\beta t_1+2\gamma t_2+\delta t_3+4\epsilon t_4=0$ to the polar point and the non-polar point of the fourth line of the second section, an equation Eq. 25 is generated.

$y_i, i=10 \ldots 12$ are introduced. $\psi_i^{II}, i=0 \ldots 2$ are then injected in the equation Eq. 25.

Expressions of $t_{3i}, i=f,g,h,i$ are then used to generate an equations system Eq. 26.

A line of cofactors $x_{54}, x_{55}, x_{56}, x_{57}, x_{58}$ associated respectively to each element of the added row is then added to the system of equations Eq. 26. Resulting system of equations Eq. 27 is shown in FIG. 55.

Solving the system of equations Eq. 27 provides $\psi_i^{II}, i=6 \ldots 9$.

$\psi_6^i, i=I,II$ are then used to generate a system of equations Eq. 28 having $Z_{419}, z_{49}$ as unknown. A line of cofactors $x_{59}, x_{60}, x_{61}$ associated respectively to each element of the added row is then added to the system of equations Eq. 28. Resulting system of equations Eq. 29 is shown in FIG. 56A. Solving the system of equations Eq. 29 provides $z_{419}, z_{49}$.

$\psi_7^i, i=I,II$ are then used to generate a system of equations Eq. 30 having $z_{418}, z_{48}$ as unknown. A line of cofactors $x_{62}, x_{63}, x_{61}$ associated respectively to each element of the added row is then added to the system of equations Eq. 30. Resulting system of equations Eq. 31 is shown in FIG. 56B. Solving the system of equations Eq. 31 provides $z_{418}, z_{48}$.

$\psi_8^i, i=I,II$ are then used to generate a system of equations Eq. 32 having $z_{417}, z_{47}$ as unknown. A line of cofactors $x_{64}, x_{65}, x_6$, associated respectively to each element of the added row is then added to the system of equations Eq. 32. Resulting system of equations Eq. 33 is shown in FIG. 56C. Solving the system of equations Eq. 33 provides $z_{417}, z_{47}$.

$\psi_9^i, i=I,II$ are then used to generate a system of equations Eq. 34 having $z_{416}, z_{46}$ as unknown. A line of cofactors $x_{66}, x_{67}, x_6$, associated respectively to each element of the added row is then added to the system of equations Eq. 34. Resulting system of equations Eq. 35 is shown in FIG. 56D. Solving the system of equations Eq. 35 provides $z_{416}, z_{46}$.

From previous equations of the second section, it is possible to provide $\psi_i^{II}, i=1 \ldots 14$.

According to step 254 of FIG. 33, a new section is selected as no other line is available in the current section. After the solving of the second section, the third section is selected.

First Line (Line j) of the Third Section

It will be appreciated by someone skilled in the art that $\psi_i^{II}, i=6 \ldots 14$ are known as they are depending on previously computed coefficients.

According to step 244 of FIG. 33, the first line of the third section is selected.

According to steps 246, a pair of points is selected.

$t_{3j}, t_{4j}$ are then computed and substituted in the equation $4\alpha t_0+\beta t_1+2\gamma t_2+\delta t_3+4\epsilon t_4=0$.

$y_i, i=13 \ldots 16$ are then introduced.

A system of equations, Eq. 36, is then generated using the polar points and the non-polar points of the first line of the third section.

A line of cofactors $x_{68}, x_{69}, x_{70}, x_{71}$ associated respectively to each element of the added row is then added to the system of equations Eq. 36. Resulting system of equations is shown in FIG. 57.

Expressions of $t_{ij}, i=0 \ldots 2$ are then provided using the resulting system of equations.

Second Line (Line k) of the Third Section

According to the step 244 of FIG. 33, the second line of the third section is selected.

According to steps 246, a pair of points is selected.

The polar points and the non-polar points of the second line of the third section are then used with the equation $4\alpha t_0+\beta t_1+2\gamma t_2+\delta t_3+4\epsilon t_4=0$ to generate a system of equations Eq. 37. $y_i$,i=17 . . . 20 are then introduced using $t_{jk}$,i=0,3,4. A line of cofactors $x_{72},x_{73},x_{74}$ associated respectively to each element of the added row is then added to the system of equations Eq. 37. Resulting system of equations Eq. 38 is shown in FIG. 58.

Expressions of $t_{jk}$,i=1 . . . 2 are then provided using system of equations Eq. 38.

Using $t_{1i}$,i=j,k, it is possible to generate a system of equations Eq. 39 having as unknown $\psi_i^{III}$,i=1,2. A line of cofactors $x_{75},x_{76},x_{77}$ associated respectively to each element of the added row is then added to the system of equations Eq. 39. Resulting system of equations Eq. 40 is shown in FIG. 59. Solving the system of equations Eq. 40 provides $\psi_i^{III}$, i=1,2.

Third Line (Line l) of the Third Section

According to step 244 of FIG. 33, the third line of the third section is selected.

According to steps 246, a pair of points is selected.

The polar point and the non-polar point of the third line of the third section are then applied with the equation $4\alpha t_0+\beta t_1+2\gamma t_2+\delta t_3+4\epsilon t_4=0$.

$t_{ji}$,i=0 . . . 4 are then injected in the equation.

Using $t_{2i}$,i=j,k and the equation, a system of equations Eq. 41 is generated.

A line of cofactors $x_{78},x_{79},x_{80},x_8$, associated respectively to each element of the added row is then added to the system of equations Eq. 41. Resulting system of equations Eq. 42 is shown in FIG. 60.

Using the system of equations Eq. 42, it is possible to generate $\psi_i^{III}$,i=3 . . . 5.

Using $\psi_3^i$,i=I . . . III, it is possible to generate a system of equations Eq. 43 which will be used to compute $z_{422},z_{428}$, $z_{412}$. A line of cofactors $x_{82},x_{83},x_{84},x_{85}$ associated respectively to each element of the added row is then added to the system of equations Eq. 43. Resulting system of equations Eq. 44 is shown FIG. 61A. Solving the system of equations Eq. 44 provides an expression of $z_{422},z_{428},z_{412}$.

Using $\psi_4^i$,i=I . . . III, it is possible to generate a system of equations Eq. 45 which will be used to compute $z_{427},z_{421}$, $z_{411}$. A line of cofactors $x_{86},x_{87},x_{88},x_{85}$ associated respectively to each element of the added row is then added to the system of equations Eq. 45. Resulting system of equations Eq. 46 is shown FIG. 61B. Solving the system of equations Eq. 46 provides an expression of $z_{427},z_{421},z_{411}$.

Using $\psi_5^i$,i=I . . . III, it is possible to generate a system of equations Eq. 47 which will be used to compute $z_{426},z_{420}$, $z_{410}$. A line of cofactors $x_{89},x_{90},x_{91},x_{85}$ associated respectively to each element of the added row is then added to the system of equations Eq. 47. Resulting system of equations Eq. 48 is shown FIG. 61C. Solving the system of equations Eq. 48 provides an expression of $z_{426},z_{420},z_{410}$.

According to step 254 of FIG. 33, a new section is selected as no other line is available in the current section. In the preferred embodiment and as explained above the fourth section is selected after the solving of the third section.

First Line (Line m) of the Fourth Section

It will be appreciated by someone skilled in the art that $\psi_i^{IV}$,i=3 . . . 14 are known from previous computation.

According to step 244 of FIG. 33, the first line of the fourth section is selected.

According to steps 246, a pair of points is selected.

The polar points and the non-polar points are then applied to the equation $4\alpha t_0+\beta t_1+2\gamma t_2+\delta t_3+4\epsilon t_4=0$ to generate a system of equations Eq. 49 having $t_{im}$,i=0,1 as unknown.

$y_i$,i=33 . . . 35 are then introduced.

A line of cofactors $x_{92},x_{93},x_{94}$ associated respectively to each element of the added row is then added to the system of equations Eq. 49. Resulting system of equations Eq. 50 is shown in FIG. 62.

Solving the system of equations Eq. 50 provides $t_{im}$,i=0,1.

Second Line (Line n) of the Fourth Section

According to step 244 of FIG. 33, the second line of the fourth section is selected.

According to steps 246, a pair of points is selected.

The polar point and the non-polar point of the second line of the fourth section are then applied to the equation $4\alpha t_0+\beta t_1+2\gamma t_2+\delta t_3+4\epsilon t_4=0$ to generate a new equation Eq. 51.

The new equation Eq. 51 is combined with a previous equation $t_{2m}$ to provide a system of equations Eq. 52 having $\psi_i^{IV}$,i=1,2 as unknown.

A line of cofactors $x_{95},x_{96},x_{97}$ associated respectively to each element of the added row is then added to the system of equations Eq. 52. Resulting system of equations Eq. 53 is shown in FIG. 63.

An expression of $\psi_i^{IV}$,i=1,2 is provided using the resulting system of equations Eq. 53.

It is then possible using $\psi_1^i$,i=I . . . IV and $\psi_2^i$,j=I . . . IV to compute $z_{433},z_{430},z_{424},z_{414},z_{432},z_{429},z_{423},z_{413}$.

A system of equations Eq. 54 is generated using $\psi_1^i$,i=I . . . IV. A line of cofactors $x_{98},x_{99},x_{100},x_{101},x_{102}$ associated respectively to each element of the added row is then added to the system of equations Eq. 54. Resulting system of equations Eq. 55 is shown in FIG. 64A.

Solving the system of equations Eq. 55 provides $z_{433}$, $z_{430},z_{424},z_{414}$.

A system of equations Eq. 56 is generated using $\psi_2^i$,j=I . . . IV. A line of cofactors $x_{103},x_{104},x_{105},x_{106},x_{107}$ associated respectively to each element of the added row is then added to the system of equations Eq. 56. Resulting system of equations Eq. 57 is shown in FIG. 64B.

Solving the system of equations Eq. 57 provides $x_{103}$, $x_{104},x_{105},x_{106},x_{107},z_{432},z_{429},z_{423},z_{413}$.

According to step 254 of FIG. 33, a new section is selected as no other line is available in the current section. In the preferred embodiment and as explained above the fifth section is selected after the solving of the fourth section.

First Line (Line o) of the Fifth Section

It will be appreciated by someone skilled in the art that $\psi_i^V$,i=1 . . . 14 are now known.

According to steps 246, a pair of points is selected.

The polar point and the non-polar point are then applied to the equation $4\alpha t_0+\beta t_1+2\gamma t_2+\delta t_3+4\epsilon t_4=0$ to generate a new equation Eq. 58.

$y_i$,i=48 . . . 51 are now introduced.

Using expression of $t_{oO}$ and $\psi_0^i$,i=I . . . IV, it is possible to generate a system of equations Eq. 59 having $z_{435},z_{434}$, $z_{431},z_{425},z_{415}$ as unknown. A line of cofactors $x_{107},x_{108},x_{109}$, $x_{110},x_{111},x_{112}$ associated respectively to each element of the added row is then added to the system of equations Eq. 59. Resulting equation Eq. 60 system is shown in FIG. 65.

Solving this system of equations provides an expression of $z_{435},z_{434},z_{431},z_{425},z_{415}$.

Someone skilled in the art will now appreciate that all the coefficients of the quartic are now determined.

Polarity Relation

It will be appreciated that the condition of polarity expressed by the equation 0 may be alternatively expressed.

As explained previously, the algebraic expression depends on $x_0, x_1, x_2, x_3$ i.e. $F(x_0, x_1, x_2, x_3)=0$. It will be appreciated that it is possible to obtain a Taylor expansion of the algebraic surface about a first point Y by first computing $F(\lambda Y+\mu Z)$, where Z is another point and then performing a factorization by $\lambda^{n-1} \cdot \mu^i$ (i=0, . . . , n) in the resulting equation. $R=\lambda Y+\mu Z$ is defined as a non-polar point.

The Taylor expansion of the algebraic surface about the first point Y is $$F(\lambda Y + \mu Z) = \sum_{i=0}^{i=n} \frac{1}{i!} \lambda^{n-i} \mu^i \Delta_z^i F(Y)$$

then:

$$\Delta_Z^i F(Y) = \sum_{l+m+n+k=i} \frac{i!}{l!m!n!k!} z_0^l z_1^m z_2^n z_3^k \frac{\partial^i F(Y)}{\partial x_0^l \partial x_1^m \partial x_2^n \partial x_3^k}.$$

A polar point may be defined by $C=\rho Y+\sigma Z$.

By substituting Y by R and Z by C in the latter equation, $\Delta_C^p F(R)$ can be determined. By identifying $\Delta_C^p F(R)$ as $$\sum_{i=0}^n \alpha_{n,i}^p I_i,$$

where $$I_i = \frac{1}{i!} \Delta_Z^i F(Y),$$

it is possible to provide $\alpha_{n,i}^p$, where p is the order to the polarity. It is then possible to create a relationship between a polar point and a non-polar point.

Figure 67:
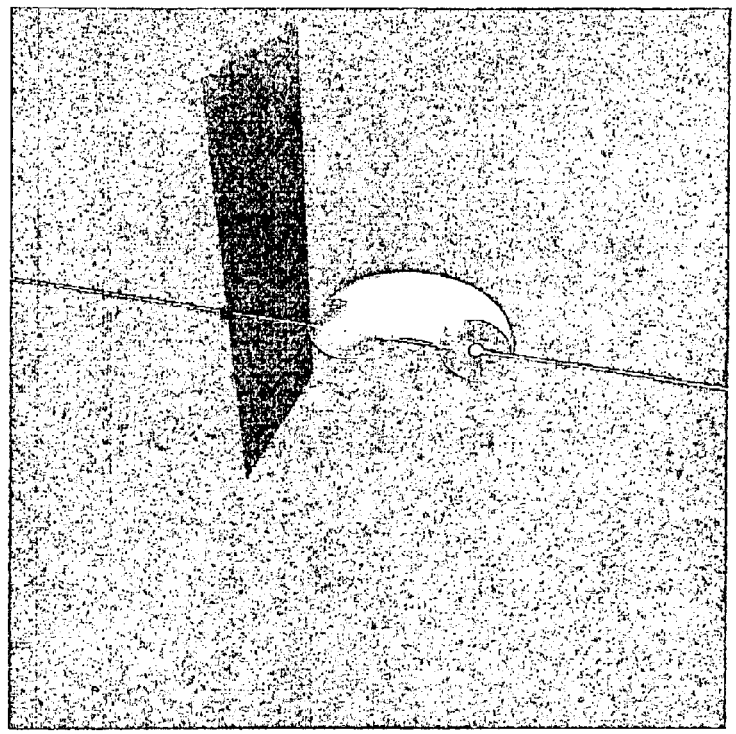
FIG. 67 is a screenshot which shows a quartic together with a polar point located on a polar surface of degree 1 and a non-polar point.

Now referring to FIG. 66, there is shown a $\alpha_{n,1}^p$, $\alpha_{n,2}^p$, $\alpha_{n,3}^p$, $\alpha_{n,4}^p$ for $Z_n^p$, which denotes the equation characterizing a straight line for the polarity of order p. Someone skilled in the art will appreciate therefore many expressions of polarity may be used. Now referring to FIG. 67, there is shown a view of a polar surface of degree 1. More precisely, a quartic is shown together with a polar point, located on the polar surface and a non-polar point.

Figure 68:
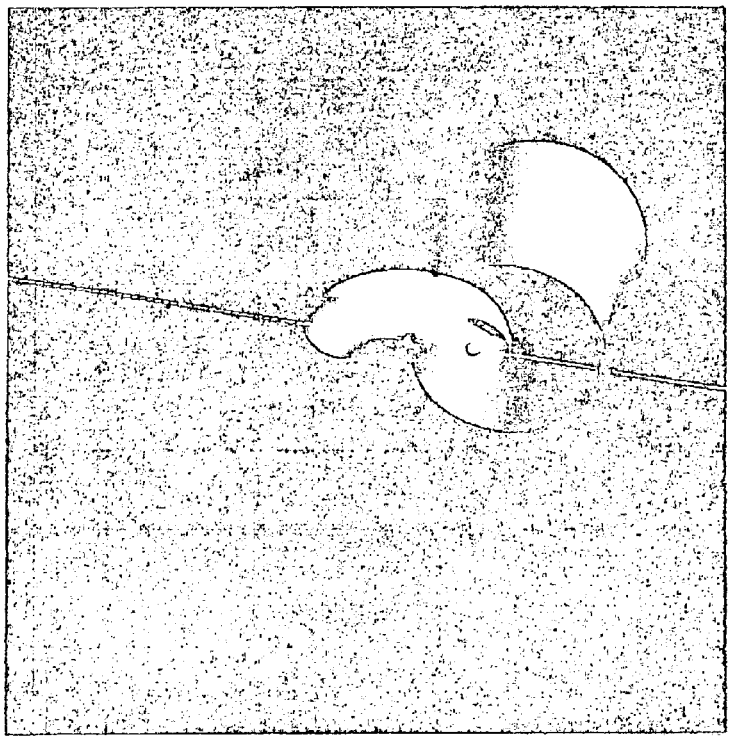
FIG. 68 is a screenshot which shows a quartic together with two polar points located on a polar surface of degree 2 and a non-polar point.

Now referring to FIG. 68, there is shown a view of a polar plane of degree 2. More precisely, a quartic is shown together with two polar points, located on the polar plane of degree 2 and a non-polar point.

Now referring to FIG. 69, there is shown a view of a polar plane of degree 3. More precisely, a quartic is shown together with three polar points, located on the polar plane of degree 3 and a non-polar point.

Deformation of an Existing Surface

In another embodiment, the invention is used to operate a deformation of an existing object by an operator. The object is already created using the invention or not.

According to a first step, an operator selects a degree of a form representative of the object or of one part of interest of the object. In accordance with the degree chosen, a number of control points have to be placed, as explained above, for defining the form representing the object or one part of interest of the object.

According to a second step, the operator provides a reference simplex. The reference simplex is placed at a desirable location, depending on the type of deformation, the operator wishes to create on the object.

According to a third step, the operator places at least one of the control points at a desirable location, depending on the type of deformation, the operator wishes to create.

According to a fourth step, the operator performs the deformation of the form created using the control points.

In an alternative embodiment, the operator performs directly the deformation on the object by placing the reference simplex at a desirable location and the control points of the object, and by manipulating at least one of the control points in accordance with the deformation desired.

What is claimed is:

1. A method for generating an m-degree form using algebraic coefficients of an equation defining the m-degree form in an n-dimension space using a plurality of points defining the form, the method comprising the steps of:

providing a framework, comprising more than one geometric surface, each of the more than one geometric surface comprising at least one line, each of the at least one line comprising at least one point of the plurality of points;

providing a solving equation using the equation defining the m-degree form, the solving equation depending on at least three points;

for each of the plurality of points, generating a corresponding equation by applying the solving equation to each of the plurality of points and two points located on one of the more than one geometric surface, the two selected points defining the line of the framework where each of the plurality of points is;

resolving the generated corresponding equations in an iterative manner to provide the algebraic coefficients of the m-degree form; the iterative manner consisting in handling the generated equation using each of the plurality of points in a certain order, the certain order consisting in selecting the generated corresponding equation corresponding to a point located on the line having the highest number of points on it and the line located in the at least one geometric surface of the framework where there is the highest number of lines on it;

generating the m-degree form using the provided algebraic coefficients of the m-degree form.

2. The method as claimed in claim 1, wherein a point may be a polar point or a non-polar point, the solving equation being generated using the equation defining the m-degree form and a polarity relation, the solving equation depending on four points, two of the four points being a polar and its related non-polar point, the two other points of the four points defining the line of the framework where the polar point and its related non-polar point are.

3. The method as claimed in claim 1, wherein the more than one geometric surface is a plane.

4. The method as claimed in claim 1, wherein the n-dimension space is a projective space.

5. The method as claimed in claim 1, wherein the geometric space is an (n+1)-dimension euclidian space.

6. The method as claimed in claim 1, further comprising the step of storing the algebraic coefficients of the m-degree form with an identifier.

7. The method as claimed in claim 4, wherein the projective space is a 4-dimension space.

8. The method as claimed in claim 1, wherein the generating of the m-degree form using the provided algebraic coefficients of the m-degree form is performed using a raytracing technique.

9. An apparatus for generating a m-degree form using algebraic coefficients of an equation defining the m-degree form in an n-dimension space using a plurality of points defining the form, the apparatus comprising:

an object memory, comprising more than one geometric surface, each of the more than one geometric surface comprising at least one line, each of the at least one line comprising at least one point of the plurality of points;

a control point to algebraic coefficient converter unit receiving each of the plurality of points and a solving equation defined using the equation defining the m-degree form and depending on at least three points, the control point to algebraic converter unit generating a corresponding equation by applying the solving equation to each of the plurality of points and two points located on one of the more than one geometric surface, the two selected points defining the line of the framework where each of the plurality of points is and resolving the generated corresponding equations in an iterative manner to provide the algebraic coefficients of the m-degree form; the iterative manner consisting in handling the generated equation using each of the plurality of points in a certain order, the certain order consisting in selecting the generated corresponding equation corresponding to a point located on the line having the highest number of points on it and the line located in the at least one geometric surface of the framework where there is the highest number of lines on it; and an outputting unit, receiving the provided algebraic coefficients of the m-degree form and generating the m-degree form.

10. The apparatus as claimed in claim 9, wherein the outputting unit comprises a raytracer unit, the raytracer unit further receiving a point of view signal.

11. A method for monitoring a deformation of an m-degree form using algebraic coefficients of an equation defining the m-degree form in an n-dimension space using a plurality of points defining the form, the method comprising the steps of:

providing a framework in accordance with a modification of a form planned, the framework comprising more than one geometric surface, each of the more than one geometric surface comprising at least one line, each of the at least one line comprising at least one point of the plurality of points;

modifying at least one part of the provided framework in accordance with the modification of the form planned;

providing a solving equation using the equation defining the m-degree form, the solving equation depending on at least three points;

for each of the plurality of points, generating a corresponding equation by applying the solving equation to each of the plurality of points and two points located on one of the more than one geometric surface, the two selected points defining the line of the framework where each of the plurality of points is;

resolving the generated corresponding equations in an iterative manner to provide the algebraic coefficients of the m-degree modified form; the iterative manner consisting in handling the generated equation using each of the plurality of points in a certain order, the certain order consisting in selecting the generated corresponding equation corresponding to a point located on the line having the highest number of points on it and the line located in the at least one geometric surface of the framework where there is the highest number of lines on it;

outputting the algebraic coefficients of the modified form.

12. The method as claimed in claim 11, further comprising the step of generating the modified m-degree form using the outputted algebraic coefficients of the modified m-degree form.

* * * * *